US011632454B2

(12) United States Patent
Huang et al.

(10) Patent No.: US 11,632,454 B2
(45) Date of Patent: Apr. 18, 2023

(54) HEAD-WORN WEARABLE DEVICES FOR AUTOMATICALLY CEASING THE CAPTURE OF VIDEO DATA, AND METHODS OF USE THEREOF

(71) Applicant: META PLATFORMS TECHNOLOGIES, LLC, Menlo Park, CA (US)

(72) Inventors: Willy Huang, San Francisco, CA (US); David Sven Woodland, Issaquah, WA (US); Hind Hobeika, San Francisco, CA (US); Benjamin Neal Bethurum, Shoreline, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 17/721,322

(22) Filed: Apr. 14, 2022

(65) Prior Publication Data
US 2022/0334650 A1    Oct. 20, 2022

Related U.S. Application Data

(60) Provisional application No. 63/307,624, filed on Feb. 7, 2022, provisional application No. 63/254,498, filed (Continued)

(51) Int. Cl.
*H04M 1/72439* (2021.01)
*G10L 13/08* (2013.01)
(Continued)

(52) U.S. Cl.
CPC .... *H04M 1/72439* (2021.01); *G02B 27/0093* (2013.01); *G02B 27/0101* (2013.01);
(Continued)

(58) Field of Classification Search
CPC .......... G06F 3/017; G06F 1/163; G06F 3/014; G06V 40/28; G02B 27/0093;
(Continued)

(56) References Cited

U.S. PATENT DOCUMENTS 5,689,669 A * 11/1997 Lynch ................... G06F 3/0481
715/848
6,002,853 A * 12/1999 de Hond ............... G06F 16/954
709/219

(Continued)

FOREIGN PATENT DOCUMENTS

CA      2275784 C     10/2000
CN    101345962 A      1/2009
(Continued)

OTHER PUBLICATIONS

Non-Final Office Action dated Jun. 10, 2022 for U.S. Appl. No. 17/721,304, filed Apr. 14, 2022, 10 pages.
(Continued)

*Primary Examiner* — Nicholas Augustine
(74) *Attorney, Agent, or Firm* — Morgan, Lewis & Bockius LLP

(57) ABSTRACT

Systems and methods are provided for determining when to cease capturing video via a head-worn wearable device. The method includes capturing, via a head-worn wearable device that includes a camera, video data. The method further includes, while capturing the video data, monitoring sensor data indicating one or both of (i) a position of the head-worn wearable device and (ii) a position of a wrist-wearable device that is communicatively coupled with the head-worn device to determine when to cease capturing the video data. The method further includes, in accordance with a determination that at least some of the sensor data indicates that one or both of (i) a video-capturing precondition is not present at the head-worn wearable device and (ii) a video-viewing (Continued)

precondition is present at the wrist-wearable device, ceasing to capture the video data and causing the video data to be displayed on a display of the wrist-wearable device.

18 Claims, 31 Drawing Sheets

Related U.S. Application Data on Oct. 11, 2021, provisional application No. 63/223,939, filed on Jul. 20, 2021, provisional application No. 63/176,839, filed on Apr. 19, 2021.

(51) Int. Cl.
| | |
|---|---|
| *H04M 1/72409* | (2021.01) |
| *G06F 3/0346* | (2013.01) |
| *H04N 7/14* | (2006.01) |
| *G06V 40/20* | (2022.01) |
| *G02B 27/00* | (2006.01) |
| *G02B 27/01* | (2006.01) |
| *G06F 1/16* | (2006.01) |
| *G06F 3/01* | (2006.01) |
| *G06F 3/048* | (2013.01) |

(52) U.S. Cl.
CPC ....... *G02B 27/017* (2013.01); *G02B 27/0179* (2013.01); *G06F 1/163* (2013.01); *G06F 3/014* (2013.01); *G06F 3/017* (2013.01); *G06F 3/0346* (2013.01); *G06V 40/28* (2022.01); *G10L 13/08* (2013.01); *H04M 1/724095* (2022.02); *H04M 1/724097* (2022.02); *H04N 7/141* (2013.01); *G02B 2027/014* (2013.01); *G02B 2027/0138* (2013.01); *G02B 2027/0187* (2013.01)

(58) Field of Classification Search
CPC .............. G02B 27/0101; G02B 27/017; G02B 27/0179; G02B 2027/0138; G02B 2027/014; G02B 2027/0187
See application file for complete search history.

(56) References Cited

U.S. PATENT DOCUMENTS

| | | | | |
|---|---|---|---|---|
| 6,243,091 | B1* | 6/2001 | Berstis | G06F 3/04815 |
| | | | | 715/205 |
| 6,271,843 | B1* | 8/2001 | Lection | G06T 15/00 |
| | | | | 715/848 |
| 6,285,757 | B1 | 9/2001 | Carroll et al. | |
| 6,362,817 | B1* | 3/2002 | Powers | G06T 17/00 |
| | | | | 345/428 |
| 6,414,679 | B1* | 7/2002 | Miodonski | G06T 13/00 |
| | | | | 707/999.005 |
| 6,570,563 | B1* | 5/2003 | Honda | G06F 16/444 |
| | | | | 345/473 |
| 6,573,903 | B2* | 6/2003 | Gantt | G06F 30/00 |
| | | | | 345/619 |
| 6,590,593 | B1* | 7/2003 | Robertson | G06F 3/04815 |
| | | | | 715/848 |
| 6,621,508 | B1* | 9/2003 | Shiraishi | G06F 3/0481 |
| | | | | 715/764 |
| 6,690,393 | B2* | 2/2004 | Heron | G06T 19/00 |
| | | | | 715/848 |
| 6,763,226 | B1 | 7/2004 | McZeal, Jr. | |
| 6,961,055 | B2* | 11/2005 | Doak | G06T 19/00 |
| | | | | 345/677 |
| 7,382,288 | B1* | 6/2008 | Wilson | G08G 5/0021 |
| | | | | 340/972 |
| 7,414,629 | B2* | 8/2008 | Santodomingo | G06T 17/05 |
| | | | | 345/582 |
| 7,467,356 | B2* | 12/2008 | Gettman | G06Q 30/02 |
| | | | | 715/850 |
| 7,653,877 | B2* | 1/2010 | Matsuda | G06F 16/957 |
| | | | | 463/32 |
| 7,746,343 | B1* | 6/2010 | Charaniya | G06F 16/248 |
| | | | | 345/428 |
| 8,316,104 | B2 | 11/2012 | Galvez et al. | |
| 9,024,842 | B1 | 5/2015 | Prada Gomez et al. | |
| 9,274,507 | B2 | 3/2016 | Kim et al. | |
| 9,432,839 | B2 | 8/2016 | Stanley-Marbell et al. | |
| 9,442,523 | B2 | 9/2016 | Lee et al. | |
| 9,674,694 | B2 | 6/2017 | Subbaramoo et al. | |
| 9,743,045 | B2 | 8/2017 | Lin et al. | |
| 9,952,433 | B2 | 4/2018 | Um et al. | |
| 11,200,869 | B1 | 12/2021 | Post et al. | |
| 2001/0018667 | A1* | 8/2001 | Kim | G06Q 30/0277 |
| | | | | 705/14.73 |
| 2002/0021622 | A1 | 2/2002 | Baroche | |
| 2002/0095463 | A1* | 7/2002 | Matsuda | G06F 16/957 |
| | | | | 709/204 |
| 2005/0093719 | A1* | 5/2005 | Okamoto | G01C 21/3697 |
| | | | | 705/14.62 |
| 2005/0128212 | A1* | 6/2005 | Edecker | G06T 17/05 |
| | | | | 345/581 |
| 2008/0169998 | A1 | 7/2008 | Jacobsen et al. | |
| 2008/0235570 | A1* | 9/2008 | Sawada | G06Q 10/10 |
| | | | | 356/3 |
| 2013/0127980 | A1* | 5/2013 | Haddick | G06F 3/013 |
| | | | | 348/14.08 |
| 2015/0111558 | A1 | 4/2015 | Yang | |
| 2015/0309316 | A1* | 10/2015 | Osterhout | G06F 3/0488 |
| | | | | 345/8 |
| 2015/0355677 | A1 | 12/2015 | Breedvelt-Schouten et al. | |
| 2017/0064071 | A1 | 3/2017 | Won et al. | |
| 2017/0237986 | A1 | 8/2017 | Choi et al. | |
| 2018/0324562 | A1 | 11/2018 | Park et al. | |
| 2019/0149937 | A1* | 5/2019 | Norris | H04N 7/15 |
| | | | | 700/94 |
| 2020/0004313 | A1 | 1/2020 | Kelley et al. | |
| 2022/0067965 | A1* | 3/2022 | Woods | G06F 3/04815 |

FOREIGN PATENT DOCUMENTS

| | | |
|---|---|---|
| CN | 108881778 A | 11/2018 |
| EP | 2863276 A2 | 4/2015 |
| EP | 3089658 A1 | 11/2016 |
| FR | 2979517 A3 | 3/2013 |
| GB | 2419058 A | 4/2006 |
| WO | 0055978 A1 | 9/2000 |

OTHER PUBLICATIONS

Non-Final Office Action dated Jun. 20, 2022 for U.S. Appl. No. 17/721,327, filed Apr. 14, 2022, 13 pages.
Burns G., "iPhone Users are Getting this Temperature Warning," SlashGear, Jun. 25, 2018, Retrieved on [Feb. 18, 2021], 11 pages, Retrieved from the Internet: URL: https://www.slashgear.com/iphone-users-are-getting-this-temperature-warning-25535440/.
Iphonetrics, "Apple Watch Temperature Warning Screen," TILs, Sep. 28, 2015, Retrieved on [Feb. 18, 2021], 10 pages, Retrieved from the Internet: URL: https://www.iphonetricks.org/apple-watch-temperature-warning-screen/.
International Search Report and Written Opinion for International Application No. PCT/US2022/025290, dated Sep. 8, 2022, 18 pages.
Invitation to Pay Additional Fees for International Application No. PCT/US2022/025290 dated Jul. 18, 2022, 14 pages.
Notice of Allowance dated Aug. 24, 2022 for U.S. Appl. No. 17/721,327, filed Apr. 14, 2022, 9 pages.
Notice of Allowance dated Aug. 25, 2022 for U.S. Appl. No. 17/721,304, filed Apr. 14, 2022, 8 pages.

\* cited by examiner

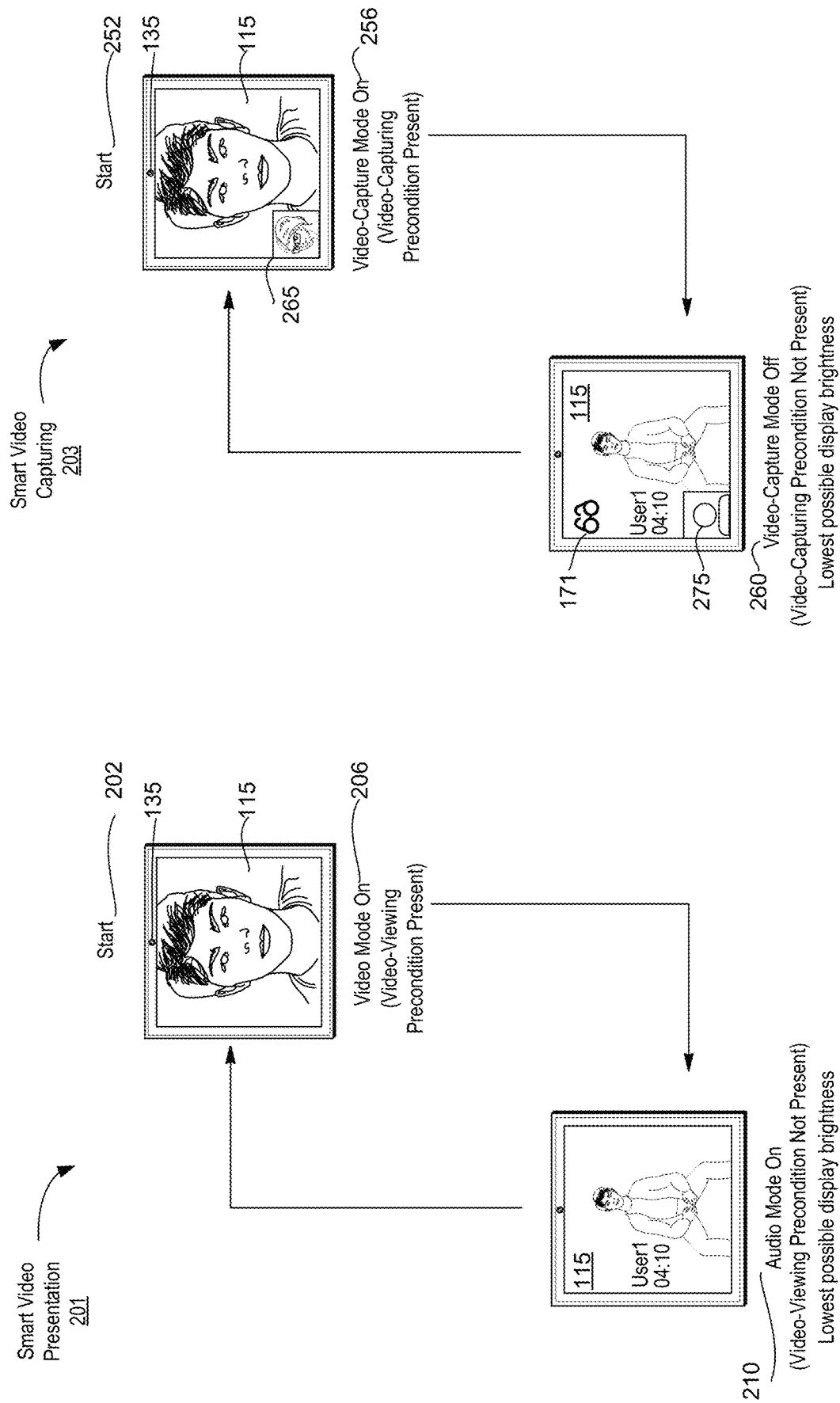

800 ↘

802
Receive at a wrist-wearable device that is coupled with one or more sensors, video data and audio data associated with a video call between a user of the wrist-wearable device and at least one other user distinct from the user.

↓

804
While causing presentation of the video data via a display of the wrist wearable device and the audio data via a speaker that is in communication with the wrist-wearable device, determine whether sensed data from the one or more sensors indicates that a video-viewing precondition is present at the wrist-wearable device.

806-a
The one or more sensors include an inertial measurement unit.

806-b
The sensed data from the one or more sensors includes sensed data from the inertial measurement unit that allows one or more processors of the wrist-wearable device to determine a position and orientation of the wrist-wearable device 102 while it is worn on a wrist of the user.

806-c
Determining whether the video-viewing precondition is present at the wrist-wearable device includes determining whether the position and/or orientation of the wrist-wearable device indicates that the user's wrist is in a raised position or a lowered position, such that the video-viewing precondition is not present at the wrist-wearable device when the user's wrist is determined to be in the lowered position.

808-a
While the video call is ongoing and a video-capturing precondition is present at the wrist-wearable device:

808-b
Capture additional video data via a camera integrated with the wrist-wearable device and additional audio data via a microphone at the wrist-wearable device.

808-c
Send the additional video data and the additional audio data to a device associated with the at least one other user participating in the video call.

808-d
In accordance with a determination that the video-capturing precondition is not present at the wrist-wearable device:

808-e
Cease to capture the additional video data.

808-f
Send only the additional audio data to the device associated with the at least one other user.

812
While the video call is ongoing and the video-capturing precondition is present at the wrist-wearable device, replace the user's face in a portion of the additional video data with an avatar representing the user's face.

814
The replacing of the user's face in the portion of the additional video data is performed in accordance with a determination that additional sensor data from the one or more sensors indicates that the user's face should be replaced in the portion of the additional video data.

816
The additional sensor data is obtained from one or more of an ambient noise sensor, an ambient light sensor, a location sensor, and a biometric sensor.

818
The replacing of the user's face in the portion of the additional video data is performed based on an instruction from the user.

810-a
Determine whether the video-capturing precondition is present at the wrist-wearable device includes determining whether the position and/or orientation of the wrist-wearable device indicates that the user's wrist is in the raised position or the lowered position, such that:

810-b
The video-capturing precondition is not present at the wrist-wearable device when the user's wrist is determined to be in the lowered position.

810-c
The video-capturing precondition is present at the wrist-wearable device when the user's wrist is determined to be in the raised position.

822
In accordance with a determination that the video-viewing precondition is not present at the wrist-wearable device, cause presentation of only the audio data and not the video data.

824-a
While causing the presentation of only the audio data and not the video data, determine whether sensed data from the one or more sensors indicated that the video-viewing precondition is present at the wrist-wearable device

824-b
In accordance with a determination that the video-viewing precondition is present at the wrist-wearable device, cause presentation of both the audio data and the video data.

826
In conjunction with causing presentation of only the audio data and not the video data, operate the display in a low-power mode in which no video content is displayed at the display.

828-a
The one or more sensors include a sensor for monitoring a temperature at the wrist-wearable device, and the method further includes:

828-b
In accordance with a determination that the temperature at the wrist-wearable device reaches or exceeds a predefined temperature value, display on the display of the wrist-wearable device a user interface element that provides a warning to the user that the wrist-wearable device needs to cool down.

830
The determination that the video-viewing precondition is not present at the wrist-wearable device is made (i) after displaying the warning to the user and (ii) is based in part on the temperature at the wrist-wearable device having reached or exceeded the predefined temperature value for a threshold period of time

832
The determination that the temperature at the wrist-wearable device has exceeded the predefined temperature value for the threshold period of time is made while a position-based video-viewing precondition remains present at the wrist-wearable device.

834
In accordance with a determination that the temperature at the wrist-wearable device is below the predefined temperature value and that the position-based video-viewing precondition is present at the wrist-wearable device, resuming display of the video data at the display of the wrist-wearable device.

836-a
Detecting that another electronic device associated with the user is located in proximity to the wrist-wearable device, the other electronic device having one or more of a larger capacity battery than a battery of the wrist-wearable device and a connection to a power source.

836-b
In accordance with a determination that a display of the other electronic device is available, cease to present the video data via the display of the wrist-wearable device and providing to the other electronic device data to cause presentation of the video data on the display of the other electronic device.

838
The other electronic device is a laptop, a tablet, a smartphone, or a smart display.

1110
Capture, via a head-worn wearable device that includes a camera, video data

1120
While capturing the video data, monitor sensor data indicating one or both of (i) a position of the head-worn wearable device and (ii) a position of a wrist-wearable device that is communicatively coupled with the head-worn device to determine when to cease capturing the video data

1130
In accordance with a determination that at least some of the sensor data indicates that one or both of (i) a video-capturing precondition is not present at the head-worn wearable device and (ii) a video-viewing precondition is present at the wrist-wearable device, cease to capture the video data and causing the video data to be displayed on a display of the wrist-wearable device.

1410
Receive an instruction to use a camera of a head-worn wearable device to capture video data for a video stream

1420
After receiving the instruction to use the camera of the head-worn wearable device to capture the video data for the video stream:

1423
Receive, at a wrist-wearable device that is in communication with the head-worn wearable device, one or more electronic messages from a viewer of the video stream

1425
Monitor sensor data indicating one or both of (i) a position of the head-worn wearable device and (ii) a position of the wrist-wearable device to determine when to display, via a display of the wrist-wearable device, the one or more electronic messages

1430
In accordance with a determination that the sensor data indicates that a message-viewing precondition is present, display, on the display of the wrist-wearable device, the one or more electronic messages from the viewer of the video stream.

Figure 14

HEAD-WORN WEARABLE DEVICES FOR AUTOMATICALLY CEASING THE CAPTURE OF VIDEO DATA, AND METHODS OF USE THEREOF

CROSS-REFERENCE TO RELATED APPLICATIONS

This application claims priority to U.S. Prov. App. No. 63/307,624, filed on Feb. 7, 2022, and entitled "Wrist-Wearable Device For Automatically Switching Between Video And Other Calling Modes Based On Sensor Data, Head-Worn Wearable Device For Coordinated Video Capturing And Presentation With The Wrist Wearable Device, And Methods Of Use Thereof"; U.S. Prov. App. No. 63/254,498, filed on Oct. 11, 2021, and entitled "Wearable Devices For Automatically Switching Between Video And Other Modes Based On Sensor Data And For Coordinated Video Capturing Between Wrist And Head-Worn Wearable Devices, And Methods Of Use Thereof"; U.S. Prov. App. No. 63/223,939, filed on Jul. 20, 2021, and entitled "Wrist-Wearable Devices For Automatically Switching Between Video And Audio Calling Modes At The Wrist-Wearable Device Based On Sensor Data, And Methods Of Use Thereof"; and U.S. Prov. App. No. 63/176,839, filed on Apr. 19, 2021, and entitled "Wrist-Wearable Devices For Automatically Switching Between Video And Audio Calling Modes At The Wrist-Wearable Device Based On Sensor Data, And Methods Of Use Thereof"; each of which is incorporated herein by reference.

TECHNICAL FIELD

The present disclosure relates generally to wearable devices and methods for video calling, more particularly, to wrist-wearable devices configured to seamlessly and automatically switch (e.g., without a user request to do the switching) between video and other calling modes (e.g., audio-only calling modes or other modes in which a camera and/or other components of another device, such as a head-worn wearable device, are used in conjunction with the video call) at a wrist-wearable device that includes a video camera based on sensor data from the wrist-wearable device.

The present disclosure also relates generally to head-worn wearable devices and wrist-wearable devices that coordinate during capturing of video to (i) create coordinate video data (e.g., video data that is combined based on video captured by both the wrist-wearable device and the head-worn wearable device) and/or (ii) to determine when to cease capturing video data based on sensor data at one or both of a head-worn device and/or a wrist-wearable device (e.g., to allow for capturing video at the head-worn wearable device and then seamlessly switching to view the captured video at the wrist-wearable device once a user looks down towards the wrist-wearable device).

BACKGROUND

Computing devices, such as computers, phones, and tablets, are commonly used to send and receive video calls. These computing devices can be large requiring a user to hold the device using one hand or both hands, and/or may require that the user be at some stationary location during the video call. Additionally, due to the high temperatures and high energy usage that can result from long video calls, computing devices can require dedicated power sources (e.g., a wall outlet, large batteries, etc.) or dedicated cooling solutions (e.g., fans, heatsinks, etc.) to maintain the video calls for long periods of times. For at least these reasons, current computing devices are not well suited for hands-free, on-the-go, multitasking situations (e.g., shopping, walking, hiking, chores, cooking, etc.). Further, current audio and video capabilities have not been extended or successfully implemented in mass-market, consumer wrist-wearable devices.

Techniques for seamlessly capturing video using one device and then switching to view that video at another device are also inadequate as requiring direct user intervention at multiple points in the process (e.g., a user has to request to start recording, request to stop recording, request to send the video to another device, and request to view the video at the other device after it has been sent), thereby wasting time and creating user dissatisfaction with such inefficient use cases. Likewise, techniques for seamlessly capturing video data using two different devices and then, automatically and without user intervention, combining the video data captured by two different devices into coordinated video data are also inefficient and wasteful.

As such, there is a need for extending video and audio capabilities to wrist-wearable devices for a hands-free experience that easily and automatically switches between video and other calling modes. There is also a need for seamless video-capturing techniques that are efficiently designed and allow for seamless coordination between more than one device.

SUMMARY

The wrist-wearable devices, head-worn wearable devices, and methods of use thereof (as well as system including both devices) described herein address one or more of the above-mentioned drawbacks by seamlessly and automatically switching (e.g., without a user request to do the switching) between video and other calling modes (e.g., an audio-only mode or a mode in which components of a head-worn wearable device are using during a video calling instead of components of a wrist-wearable device) at the wrist-wearable device, and by seamlessly and automatically switching between whether the wrist-wearable device sends video and audio data, or audio-only data to remote user devices (e.g., counterpart devices during an ongoing video call). The wrist-wearable devices, head-worn wearable devices, and methods of operation thereof described herein use data from sensors (e.g., data from one or more inertial measurement units, data from one or more proximity sensors, data from one or more capacitive sensors, data from one or more hall-effect sensors, etc.) to determine whether video-viewing and video-capturing preconditions are present at one or both of the wrist-wearable device and the head-worn wearable device, in conjunction with performance of the automatic switching operations. As one example, the wrist-wearable devices and methods described herein determine whether data from one or more sensors at the wrist-wearable device indicates that a video-viewing precondition (e.g., a precondition that must be satisfied before video data is presented at the wrist-wearable device, e.g., in conjunction with an ongoing video call at the wrist-wearable device but non-video-calling examples also make use of video-viewing preconditions as is further explained below) is present at the wrist-wearable device, and if it is determined that the video-viewing precondition is not present at the wrist-wearable device, only present audio data. In these cases, the video call will act as an audio call, or a phone call only (i.e., the device automatically would switch from a video-calling mode to this other calling mode, which in this case is an audio-only calling mode). In the example audio-calling mode, if it is determined that the wrist-wearable device is coupled with a head-worn wearable device, a speaker and/or microphone of the head-worn wearable device can be used as alternatives to, or in addition to, a speaker and/or microphone of the wrist-wearable device. Alternatively, if it is determined that the video-viewing precondition is present at the wrist-wearable device, the wrist-wearable device would present both video and audio data.

In this way (and also by similarly making use of a video-capturing precondition, example uses of which are described in detail below), the wrist-wearable devices and head-worn wearable devices extend their overall battery life, make efficient use of limited CPU resources, and maintain low operating temperatures that do not thermally throttle the processors of the wrist-wearable devices 102 or become uncomfortable (or physically dangerous) for the user to wear while in use. For example, a precondition (video-viewing and/or video-capturing precondition) can be a minimum battery life required for the presentation and/or sending of video data. Alternatively, or in addition, a precondition (video-viewing and/or video-capturing precondition) can be an input-power requirement (or once a threshold is reached, the power requirement limit has been reached). An example of an input-power requirement can be a minimum or maximum amount of energy being drawn from a battery, or designated power modes (e.g., device operating in low-power modes, standard-power mode, or high-power mode). Alternatively, or in addition, a precondition (video-viewing and/or video-capturing precondition) can be a maximum-temperature requirement, in which once the maximum temperature of the wrist-wearable device is reached, the video will shut off and only audio data will be presented and captured (similar behavior can occur for the head-worn wearable device as well). As one additional example, a precondition (video-viewing and/or video-capturing precondition) can be associated with whether the user's arm or wrist is in a particular position (e.g., lowered arm causes video presentation and capturing to be disabled; while raised arm causes enabling of video presentation and capturing).

Further, the wrist-wearable devices described herein improve users' daily activities and productivity by providing a compact, hands-free computing system including a display that can be worn throughout the users' day without inconveniencing the users or restricting their movements (and thus making it easier to interact with their physical and artificial environments in tandem with (as a complement to everyday life). For example, the wrist-wearable devices and methods described herein, in one embodiment, provide improved techniques for hands-free video calling that do not inconvenience or hamper on-the-go, multitasking situations (e.g., shopping, walking, hiking, chores, cooking, etc.) in which video calling can now be performed in a hands-free fashion that still remains safe and is performed in a way that does not exhaust power and processing resources of a wrist-wearable device as the user goes about their day.

To help further the above goals, and as was briefly noted above, some embodiments described herein also make use of components of other wearable devices, such as a head-worn device (e.g., smart glasses or virtual reality headset), including speaker, microphone, and/or camera of these other wearable devices to allow for seamlessly switching between use of such components at the wrist-wearable or at the other wearable devices. For instance, in some embodiments, once the video-capturing precondition is no longer present at the wrist-wearable device (causing capturing of video using a camera of the wrist-wearable device to cease in accordance with some embodiments), a camera of a head-worn device that is communicatively coupled to the wrist-wearable device can instead be used. This is explained in further detail below.

As is also explained in further detail below, the techniques described herein (and, in particular, use of video-viewing and video-capturing preconditions) apply outside of the example context of video calls. As one example, some techniques described herein are able to switch between making use of a camera at a head-worn device and a camera at a wrist-wearable device to record video content in a seamless fashion depending, in part, on presence or absence of a video-viewing precondition at the wrist-wearable device and/or a presence or absence of a video-capturing precondition at the head-worn wearable device. Additionally, some techniques described herein are also able to allow for recording video using a camera of a head-worn device and then ceasing to record the video using the camera of the head-worn device once a video-viewing precondition is present at the wrist-wearable device (e.g., while the video-viewing precondition is not present at the wrist-wearable device because the wrist-wearable device is in a lowered position, the camera of the head-worn device can be used to capture video content; once the video-viewing precondition is again present at the wrist-wearable device, then the video content can ceased to be recorded using the camera of the head-worn wearable device and the display of the wrist-wearable device can then be used to display the video content that was recorded using the camera of the head-worn device). Additional example techniques (including ones involving creating coordinated video data using video data captured by both the wrist-wearable device and head-worn wearable device, where the capturing using the cameras of the different devices at different points in time can occur without any express user instruction to cause the switching between use of the different cameras and the combining to create the coordinated video data) and a more detailed description is provided below. Moreover, the video-viewing and video-capturing preconditions described herein can be device-specific preconditions, such that a video-viewing precondition for a first type of device (e.g., a wrist-wearable device) can be different from a video-capturing precondition for a second type of device (e.g., a head-worn wearable device). Additionally, video-viewing or video-capturing preconditions, in certain embodiments or circumstances can also be defined based on sensor data for two different devices (e.g., a video-viewing precondition that is only present based on a determination that a head-worn wearable device is facing toward the ground and that a wrist-wearable device is in a raised position), such that in these certain embodiments or circumstances the video-viewing and/or video-viewing preconditions can be combined preconditions that take conditions at multiple devices into account in determining whether the combined preconditions are satisfied.

The first summarized example (A1-E1) below relates to switching between video calling (e.g., a mode in which a wrist-wearable device presents video and audio data to a user in conjunction with a video call) and other calling modes (e.g., an audio-only calling mode in which the wrist-wearable device presents only audio data and not video data, or modes in which components of a head-worn wearable device are used to present video and/or audio data for the video call) based on sensor data for a wrist-wearable device. Other examples then follow, including ones related to contexts other than video calling.

(A1) In accordance with some embodiments, a method of video calling at a wrist-wearable device is provided. The method includes receiving video data and audio data at a wrist-wearable device that has one or more sensors. The video data and audio data are associated with a video call between a user of the wrist-wearable device and at least one other user distinct from the user. The method further includes, while causing the presentation of the video data via a display of the wrist-wearable device and the audio data via a speaker that is in communication with the wrist-wearable device, determining whether sensed data from the one or more sensors indicates that a video-viewing precondition is present at the wrist-wearable device. In accordance with a determination that the video-viewing precondition is not present at the wrist-wearable device, the method includes continuing to cause presentation of the audio data via the speaker that is in communication with the wrist-wearable device and ceasing to cause presentation of the video data via the display of the wrist-wearable device.

(A2) In some embodiments of A1, the method further includes while continuing to cause presentation of the audio data via the speaker that is in communication with the wrist-wearable device and while presentation of the video data via the display of the wrist-wearable device is ceased, a determination will be made whether sensed data from the one or more sensors indicates that the video-viewing precondition is present at the wrist-wearable device. In accordance with a determination that the video viewing precondition is present at the wrist wearable device, the method includes causing presentation of the audio data via the speaker that is in communication with the wrist-wearable device and video data via the display of the wrist-wearable device. In other words, the wrist-wearable device is able to seamlessly and automatically switch back and forth between video and other calling modes (e.g., switching to an audio calling mode by using sensor data alone and without requiring an express request from a user to switch between the video and audio calling modes, and then switching back to a video calling modes when the video-viewing precondition is again present at the wrist-wearable device).

(A3) In some embodiments of any of A1-A2, the one or more sensors include an inertial measurement unit and the sensed data from the one or more sensors includes sensed data from the inertial measurement unit that allows one or more processors of the wrist-wearable device to determine a position and/or orientation of the wrist-wearable device while it is worn on a wrist of the user. Further, determining whether the video-viewing precondition is present at the wrist-wearable device includes determining whether the position and/or orientation of the wrist-wearable device indicates that the user's wrist is in a raised position or a lowered position, such that the video-viewing precondition is not present at the wrist-wearable device when the user's wrist is determined to be in the lowered position.

(A4) In some embodiments of any of A1-A3, the method further includes while the video call is ongoing and a video-capturing precondition is present at the wrist-wearable device, capturing additional video data via a camera integrated with the wrist-wearable device and additional audio data via a microphone at the wrist-wearable device. The method further includes sending the additional video data and the additional audio data to a device associated with the at least one other user participating in the video call. In accordance with a determination that the video-capturing precondition is no longer present at the wrist-wearable device, the method further includes ceasing to capture the additional video data via the camera integrated with the wrist-wearable device. Use of the video-capturing precondition (in addition to the video-viewing precondition discussed above) thus helps to further example goals of properly managing the limited computing and processing resources at the wrist-wearable device, thereby helping to ensure a sustained user interaction with the wrist-wearable device during the ongoing video call. As described more below, video-viewing and video-capturing preconditions can be separate preconditions (e.g., different satisfaction of different preconditions, which can be based on sensor data, leads to separate satisfaction of the video-viewing and video-capturing preconditions), can be the same preconditions (e.g., satisfaction of the same preconditions, which can be based on sensor data, leads to satisfaction of both of the video-viewing and video-capturing preconditions), can be device-specific preconditions (e.g., different conditions, which can be separately evaluated, for different types of devices), can be preconditions satisfied based on conditions at different devices evaluated together, and combinations thereof.

(A4.3) In some embodiments of A4, the method further includes in conjunction with the determination that the video-capturing precondition is no longer present at the wrist-wearable device, in accordance with a determination that the wrist-wearable device is communicatively coupled with smart glasses (e.g., an example of the head-worn wearable devices described herein) worn by the user, (i) capturing further video data via a camera integrated with the smart glasses and (ii) sending the further video data to the device associated with the at least one other user in conjunction with the video call. This is an example of the other calling modes described here, with this example other calling mode being a mode in which hardware components of the smart glasses are used during the video call instead of (or in addition to) hardware components of the wrist-wearable device. The other calling modes also include the audio-calling mode described earlier.

(A4.6) In some embodiments of A4.3, the method further includes in accordance with the determination that that wrist-wearable device is communicatively coupled with the smart glasses (i) capturing further audio data via a microphone at the smart glasses and (ii) sending the further audio data to the device associated with the at least one other user in conjunction with the video call. In other words, during one of the other calling modes, in addition to use a camera of the smart glasses, the method can also make use of the microphone of the smart glasses as well.

(A4.9) In some embodiments of A4.3, the method further includes in conjunction with the determination that the video-capturing precondition is no longer present at the wrist-wearable device, in accordance with a determination that the wrist-wearable device is not communicatively coupled with smart glasses worn by the user, sending only the additional audio data to the device associated with the at least one other user in conjunction with the video call. In other words, availability of the other calling modes can be based on whether the wrist-wearable device is coupled with smart glasses or not; in the instance when the wrist-wearable device is not communicatively coupled with the smart glasses, then the available other calling modes can, in some examples, only include the audio-calling mode.

(A5) In some embodiments of any of A4-A4.9, determining whether the video-capturing precondition is present at the wrist-wearable device includes determining whether the position and/or orientation of the wrist-wearable device indicates that the user's wrist is in the raised position or the lowered position, such that the video-capturing precondition is not present at the wrist-wearable device when the user's wrist is determined to be in the lowered position, and the video-capturing precondition is present at the wrist-wearable device when the user's wrist is determined to be in the raised position. In some embodiments, only a single precondition is utilized (e.g., the video-viewing and video-capturing preconditions correspond to a same precondition, such as one based on the user's wrist position). In other embodiments, there are a plurality of video-viewing and video-capturing preconditions and at least one precondition in each of the pluralities overlaps, but there is at least one precondition that does not overlap in the two pluralities. Additional descriptions of the video-viewing and video-capturing preconditions are provided in the detailed description following this summary section.

(A6) In some embodiments of any of A4-A5, the method further includes while the video call is ongoing and the video-capturing precondition is present at the wrist-wearable device, replacing the user's face in a portion of the additional video data with an avatar representing the user's face.

(A7) In some embodiments of A6, replacing of the user's face in the portion of the additional video data is performed in accordance with a determination that additional sensor data from the one or more sensors indicates that the user's face should be replaced in the portion of the additional video data.

(A8) In some embodiments of A8, the additional sensor data is obtained from one or more of an ambient noise sensor, an ambient light sensor, a location sensor, and a biometric sensor.

(A9) In some embodiments of any of A6-A8, the replacing of the user's face in the portion of the additional video data is performed based on an instruction from the user.

(A9.5) In some embodiments of any of A6-A9, the replacing of the user's face in the portion of the additional video data is performed based, in part, on an angle of the camera in relation to the user's face. The angle of the camera can be determined based on data from the one or more sensors of the wrist-wearable device (and can also be determined using sensor data from a device communicatively coupled with the wrist-wearable device, such as sensor data from a pair of smart glasses, including data from a camera of the smart glasses that can be used to help determine the angle of the camera of the wrist-wearable device).

(A10) In some embodiments of any of A5-A9, when it is determined that the user's wrist is in the raised position, the video-viewing precondition is determined to be present at the wrist-wearable device only if the user's wrist is also positioned such that the display of the wrist-wearable device is viewable by the user (e.g., viewing angle between at least one of the user's eyes and the display of the wrist-wearable device is no more than 30 degrees). The method further includes while the user's wrist is in the raised position and the display of the wrist-wearable device is viewable by the user, determining that the video-capturing precondition is present at the wrist-wearable device and the video-viewing precondition is not present at the wrist-wearable device. Based on the determining, (i) sending the additional video data and the additional audio data to the device of the at least one other user and (ii) causing presentation of the audio data at the speaker that is in communication with the wrist-wearable device.

(A11) In some embodiments of any of A1-A10, the one or more sensors include a sensor for monitoring a temperature at the wrist-wearable device. The method further includes in accordance with a determination that the temperature at the wrist-wearable device reaches or exceeds a predefined temperature value, displaying on the display of the wrist-wearable device a user interface element that provides a warning to the user that the wrist-wearable device needs to cool down.

(A12) In some embodiments of A11, the determination that the video-viewing precondition is not present at the wrist-wearable device is made (i) after displaying the warning to the user and (ii) is based in part on the temperature at the wrist-wearable device having reached or exceeded the predefined temperature value for a threshold period of time. Stated another way, the predefined temperature value can be used as an additional video-viewing precondition (which can be referred to as a temperature-based video-viewing precondition, as compared to a position-based video-viewing precondition that can be associated with wrist or arm positions) to assist with the seamless and automatic switching between video and other calling modes at the wrist-wearable device (e.g., audio-calling mode or other modes that make use of components at a different device during the view call, such as making use of hardware at a head-worn wearable device instead of hardware at the wrist-wearable device).

(A13) In some embodiments of A12, the determination that the temperature at the wrist-wearable device has exceeded the predefined temperature value for the threshold period of time is made while a position-based video-viewing precondition remains present at the wrist-wearable device. In other words, the predefined temperature value (which can be used as part of the temperature-based video-viewing precondition described above) can be evaluated separately from the position-based video-viewing precondition and can override the position-based video-viewing precondition to cause the device to switch away from a video-calling mode and to a different mode (e.g., audio-only mode).

(A14) In some embodiments of any of A12-A13, the method further includes in accordance with a determination that the temperature at the wrist-wearable device is below the predefined temperature value and that the position-based video-viewing precondition is present at the wrist-wearable device, resuming display of the video data at the display of the wrist-wearable device.

(A15) In some embodiments of any of A1-A14 the method further includes in conjunction with causing presentation of the audio data and ceasing to cause presentation of the video data, operating the display in a low-power mode in which no video content is displayed at the display.

(A16) In some embodiments of any of A1-A15, the method further includes detecting that another electronic device associated with the user is located in proximity to the wrist-wearable device. The other electronic device having one or more of (i) a larger capacity battery than a battery of the wrist-wearable device and (ii) a connection to a power source. The method further includes, in accordance with a determination that a display of the other electronic device is available, ceasing to present the video data via the display of the wrist-wearable device and providing to the other electronic device data to cause presentation of the video data on the display of the other electronic device.

(A17) In some embodiments of any of A1-A16, the other electronic device is a laptop, a tablet, a smartphone, smart glasses, or a smart display.

(A18) In some embodiments of any of A1-A17, the method further includes in accordance with a determination that the wrist-wearable device is communicatively coupled with smart glasses, the speaker that is in communication with the wrist-wearable device that is used to present the audio data is a speaker coupled with the smart glasses. Alternatively, in accordance with a determination that the wrist-wearable device is not communicatively coupled with smart glasses, the speaker that is in communication with the wrist-wearable device that is used to present the audio data is a speaker directly coupled with the wrist-wearable device.

(B1) In accordance with some embodiments, a wrist-wearable device for video calling is provided. The wrist-wearable device is configured to perform or cause performance of the method of any of A1-A18.

(C1) In accordance with some embodiments, a capsule housing the one or more sensors and the display recited in A1 is provided. The capsule is configured to couple with a wearable structure (e.g., a band portion and a cradle portion that is detachably coupled with the capsule housing) to form a wrist-wearable device, and the capsule includes one or more processors configured to perform or cause performance of the method of any of A1-A18.

(D1) In accordance with some embodiments, a non-transitory, computer-readable storage medium is provided. The non-transitory, computer-readable storage medium includes instructions that when executed by a wrist-wearable device, cause the wrist-wearable device to perform or cause performance of the method of any of A1-A18. For operations described above as being performed at smart glasses (or, more generally, a head-worn wearable device), a non-transitory computer-readable storage medium can also be provided as including instructions that, when executed by the head-worn wearable device, cause the head-worn wearable device to perform those operations.

(E1) In accordance with some embodiments, another aspect includes means for performing the method any of A1-A18. The means can include software algorithms (e.g., algorithms implementing the flowcharts that are described below) performed on general-purpose hardware and/or application-specific integrated circuits configured to perform the algorithms described herein (e.g., algorithms implementing the flowcharts that are described below).

Next, in F1-G3, an example head-worn wearable device (and related systems, methods, and mediums) is (are) described, which head-worn wearable device can be configured to perform certain aspects of the video-calling examples described earlier that allow for coordinated behavior between the head-worn wearable device and the wrist-wearable device during a video call (e.g., to allow for seamlessly switching between using components of these two different devices during a video call).

(F1) In accordance with some embodiments, a head-worn wearable device with a camera for use during a video call initiated at a wrist-wearable device is provided (in certain embodiments or circumstances the video call can also be initiated at the head-worn wearable device). The head-worn wearable device can be smart glasses, an augmented reality (AR) head-mounted display, a virtual reality (VR) head-mounted display, or other head-mounted displays. The head-worn wearable device includes a frame, a camera coupled with the frame, and one or more processors. The one or more processors are configured to receive an instruction from a wrist-wearable device that causes the one or more processors to activate the camera for use in capturing video data in conjunction with a video call initiated at the wrist-wearable device. The instruction is sent by the wrist-wearable device (in some embodiments, the wrist-wearable device sends the instruction to an intermediary device, such as a smartphone, which can be configured to serve as an intermediary between the wrist-wearable device and the head-worn wearable device to assist with the coordinated behaviors described herein) in accordance with a determination that a video-capturing precondition is not present at the wrist-wearable device. The one or more processors, in response to receiving the instruction, are further configured to activate the camera and provide video data captured by the camera to the wrist-wearable device until an additional instruction is received from the wrist-wearable device that causes the one or more processors to cease providing the video data captured by the camera to the wrist-wearable device in conjunction with the video call. The additional instruction is sent by the wrist-wearable device in accordance with a determination that the video-capturing precondition is present at the wrist-wearable device. The one or more processors, upon receiving the additional instruction, also cease to provide the video data captured by the camera to the wrist-wearable device. As mentioned earlier, other devices, such as phones, tablets, etc., can serve as a communication intermediary between the wrist-wearable device and the head-worn device and can therefore send the instructions that are then received by the head-worn wearable device.

(F2) In some embodiments of F1, the head-worn wearable device further includes a microphone, and the instruction also causes the one or more processors to activate the microphone for use in capturing audio data.

(F3) In some embodiments of F2, the additional instruction causes the one or more processors to also cease providing the audio data.

(F4) In some embodiments of any of F1-F3, the head-worn wearable device further includes a speaker, and the instruction also causes the one or more processors to activate the speaker for use in presenting audio data received at the wrist-wearable device.

(F5) In some embodiments of F4, the additional instruction causes the one or more processors to also cease presenting audio data received at the wrist-wearable device.

(F6) In some embodiments of any of F1-F5, the head-worn wearable device further includes a display, and the instruction also causes the one or more processors to activate the display for use in presenting video data received at the wrist-wearable device.

(F7) In some embodiments of F6, the additional instruction causes the one or more processors to also cease presenting video data received at the wrist-wearable device.

(G1) In another aspect, a system is provided that includes a head-worn wearable device of any of F1-F6 and a wrist-wearable device of B1 or E1.

(G2) In a further aspect, a method is provided that includes performing the operations performed by the head-worn wearable device of any of F1-F7.

(G3) In yet another aspect, a non-transitory, computer-readable storage medium is provided, which storage medium includes instructions that, when executed by a head-worn wearable device, cause the head-worn wearable device to perform or cause performance of the operations in any of F1-F7.

As explained in more detail in the detailed description that follows this summary, the embodiments herein are not limited to video calling alone. The techniques described herein also help to enable coordinated recording of video data between a head-worn wearable device (e.g., a part of smart glasses) and a wrist-wearable device (e.g., a smart watch). The summarized examples that follow illustrate this as these examples include coordination between the head-worn wearable device and the wrist-wearable device to determine when video capturing at a head-worn wearable device should be ceased (which can occur without an express user instruction to cause the ceasing), as is summarized for H1-J3; following that a summarized example of coordination between the head-worn wearable device and the wrist-wearable device to allow for the creation of coordinated video data (e.g., a video that includes video data captured at the head-worn wearable device and video data captured at the wrist-wearable device), as is summarized for K1-K16.

(H1) In accordance with some embodiments, a method of determining when to cease capturing video via a head-worn wearable device is provided. The method includes capturing, via a head-worn wearable device that includes a camera, video data. The method includes, while capturing the video data, monitoring sensor data indicating one or both of (i) a position (and/or orientation) of the head-worn wearable device and (ii) a position (and/or orientation) of a wrist-wearable device that is communicatively coupled with the head-worn device to determine when to cease capturing the video data. The method further includes, in accordance with a determination that at least some of the sensor data indicates that one or both of (i) a video-capturing precondition is not present at the head-worn wearable device and (ii) a video-viewing precondition is present at the wrist-wearable device, ceasing to capture the video data and causing the video data to be displayed on a display of the wrist-wearable device.

(H2) In some embodiments of H1, the determination is based only on at least some of the sensor data indicating that the video-capturing precondition is not present at the head-worn wearable device.

(H3) In some embodiments of H2, the video-capturing precondition is not present at the head-worn wearable device when at least some of the sensor data indicates that the head-worn wearable device is positioned such that a front portion of the head-worn wearable device is facing towards the ground.

(H4) In some embodiments of H3, the front portion of the head-worn wearable device is a portion of the head-worn wearable device that is worn over a user's eyes.

(H5) In some embodiments of any of H1-H4, the determination is based only on at least some of the sensor data indicating that the video-viewing precondition is present wrist-wearable device.

(H6) In some embodiments of H5, the video-viewing precondition is present at the wrist-wearable device when the wrist-wearable device is in a raised position.

(H7) In some embodiments of any of H1-H6, the determination is based on at least some of the sensor data indicating both (i) the video-capturing precondition is not present at the head-worn wearable device and (ii) the video-viewing precondition is present at the wrist-wearable device.

(I1) In another aspect, a system including a head-worn wearable device and a wrist-wearable device is provided. The system is configured to perform or cause the performance of the method of any of H1-H7 using the head-worn wearable device and the wrist-wearable device.

(J1) In a further aspect, a non-transitory, computer-readable storage medium is provided. The non-transitory, computer-readable storage medium includes instructions that, when executed by a head-worn wearable device, cause the head-worn wearable device to perform or cause performance of the method of any of H1-H7.

(J2) In yet an additional aspect, a wrist-wearable device is provided, the wrist-wearable device used in conjunction with performance of the method of any of H1-H7.

(J3) In one more aspect, means are provided for performing or causing performance of the method of any of H1-H7. The means can include software algorithms (e.g., algorithms implementing the flowcharts that are described below) performed on general-purpose hardware and/or application-specific integrated circuits configured to perform the algorithms described herein (e.g., algorithms implementing the flowcharts that are described below).

(K1) Another example described herein is a method of coordinated video capturing using a wrist-wearable device and a head-worn wearable device. The method includes capturing, via a head-worn wearable device that includes a camera, first video data. The method also includes, while capturing the first video data, monitoring sensor data indicating one or both of (i) a position of the head-worn wearable device and (ii) a position of a wrist-wearable device that is communicatively coupled with the head-worn device to determine when to cease capturing the first video data via the head-worn wearable device. The method further includes, in accordance with a determination that at least some of the sensor data indicates that one or both of (i) a video-capturing precondition is not present at the head-worn wearable device and (ii) a video-capturing precondition is present at the wrist-wearable device, ceasing to capture the first video data and beginning to capture second video data via a camera of the wrist-wearable device.

(K2) In accordance with some embodiments of K1, the method additionally includes, in response to receiving a request from a user to ceasing capturing the second video data, causing the first video data and the second video data to be combined into coordinated video data.

(K3) In accordance with some embodiments of K2, the method includes causing the coordinated video data to be displayed on a display of the wrist-wearable device.

(K4) In accordance with some embodiments of any of K1-K3, the determination is based only on at least some of the sensor data indicating that the video-capturing precondition is not present at the head-worn wearable device.

(K5) In accordance with some embodiments, of K4 the video-capturing precondition is not present at the head-worn wearable device when at least some of the sensor data indicates that the head-worn wearable device is positioned such that a front portion of the head-worn wearable device is facing towards the ground.

(K6) In accordance with some embodiments of K5, the front portion of the head-worn wearable device is a portion of the head-worn wearable device that is worn over a user's eyes.

(K7) In accordance with some embodiments of K1, the determination is based only on at least some of the sensor data indicating that the video-capturing precondition is present at the wrist-wearable device.

(K8) In accordance with some embodiments of K7, the video-capturing precondition is present at the wrist-wearable device when the wrist-wearable device is in a raised position.

(K9) In accordance with some embodiments of K1, the determination is based on at least some of the sensor data indicating both (i) the video-capturing precondition is not present at the head-worn wearable device and (ii) the video-capturing precondition is present at the wrist-wearable device.

(K10) In accordance with some embodiments of any of K1 or K4-K9, the method includes, while the second video data is being captured, monitoring sensor data indicating one or both of (i) a position of the head-worn wearable device and (ii) a position of a wrist-wearable device that is communicatively coupled with the head-worn device to determine when to cease capturing the second video data at the wrist-wearable device. The method also includes, in accordance with an additional determination that at least some of the sensor data indicates that one or both of (i) the video-capturing precondition is present at the head-worn wearable device and (ii) the video-capturing precondition is not present at the wrist-wearable device, ceasing to capture the second video data and beginning to capture third video data via the camera of the head-worn device.

(K11) In accordance with some embodiments of K10, the method also includes, in response to receiving a request from a user to cease capturing the third video data, causing the first video data, the second video data, and the third video data to be combined into coordinated video data.

(K12) In accordance with some embodiments of K11, the method further includes causing the coordinated video data to be displayed on a display of the wrist-wearable device.

(K13) In another aspect, as system is provided that includes a head-worn wearable device and a wrist-wearable device, the system configured to perform the method of any of claims K1-K12 using the head-worn wearable device and the wrist-wearable device.

(K14) In one more aspect, a non-transitory, computer-readable storage medium is provided, the medium including instructions that, when executed by a head-worn wearable device, cause the head-worn wearable device to perform or cause performance of the method of any of claims K1-K12.

(K15) In one other aspect, a wrist-wearable device used in conjunction with performance of the method of any of K1-K12 is provided.

(K16) In one more other aspect, means for performing or causing performance of the method of any of K1-K12 are provided. The means can include software algorithms (e.g., algorithms implementing the flowcharts that are described below) performed on general-purpose hardware and/or application-specific integrated circuits configured to perform the algorithms described herein (e.g., algorithms implementing the flowcharts that are described below).

As explained in more detail in the detailed description that follows this summary, the embodiments herein are not limited to video calling alone. The techniques described herein also help to enable coordinated video streaming and messaging using a wrist-wearable device (e.g., a smart watch) and a head-worn wearable device (e.g., a part of smart glasses). The summarized examples that follow illustrate this as these examples include coordination between video data captured by the head-worn wearable device, transmitted captured video data (e.g., by the head-worn wearable device and/or the wrist-wearable device), and received messages (e.g., by the head-worn wearable device and/or the wrist-wearable device) to synchronize the received messages with the transmitted video data, as is summarized for L1-O1.

(L1) An example described herein is a method of coordinated video streaming and messaging using a wrist-wearable device and a head-worn wearable device. The method includes receiving an instruction to use a camera of a head-worn wearable device to capture video data for a video stream. The method includes, after receiving the instruction to use the camera of the head-worn wearable device to capture the video data for the video stream, receiving, at a wrist-wearable device that is in communication with the head-worn wearable device (in some embodiments, the receiving can instead or additionally occur by way of a head-worn wearable device that is in communication with the wrist-wearable device, which head-worn wearable device can include its own communication antennas for, e.g., WiFi, cellular, and other types of communication channels), one or more electronic messages from a viewer of the video stream; monitoring sensor data indicating one or both of (i) a position of the head-worn wearable device and (ii) a position of the wrist-wearable device to determine when to display, via a display of the wrist-wearable device, the one or more electronic messages. The method further includes, in accordance with a determination that the sensor data indicates that a message-viewing precondition is present, displaying, on the display of the wrist-wearable device, the one or more electronic messages from the viewer of the video stream.

(L2.1) In accordance with some embodiments of L1, the instruction to use the camera of the head-worn wearable device to capture video data for the video stream is received at the wrist-wearable device.

(L2.3) In accordance with some embodiments of any of L1-L2.1, the method further includes in conjunction with displaying, on the display of the wrist-wearable device, the one or more electronic messages, displaying a visual indicator reflecting that the wrist-wearable device is in communication with the head-worn wearable device.

(L2.5) In accordance with some embodiments of L1, the head-worn wearable device further includes a microphone, and while the camera of the head-worn wearable device is capturing the video data for the video stream, the microphone is capturing audio data for the video stream.

(L3) In accordance with some embodiments of any of L1-L2.5, the one or more electronic messages are received responsive to the video data captured via the camera of the head-worn wearable device and the one or more electronic messages are displayed in the order received.

(L4) In accordance with some embodiments of any of L1-L3, the wrist-wearable device and the head-worn wearable device include respective speakers, the one or more electronic messages include text-to-speech (TTS) messages, and the method further includes causing a speaker of the wrist-wearable device or a speaker of the head-worn wearable device to present audio data corresponding to the TTS messages.

(L5) In accordance with some embodiments of L4, the speaker of the wrist-wearable device or the speaker of the head-worn wearable device is automatically selected for use in presenting the audio data corresponding to the TTS messages based on the sensor data indicating one or both of (i) the position of the head-worn wearable device and (ii) the position of the wrist-wearable device that is communicatively coupled with the head-worn device.

(L6) In accordance with some embodiments of any of L1-L5, a determination that the message-viewing precondition is present is based on one or both of (i) at least some of the sensor data indicating that the head-worn wearable device is positioned such that a front portion of the head-worn wearable device is facing towards the wrist-wearable device and (ii) at least some of the sensor data indicating that the wrist-wearable device is positioned such that the display of the wrist-wearable device is facing towards the front portion of the head-worn wearable device.

(L7) In accordance with some embodiments of any of L1-L6, the method further includes in accordance with a determination that the message-viewing precondition is no longer present, ceasing to display, via the display of the wrist-wearable device, the one or more messages.

(L8) In accordance with some embodiments of any of L1-L7, the camera of the head-worn wearable device captures video data that is within a field of view of the camera of the head-worn wearable device.

(L9) In accordance with some embodiments of any of L1-L8, the method further includes in response to receiving the one or more electronic messages, causing one or both of the head-worn wearable device and the wrist-wearable device to provide a notification to a user of the head-worn wearable device and the wrist-wearable device, the notification indicating receipt of the one or more electronic messages to the user.

(L10) In accordance with some embodiments of L9, the notification includes at least one of a vibration, audible indicator, and visual indicator.

(L11) In accordance with some embodiments of any of L1-L10, displaying the one or more electronic messages includes displaying a plurality of electronic messages for a plurality of different viewers of the video stream, and the plurality of electronic messages are displayed in a chronological fashion.

(L12) In accordance with some embodiments of any of L1-L11, the method further includes receiving, via the wrist-worn wearable device, another user input terminating the video stream, and responsive to the other user input terminating the video stream, causing the camera of the head-worn wearable device to cease to capture the video data.

(M1) An example described herein is a system comprising a head-worn wearable device and a wrist-wearable device, the system configured to perform the method of any of L1-L12 using the head-worn wearable device and the wrist-wearable device.

(N1) An example described herein is a non-transitory, computer-readable storage medium including instructions that, when executed by a wrist-worn wearable device, cause the wrist-worn wearable device to perform or cause performance of the method of any of L1-L12.

(O1) An example described herein is a wrist-wearable device used in conjunction with performance of the method of any of L1-L12.

(P1) Means for performing or causing performance of the method of any of L1-L12 are provided.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not necessarily have been selected to delineate or circumscribe the subject matter described herein.

BRIEF DESCRIPTION OF THE DRAWINGS

So that the present disclosure can be understood in greater detail, a more particular description may be had by reference to the features of various embodiments, some of which are illustrated in the appended drawings. The appended drawings illustrate pertinent example features of the present disclosure and are therefore not to be considered limiting, for the description may admit to other effective features as the person of skill in this art will appreciate upon reading this disclosure.

FIGS. 1E-1F also illustrate an example of the wrist-wearable device operating in a coordinated fashion with a head-worn wearable device (in this example, a pair of smart glasses), in accordance with some embodiments.

FIG. 2A illustrates a process for performing automatic switches between video and audio-only modes based on whether one or more video-viewing preconditions are satisfied at a wrist-wearable device, in accordance with some embodiments.

FIG. 2B illustrates a process for performing automatic switches between turning a video-capture mode on and off based on whether one or more video-capturing preconditions are satisfied at a wrist-wearable device, in accordance with some embodiments.

FIGS. 8A-8E illustrate a detailed flow diagram of a method of presenting, capturing, and/or sending audio and/or video data by a wrist-wearable device during a video call, according to some embodiments.

FIG. 11 illustrates a detailed flow diagram of a method of a coordinated video capturing technique for a head-worn wearable device and a wrist-wearable device (e.g., determining when to cease capturing video via a head-worn wearable device based on sensor data at the head-worn wearable device and/or at a wrist-wearable device coupled with the head-worn wearable device), according to some embodiments.

FIG. 14 illustrates a detailed flow diagram of a method of coordinated video streaming and messaging using a wrist-wearable device and a head-worn wearable device, according to some embodiments.

Figure 1A:
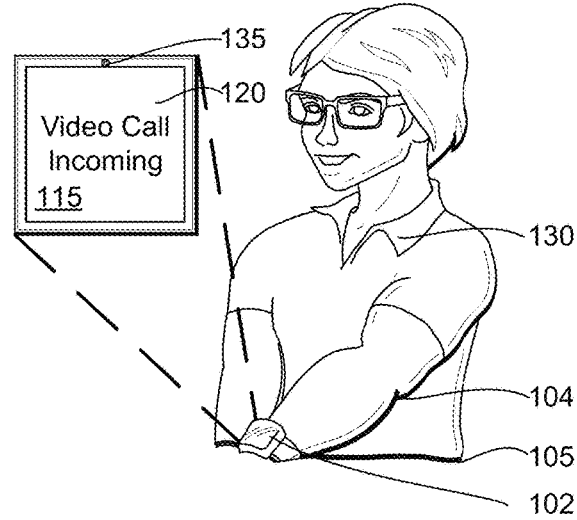
FIGS. 1A-1F illustrate a wrist-wearable device of a user transmitting and receiving audio data and/or video data in conjunction with an ongoing video call, in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DETAILED DESCRIPTION

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not been described in exhaustive detail so as to avoid obscuring pertinent aspects of the embodiments described herein.

FIGS. 1A-1F illustrate a user 130 transmitting and receiving audio data and/or video data using a wrist-wearable device 102, in accordance with some embodiments. In particular, the wrist-wearable device monitors sensor data to sense when a user 130 changes a position of the wrist-wearable device 102, which positional changes cause the wrist-wearable device to automatically switch (e.g., without an express user request to do the switching) between video and other modes (e.g., an audio-only mode and other modes that make use of components of another device, such as a head-worn wearable device) at the wrist-wearable device 102. The wrist-wearable device 102 is configured to receive and present video and/or audio data via a display 115 and a speaker. The wrist-wearable device 102 is further configured to capture video data and/or audio data, via an image sensor 135 (e.g., a camera) and a microphone, and send the captured data to another device (e.g., computing device 350; FIGS. 3A-3F) distinct from the wrist-wearable device 102. In some embodiments, the wrist-wearable device 102 includes one or more sensors (e.g., sensors a heart rate sensor 1058, EMG sensor 1046, SpO2 sensor 1054, altimeter 1048, thermal sensor or thermal couple, ambient light sensor, ambient noise sensor).

In some embodiments, audio and/or video data is presented at the wrist-wearable device 102 in accordance with a determination, by the wrist-wearable device, that one or more video-viewing preconditions are present. More specifically, when the one or more video-viewing preconditions are present, the wrist-wearable device 102 presents audio and video data to the user 130. Alternatively, when the one or more video-viewing preconditions are not present, the wrist-wearable device 102 presents (or, at least, causes presentation of) audio data but not video data to the user 130. The determination whether the one or more video-viewing preconditions are present is conducted automatically and without instructions from the user 130 (so the user does not request that the wrist-wearable device switch between video and audio-only modes, instead the device monitors whether the video-viewing preconditions are satisfied based on data from sensors of the wrist-wearable device to enable automatic determinations that do not require input from the user). In some embodiments, one or more machine learning algorithms and/or models are used by the wrist-wearable device 102 to determine whether the one or more video-viewing preconditions are present (e.g., machine-learning algorithms that have been trained based on sensor data from wrist-wearable devices to learn when switching between video and other calling modes is appropriate). In some embodiments, the wrist-wearable device 102 updates the one or more machine learning algorithms and/or models over time based on collected sensor data for a user to further refine when the switching between video and other calling modes should occur.

Figure 1B:
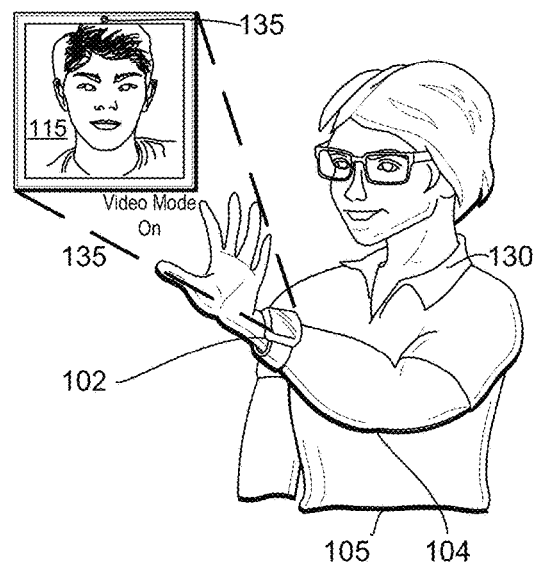

For example, as shown in FIG. 1A, the user 130 can receive, at the wrist-wearable device 102, a video call. In some embodiments, the wrist-wearable device 102 presents on its display 115 a user interface element 120 that provides a notification to the user 130 of the incoming video call (e.g., text within the user interface that states "Video Call Incoming"). The user 130 then accepts the video call. While the video call is ongoing, the wrist-wearable device monitors sensor data to make determinations as to whether one or more video-viewing preconditions are present at the wrist-wearable device, which video-viewing preconditions are used to cause automatic switching between video and other modes (e.g., including an audio-only mode) during the ongoing video call. When the wrist-wearable device 102 determines that the video-viewing precondition is present at the wrist-wearable device 102, the wrist-wearable device 102 causes presentation of video data on its display 115 as shown in FIG. 1B (e.g., the display 115 of the wrist-wearable device is used to present video data received from a counterpart video call participant described with reference to FIGS. 3A-3F, and also depicted in FIGS. 1B and 1C on the display of the wrist-wearable device). In some embodiments, the wrist-wearable device 102 presents on its display 115 another user interface element that notifies the user 130 that video mode is on. The video calling and other calling modes are discussed below in more detail in reference to FIGS. 2A-3F.

Figure 1C:
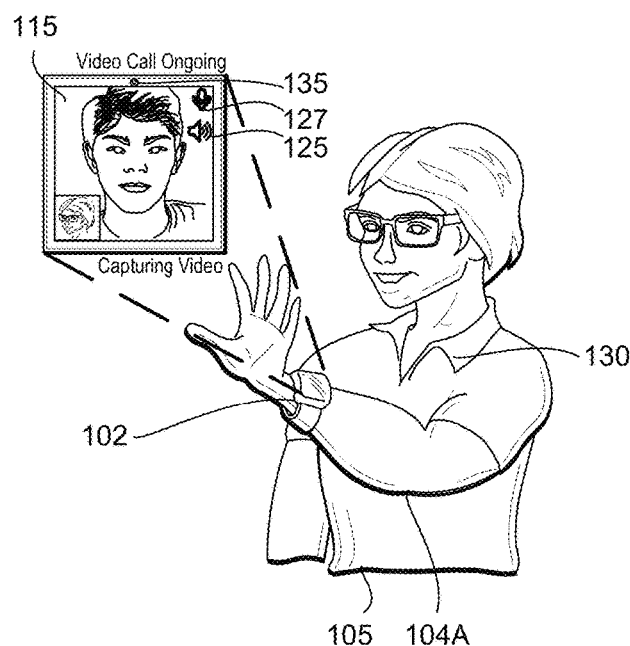

The one or more video-viewing preconditions include a precondition that is satisfied when sensor data from the wrist-wearable device indicates that the user 130 has raised his or her wrist (or hand, elbow, arm, or portion thereof) to a predetermined raised position 104A (e.g., above the user's waist or midsection 105). For example, in FIG. 1B, the video-viewing precondition is present at the wrist-wearable device 102 when it is determined based on sensor data from the wrist-wearable device that the user 130 has raised his or her wrist (or hand, elbow, arm or portion thereof) above his or her waist or midsection 105, as such the wrist-wearable device would present both audio and video data during the ongoing video call (as is shown in FIGS. 1B and 1C). In some embodiments, if a determination is made that the wrist-wearable device is communicatively coupled with a head-worn wearable device that includes a speaker, the wrist-wearable device can instead user the speaker of the head-worn wearable device for presentation of the audio data.

Figure 1D:
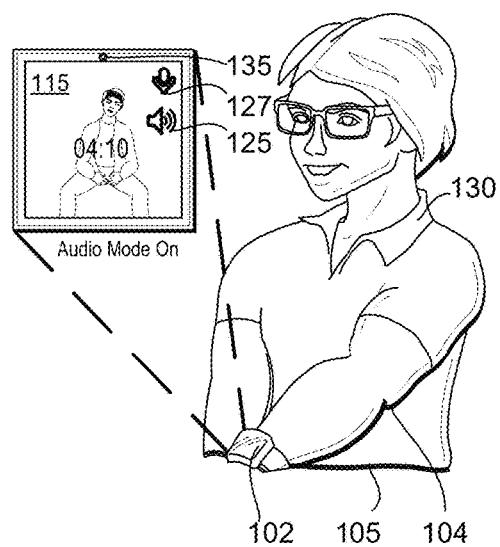
Figure 1E:
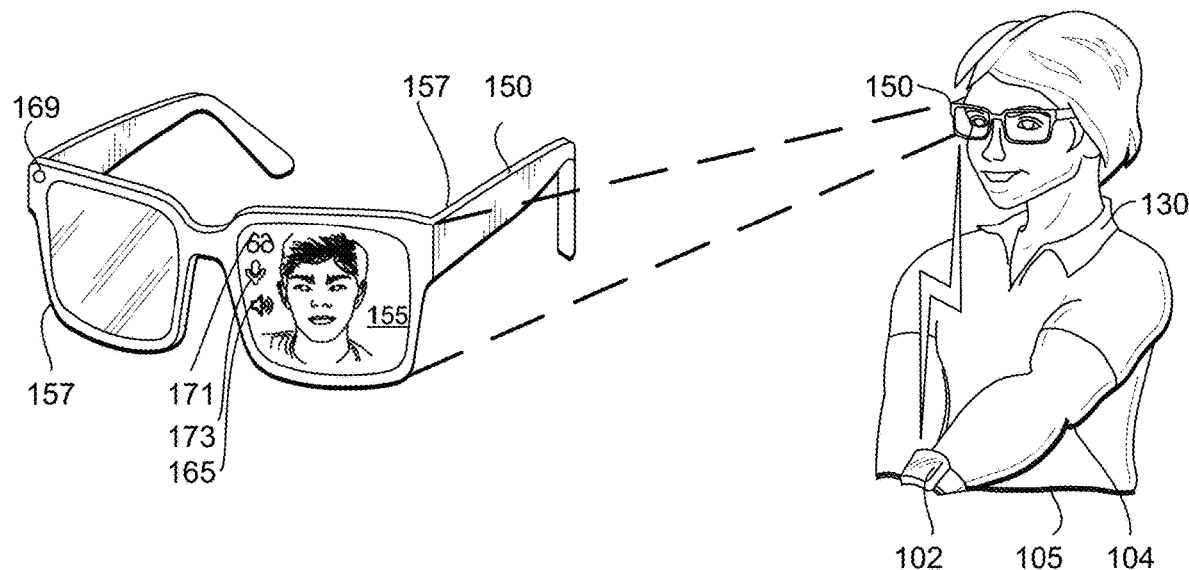

When the user's wrist position (or hand, elbow, arm or portion thereof) is in a lowered position 104, the wrist-wearable device 102 can still receive video data along with audio data, but only presents the audio data via one or more speakers (and does not present the video data, which allows the wrist-wearable device to preserve its limited power and computing resources without impacting a sustained user interaction since the user 130 is no longer able to view the display 115 of the wrist-wearable device 102 when it is in its lowered position; examples of the lowered position are shown in FIGS. 1A, 1D, and 1E). In some embodiments, the lowered position can be in a position just below the waist or midsection of a user (e.g., waist or midsection 105 of user 130). In some embodiments, the wrist-wearable device need only keep track of a raised position of the wrist-wearable device, such that if the sensor data indicates that the device is in any position other than the raised position, then the wrist-wearable devices remains in the video mode (causes presentation of video and audio data for the ongoing video call).

In some embodiments, indicators 127 and/or 125 can presented on the display 115 of the wrist-wearable device to provide the user with a visual indication as to where audio is being presented (e.g., device on which audio data is being presented for an ongoing video call can display the speaker indicator 125) and/or where audio data is being received (e.g., device on which audio data is being received/captured for an ongoing video call, such as via a microphone, can display the microphone indicator 127).

In some embodiments, the one or more video-viewing preconditions include a precondition that is satisfied when the wrist-wearable device detects a tilt of the wrist-wearable device (e.g., an angle in which the device is tilted relative to a flat horizontal plane that can be parallel to a ground surface below the user's feet) based on some of the sensor data. For example, the sensor data can include data from a gyroscope and/or an accelerometer and the wrist-wearable device can determine, based on the sensor data, that the user has their wrist tilted up (e.g., a current tilt of the device relative to the flat horizontal plane discussed above is within a first tilt position range, which can, in one example, be between 2-45 degrees) or their wrist tilted down (e.g., a current tilt of the device relative to the flat horizontal plane discussed above is within a second tilt position range, which can in one example be between 46-95 degrees). In some embodiments, when the current tilt of the device is determined to be within the first tilt position range, thus satisfying a video-viewing precondition related to tilt of the device, the wrist-wearable device is caused to present both audio and/or video data (or an avatar representation) during the ongoing video call (if other preconditions, as appropriate depending on the circumstances, described herein are also satisfied). In some embodiments, when the current tilt of the device is determined to be within the second tilt position range, thus failing to satisfy the video-viewing precondition related to tilt of the device, the wrist-wearable device is caused to stop presenting video data (e.g., end an ongoing video call) or present only audio data (or an avatar) during the ongoing video call (if other conditions described herein are satisfied). In some embodiments, the device can make periodic determinations as to the current tilt of the device and it only switches to change the presentation of video and/or audio based on changes in the current tilt (e.g., a change in which the current tilt moves from with the first tilt position range to the second position range, or vice versa).

In some embodiments, the video-viewing precondition related to tilt is assessed to determine whether the display of the wrist-wearable device 102 is viewable by the user (e.g., viewable because the display 115 is at a viewing/tilt angle that allows for viewing of the display 115 by the user, such as a viewing angle of no less than 30 degrees between at least one of the user's eyes and the display 115). In other words, in some embodiments, in addition to using the sensor data to assess whether the wrist-wearable device is in the raised position, sensor data at the wrist-wearable device is also used to assess a rotational position (e.g., tilt) of the user's wrist to determine whether the display is viewable by the user or not. As such, some embodiments can assess both whether the wrist-wearable device is in the raised position and whether the display is viewable (e.g., in an appropriate tilt position) by the user, while other embodiments can assess just whether the device is in the raised position in conjunction with a determination as to whether the one or more video-viewing preconditions are present at the wrist-wearable device. As another option used with some embodiments, the device 102 can use sensor data to determine whether a user is looking at the display (e.g., display 115) or not; and, if it is determined that the user is looking at the display, then the video-viewing precondition is determined to be satisfied (this can be used in conjunction with the other video-viewing preconditions or can be used as a standalone video-viewing precondition).

As mentioned above, data from the sensors on the wrist-wearable device 102 is used, by the wrist-wearable device 102 (or by a device that can analyze sensor data from the wrist-wearable device, such as an intermediary device like a smartphone, to make this determination, which can also make determinations associated with sensor data from head-worn wearable devices), to make a determination as to whether a video-viewing precondition is present in a way that is automatic as not requiring input from a user at the device 102 to conduct the determination. For example, the wrist-wearable device 102 can determine, based on the sensor data, that it is not in a raised position (e.g., is positioned below the user's waist or midsection 105) and determine that a video-viewing precondition is not present and, as such, present only audio data. Alternatively, the sensor data can indicate that the user's wrist is at or near the eye level of the user (e.g., above a user's waist or midsection 105 such that the wrist-wearable device 102 can be viewed by the user 130 with slight or no adjustment to their head position), and thus in the raised position (therefore, the video-viewing precondition is present and both audio and video data are caused to be presented). In some embodiments, the sensor data can indicate that the display 115 is facing away from the user's line of sight (e.g., to one side or the other, or parallel with the floor, etc.) and the wrist-wearable device 102 can determine that a video-viewing precondition is not present and present only audio data (i.e., the video remains off)—this determination could be made based on wrist orientation or based on whether the user is determined to be looking at the display or a combination of both techniques. Alternatively, when the sensor data indicates that that the display is facing the user, the wrist-wearable device 102 can determine that a video-viewing precondition is present and then cause presentation of both video and audio data.

In some embodiments, the one or more sensors of the wrist-wearable device 102 include an inertial measurement unit (IMU) 1042 (FIG. 10) and the sensed data from the one or more sensors includes sensed data from the IMU that allows the wrist-wearable device 102 to determine (e.g., using central processing unit 1026 and/or a microcontroller unit (MCU) 1052 (FIG. 10) to process the sensor data) a position and orientation of the wrist-wearable device 102 while it is worn on a wrist of the user 130. The sensor data discussed above can thus be sensor data from the IMU 1042 but is not limited only to sensor data from the IMU. For instance, in embodiments in which sensors are available to assess whether a user is looking at the display of the device 102, then sensor data from a heart rate sensor 1058, EMG sensor 1046, SpO2 sensor 1054, altimeter 1048, thermal sensor or thermal couple, ambient light sensor, ambient noise sensor can be utilized as well. For example, the wrist-wearable device 102 can use a thermal sensor or thermal couple (or internal reading of the one or more processors) to determine whether a video-viewing precondition is present (e.g., temperature is below a predetermined temperature threshold). Thus, various different types of video-viewing preconditions can be used, including position-based video-viewing preconditions and temperature-based video-viewing preconditions, among others. In another example, the wrist-wearable device 102 can use internal clocks to determine whether a video-viewing precondition is present (e.g., time usage is below a predetermined usage time interval). Additional examples of the video-viewing preconditions and the video-capturing preconditions are provided below. Information on the one or more sensors is provided below in reference to FIG. 10. As one of skill in the art will appreciate upon reading this disclosure, when sensor data of a head-worn wearable device is used in conjunction with the techniques described here, examples of those sensors for the head-worn wearable device can be similar to the examples provided in FIG. 10 for the wrist-wearable device, such that the head-worn wearable device can include altimeter(s), inertial measurement unit(s), capacitive sensor(s), among others.

In some embodiments, the one or more video-viewing preconditions include predetermined temperature thresholds (e.g., medium temperature level, high temperature, shut-off or safety temperature, etc.), a predetermined usage time interval (e.g., duration of video call is 30 sec, 1 min, 2 min, 5 min., etc.), a battery life of the wrist-wearable device 102 being above a minimum level, a predetermined power level (e.g., the wrist-wearable device 102 is not in a low power mode, the wrist-wearable device 102 is in a standard power mode or high power mode) or power requirement (e.g., power drain on the battery of the wrist-wearable device 102 is below a threshold, or the wrist-wearable device 102 is plugged into a power source). In some embodiments, the video-viewing preconditions are based on user biometric data (e.g., heart rate, detected sweat, etc.), ambient lighting (e.g., bright sunny days, cloudy days, dark room compared to a well-lit room, etc.), user's location, user's movement, etc. For example, the wrist-wearable device 102 can determine, based on data obtained from the sensors, that the lighting is too bright such that video would not be visible regardless of the screen brightness and then make a consequent determination that a video-viewing precondition is not present. The one or more video-viewing preconditions can also include preconditions related to whether the display of the device 102 is viewable by a user (which can be determined based on rotational/tilt position of the user's wrist and/or based on whether the user is determined to be looking at the display of the device 102). For example, in some embodiments, a video-viewing precondition includes that the display 115 is at a particular viewing angle that allows the user to see substantially all of the display 115 (e.g., the display 115 is positioned at an angle relative the user's eyes, such that when the user is looking towards the display 115, their eyes can view substantially all of the display 115 at a viewing angle no greater than 20 degrees, 30 degrees, or 45 degrees). In other words, a video-viewing precondition can be determined to be satisfied based on a determination that sensor data indicates that the display 115 is viewable by the user 130.

As described in more detail below, one or more video-capturing preconditions can be utilized in addition to the video-viewing preconditions discussed above. These video-capturing preconditions can include a minimum battery requirement (e.g., the device is plugged into a battery source or has a minimum battery life), maximum temperature threshold (e.g., after the temperature threshold is met, the device will be unable to operate video), minimum power requirement. In some embodiments, the video-capturing preconditions also include a predetermined position/orientation, a predetermined temperature threshold, a predetermined usage time interval, the wrist-wearable device 102 satisfies a predetermined power level. In some embodiments, the video-capturing preconditions are based on user biometric data (e.g., hear rate, detected sweat, etc.), ambient lighting (e.g., dark room compared to a well-lit room), user's location, user's movement, etc. In some embodiments, the one or more video capturing conditions can be the same or similar to the one or more video viewing preconditions, but in other embodiments or circumstances, the video-capturing preconditions can be different from, and assessed separately from, the video-viewing preconditions.

As shown in FIG. 1C, in some embodiments, the wrist-wearable device 102 is configured to capture audio and/or video data and to send (by way of a network) the data to a remote user (e.g., to a computing device 350 (FIG. 3A) associated with another user distinct from user 130). In some embodiments, the wrist-wearable device 102 captures and sends audio and video data to a computing device 350 (by way of a network) associated with another user distinct from user 130 based on a determination that one or more video-capturing preconditions are present. In some embodiments, the video capturing can occur at the wrist-wearable device, but the sending of capturing video can be performed by a different device (such as a smartphone that might be serving as a communication intermediary between a wrist-wearable device and a head-worn wearable device). More specifically, as shown in FIG. 1D, when the one or more video-capturing preconditions are not present, the wrist-wearable device 102 will capture and cause sending of audio data only (i.e., the wrist-wearable device 102 will cease capturing video data). Alternatively, when the one or more video-capturing preconditions are present, the wrist-wearable device 102 will capture and causing sending of both audio data and video data to the computing device 350 (by way of a network) associated with the other user distinct from user 130. Similar to the video-viewing preconditions, the determination whether the one or more video-capturing preconditions are present is conducted automatically and without instructions from the user 130 to make changes in how the device is capturing video and/or audio data. The one or more video-capturing preconditions can be based on a variety of sensor data (including, without limitation, sensor data indicating positional data, orientation data, temperature data, the wrist-wearable device 102's battery life, the wrist-wearable device 102 power level, and a number of other factors). Capturing and sending video data is discussed in more detail below in reference to FIGS. 2-4.

In some embodiments or circumstances, the wrist-wearable device of the user may not present video or audio data received from another user (e.g., a counterpart video-calling participant, such as that described below in reference to other user of computing device 350, FIG. 3A) when the video-capturing precondition is present at the device 102 but the video-viewing precondition is not present. Similarly, in some embodiments or circumstances, video data and audio data can be received and presented at the device 102 from the other user of the device 350 while the video-viewing precondition is present at the device 102 but the device 102 might send only audio data to the device 350 of the other user because the video-capturing precondition is not present at the device 102. The same is true when hardware (e.g., one or more of a speaker, microphone, camera) of a head-worn wearable device is used in conjunction with the video call instead of analogous hardware at the wrist-wearable device.

Turning to FIG. 1E, in some embodiments, the wrist-wearable device 102 is communicatively coupled (e.g., by way of a Bluetooth connection between the two devices, and/or the two devices can also both be connected to an intermediary device such as a smartphone that provides instructions and data to and between the two devices, and a lightning bolt is used to graphically depict such a communication connection in the figures) to another computing device, such as smart glasses 150 (VR goggles (with or without a heads-up display), AR glasses (with or without a heads-up display), other head-mounted displays, or head-worn wearable device). In some embodiments, the smart glasses 150 include speakers, a microphone, and an imaging device 169 (e.g., a camera or other type of image sensor). In some embodiments, the smart glasses 150 include a display 155 (e.g., a heads-up display integrated with one or both of the lenses of the smart glasses) for presenting visual data to the user 130. In some embodiments, the speakers, the microphone, the imaging device 169, and the display 155 are integrated and/or coupled to a part of a frame 157 of the smart glasses 150. In some embodiments, the smart glasses 150 include one or more processors (analogous to the central processing unit 1026 and/or a microcontroller unit (MCU) 1052 (FIG. 10)) integrated in the frame 157. In some embodiments, the smart glasses 150 are configured to present an artificial-reality environment (e.g., augmented reality (AR), virtual reality (VR) environment, and the like) and/or perform one or more commands in an artificial-reality environment. In some embodiments, the smart glasses 150 can be an artificial-reality system including, but not limited to, non-immersive, semi-immersive, and fully-immersive VR systems; marker-based, markerless, location-based, and projection-based augmented reality systems; hybrid reality systems; and other types of mixed reality systems.

In some embodiments, the wrist-wearable device 102 is configured to cause the smart glasses 150 to one or more of capture, receive, and present one or both of audio data and video data. Particularly, in some embodiments, the wrist-wearable device 102 can cause the smart glasses 150 to capture and receive audio data and/or video data in accordance with a determination that the one or more video-capturing preconditions and/or the one or more video-viewing preconditions are not present at the wrist-wearable device 102. As explained in more detail below, the techniques described herein can make use of video-calling and video-viewing preconditions that can be evaluated for either or both of the head-worn wearable device and the wrist-wearable device, which preconditions can be evaluated overall for the two devices or separately for each individual device.

In some embodiments, while the wrist-wearable device 102 causes presentation of video data via its display 115 and audio data via a speaker that is in communication with the wrist-wearable device 102 (e.g., one or both of speaker (or speakers) of the wrist-wearable device and speaker (or speakers) of smart glasses 150 (or other head-worn wearable device)), the wrist-wearable device 102 determines whether sensed data from the one or more sensors indicates that a video-viewing precondition is present at the wrist-wearable device 102. In accordance with a determination that the video-viewing precondition is not present at the wrist-wearable device 102, the wrist-wearable device 102 continues to cause presentation of the audio data via the speaker that is in communication with the wrist-wearable device 102 and ceases to cause presentation of the video data via the display of the wrist-wearable device. For example, when the wrist-wearable device 102 is moved to a lowered position (which causes the video-video precondition to no longer be present at the wrist-wearable device), the wrist-wearable device 102 can cause one or both of its speakers and the speaker(s) of the smart glasses 150 to present received audio data.

In some embodiments, in accordance with a determination that the wrist-wearable device 102 is in communication with the smart glasses 150, the wrist-wearable device 102 causes the speaker(s) of the smart glasses 150 to present audio data to the user 130 instead of the speaker of the wrist-wearable device 102. In some embodiments, the user 130 selects which speakers to present the audio data (e.g., by manually selecting an audio output via a user interface or predefined user settings). Alternatively, in some embodiments, the wrist-wearable device 102 automatically selects which speaker to present audio data based solely on evaluation of one or more video-viewing preconditions. In some embodiments, the wrist-wearable device 102 automatically selects the speaker to provide a user with an improved experience. For example, in accordance with a determination that (i) the video-viewing precondition is not present at the wrist-wearable device 102 and (ii) the wrist-wearable device 102 is communicatively coupled with the smart glasses 150, the wrist-wearable device 102 can automatically select a speaker communicatively coupled to the wrist-wearable device 102 based on a distance between the respective devices and the user 130's ears (such that the speaker(s) closes to the user's ears are selected to present the audio data to make it easier for the user to hear the audio with less interfering background noise). The above example is non-limiting, different criteria can be used to select a speaker communicatively coupled to the wrist-wearable device 102. For example, the wrist-wearable device 102 can automatically select a speaker communicatively coupled to the wrist-wearable device 102 based on each device's battery life, operating temperature, computing resources, availability (described below in reference to FIGS. 4A-4C), and/or other factors. In some embodiments, in accordance with a determination that the wrist-wearable device 102 is communicatively coupled with smart glasses 150, the speaker that is in communication with the wrist-wearable device that is used to present the audio data is always a speaker coupled with the smart glasses. Alternatively, in some embodiments, in accordance with a determination that the wrist-wearable device 102 is not communicatively coupled with smart glasses, the speaker that is in communication with the wrist-wearable device 102 that is used to present the audio data is always a speaker directly coupled with the wrist-wearable device 102.

In alternative embodiments in which the smart glasses 150 (or other head-worn wearable device) have an integrated display 155, ceasing to cause presentation of the video data via the display 115 of the wrist-wearable device can also include, in accordance with a determination that the smart glasses 150 are communicatively coupled with the wrist-wearable device 102, causing presentation of the video data at the display 155 of the smart glasses 150. For example, when the wrist-wearable device 102 is moved to a lowered position (e.g., the video-viewing precondition is no longer present at the wrist-wearable device), the wrist-wearable device 102 can cause the smart glasses 150 to present received audio data and video data (e.g., via the speaker(s) and the display 155).

Additionally, in some embodiments, in conjunction with the determination that the video-viewing precondition is no longer present at the wrist-wearable device 102, in accordance with a determination that the wrist-wearable device 102 is communicatively coupled with smart glasses 150 worn by the user 130 that include a microphone of the smart glasses, the wrist-wearable 102 causes the smart glasses 150 to capture further audio data via the microphone at the smart glasses 150 and sends the further audio data to the device associated with the at least one other user (via a network, and, in some instances, also via an intermediary device and/or via the wrist-wearable device) in conjunction with the video call. In some embodiments, in accordance with a determination the wrist-wearable device 102 is in communication with the smart glasses 150, the wrist-wearable device 102 causes only the microphone of the smart glasses 150 to capture audio data instead of the microphone of the wrist-wearable device 102.

As described above in reference to FIG. 1C, in some embodiments, while the video call is ongoing and a video-capturing precondition is present at the wrist-wearable device 102, the wrist-wearable device 102 captures additional video data via an image sensor 135 integrated with the wrist-wearable device 102 and additional audio data via a microphone at the wrist-wearable device 102, and sends the additional video data and the additional audio data to a device associated with the at least one other user participating in the video call. In some embodiments, in accordance with a determination that the video-capturing precondition is no longer present at the wrist-wearable device 102, the wrist-wearable device 102 ceases to capture the additional video data via the camera integrated with the wrist-wearable device 102. In other words, the techniques described herein allow for a sequence of coordinated usage of hardware components at multiple devices (e.g., hardware of a wrist wearable device and hardware of a head-worn wearable device, such as smart glasses) to allow for seamlessly (and automatic, without user intervention or express user requests) switching to use the different components based on monitoring sensor data (at either or both of the multiple devices) to determine whether video-viewing and video-capturing preconditions are satisfied. Some other examples of this are provided below.

In some embodiments, in conjunction with the determination that the video-capturing precondition is no longer present at the wrist-wearable device 102, in accordance with a determination that the wrist-wearable device 102 is communicatively coupled with smart glasses 150 worn by the user 130, the wrist-wearable 102 causes the capture of further video data via the imaging device 169 (e.g., a camera) integrated with the smart glasses 150 and sends the further video data to the device associated with the at least one other user in conjunction with the video call. In some embodiments, in accordance with the determination that that wrist-wearable device 102 is communicatively coupled with the smart glasses 150, the wrist-wearable device 102 causes the capture of the further audio data via the microphone at the smart glasses 150 and sends the further audio data to the device associated with the at least one other user in conjunction with the video call. In this way, the smart glasses 150 can be caused to capture video data via the imaging device 169. In some embodiments, if the smart glasses 150 do not include an integrated imaging device 169, the wrist-wearable device 102 only causes the capture of audio data via the microphone of the smart glasses 150 (instead of the microphone integrated on the wrist-wearable device 102).

In some embodiments, in conjunction with the determination that the video-capturing precondition is no longer present at the wrist-wearable device 102, in accordance with a determination that the wrist-wearable device 102 is not communicatively coupled with smart glasses 150 worn by the user 130, the wrist-wearable device 102 sends only the additional audio data to the device associated with the at least one other user in conjunction with the video call.

In some embodiments, the smart glasses 150 (or other head-worn wearable device) receive an instruction from the wrist-wearable device 102 that causes the one or more processors of the smart glasses 150 to activate the camera (e.g., imaging device 169) for use in capturing video data in conjunction with a video call initiated at the wrist-wearable device 102. The instruction is sent by the wrist-wearable device 102 in accordance with a determination that a video-capturing precondition is not present at the wrist-wearable device 102. In response to receiving the instruction, the smart glasses 150 activate the camera and provide video data captured by the camera to the wrist-wearable device 102 (or to an intermediary device coordinating communications between the two devices) until an additional instruction is received from the wrist-wearable device 102 (or from the intermediary device) that causes the one or more processors of the smart glasses 150 to cease providing the video data captured by the camera to the wrist-wearable device 102 in conjunction with the video call. The additional instruction is sent by the wrist-wearable device 102 (or the intermediary device) in accordance with a determination that the video-capturing precondition is present at the wrist wearable device 102 and upon receiving the additional instruction, the smart glasses 150 cease to provide the video data captured by the camera to the wrist-wearable device 102. As noted, the smart glasses 150 can receive instruction from intermediary devices facilitating communications between the wrist-wearable device and the head-worn wearable device, such as tablets, smart phones, laptops, or other electronic devices.

In some embodiments, the instruction received by the smart glasses 150 further cause the one or more processors of the smart glasses 150 to activate its microphone for use in capturing audio data. In some embodiments, the instructions received by the smart glasses 150 further cause the one or more processors of the smart glasses 150 to activate the speaker(s) for use in presenting audio data received at the wrist-wearable device 102. In some embodiments, the additional instruction causes the one or more processors of the smart glasses 150 to also cease providing the audio data. In some embodiments, the additional instruction causes the one or more processors of the smart glasses 150 to also cease presentation of audio data received at the wrist-wearable device 102 (or at the intermediary device described above).

In some embodiments, no determinations as to whether smart glasses 150 are or are not communicatively coupled is conducted at all (e.g., for embodiments in which a user 130 does not own any smart glasses 150, the wrist-wearable device 102 can be aware of this and avoid conducting any other determinations as to presence or absence of smart glasses 150) and instead, in accordance with the determination that the video-capturing and/or video-viewing preconditions are no longer present at the wrist-wearable device 102, the wrist-wearable device 102 proceeds to cease capturing the additional video data and to send only the additional audio data in conjunction with the video call (and/or, for the video-viewing precondition, ceases to present video data and switches to only present audio data).

In some embodiments, indicators are also provided on either or both of the displays of the wrist-wearable device and the smart glasses to indicate the hardware components that are being currently utilized. For instance, in the example of FIG. 1E in which a determination is made that applicable video-viewing and video-capturing preconditions are not present at the wrist-wearable device and that the wrist-wearable device is communicatively coupled with smart glasses 150 (as shown visually by the lightning bolt), the display 155 of the smart glasses 150 provides indications to the user 130 with a video-capturing indicator 171, audio-capturing indicator 173, and/or audio-presentation indicator 165 to provide the user 130 with quickly-interpretable indicators that a camera, microphone, and speaker, respectively, of the smart glasses are being utilized in conjunction with an ongoing video call. In some embodiments, the video-capturing indicator 171 is displayed in a first color (e.g., green), the audio-capturing indicator 173 is displayed in a second color (e.g., yellow), and the audio-presentation indicator 165 is displayed in a third color (e.g., red). Each respective indicator is only displayed once the corresponding hardware of that device is being utilized. Alternatively, in some embodiments, when the corresponding hardware is not being utilized, the applicable indicator can be displayed with a level of transparency to indicate an inactive state. In some embodiments, the smart glasses 150 is caused to transmit the captured audio and/or video data to an intermediary device or transmits the captured audio and/or video data directly to the wrist-wearable device 102, either of which device then transmits the captured audio and/or video data to a counterpart device for one or more other users participating in the video call (e.g., the computing device 350, FIG. 3A).

Figure 1F:
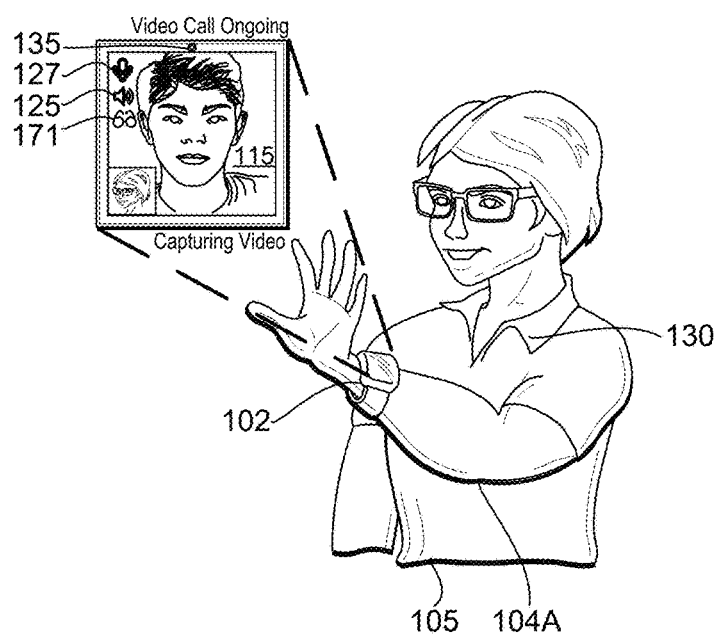

Turning to FIG. 1F, the pertinent video-viewing and video-capturing preconditions are again present at the wrist-wearable device in this example, e.g., because the wrist-wearable device is back in a raised position 104A. As such, the wrist-wearable device 102 is then configured to cease causing the smart glasses 150 to transmit, present, and receive audio data and/or video data when the one or more video-capturing preconditions and/or the one or more video-viewing preconditions are once again present at the wrist-wearable device 102. In other words, the wrist-wearable device 102 communicatively coupled to smart glasses 150 is configured to allow the user 130 to seamlessly switch, or automatically switch between presenting audio data and/or video data at the wrist-wearable device 102, the smart glasses 150 (or other head-worn wearable device), or a combination of both. In some embodiments, once hardware of the wrist-wearable is again utilized in conjunction with the video call, the indicators 171, 173, and 165 can be displayed at the wrist-wearable device instead of the smart glasses. In some embodiments, the wrist-wearable device can be configured to provide one or more of the indicators even when its corresponding hardware is not being utilized, such that that indicator 171 can be presented on the display of the wrist-wearable device while the camera of the smart glasses is being utilized (the reverse can also be true in that indicators at the smart glasses can be presented to indicate that hardware of the wrist-wearable device is being utilized in conjunction with the video call).

In some embodiments, the wrist-wearable device 102 communicatively coupled to the smart glasses 150 can cause the smart glasses 150 to transmit, receive, capture, and/or present audio data and/or video data to conserve battery power, conserve computing resources, maintain its operating temperature at safe operating temperatures, and a number of other benefits. In some embodiments, the wrist-wearable device 102 communicatively coupled to the smart glasses 150 can cause the smart glasses 150 to transmit, receive, capture, and/or present audio data and/or video data to provide the user 130 an improved user experience. In particular, the smart glasses 150 can be used by the wrist-wearable device 102 (or other devices including the functionality of the wrist-wearable device 102 as described herein) to enable the user 130 to have a personalized experience with easy access to their audio data and/or video data as well as a platform to capture and share their audio data and/or video data.

FIGS. 1G-1J illustrate the user 130 transmitting and receiving audio data and/or video data using a portable device 103, in accordance with some embodiments. In some embodiments, the portable device 103 monitors sensor data to sense when a user 130 changes a position of the portable device 103, which positional changes cause the portable device 103 to automatically switch (e.g., without an express user request to do the switching) between video and other modes (e.g., an audio-only mode and other modes that make use of components of another device, such as a head-worn wearable device) at the portable device 103. The portable device 103 can include one or more sensors described below in reference to FIG. 10. The portable device 103, similar to the wrist-wearable device 102 described above in reference to FIGS. 1A-1D, is configured to receive and present video and/or audio data via a display 115 and a speaker, as well as capture video data and/or audio data, via an image sensor 135 (e.g., a camera) and a microphone. The portable device 103 is also configured to send the captured data to another device (e.g., computing device 350; FIGS. 3A-3F) distinct from the portable device 103.

Figure 1G:
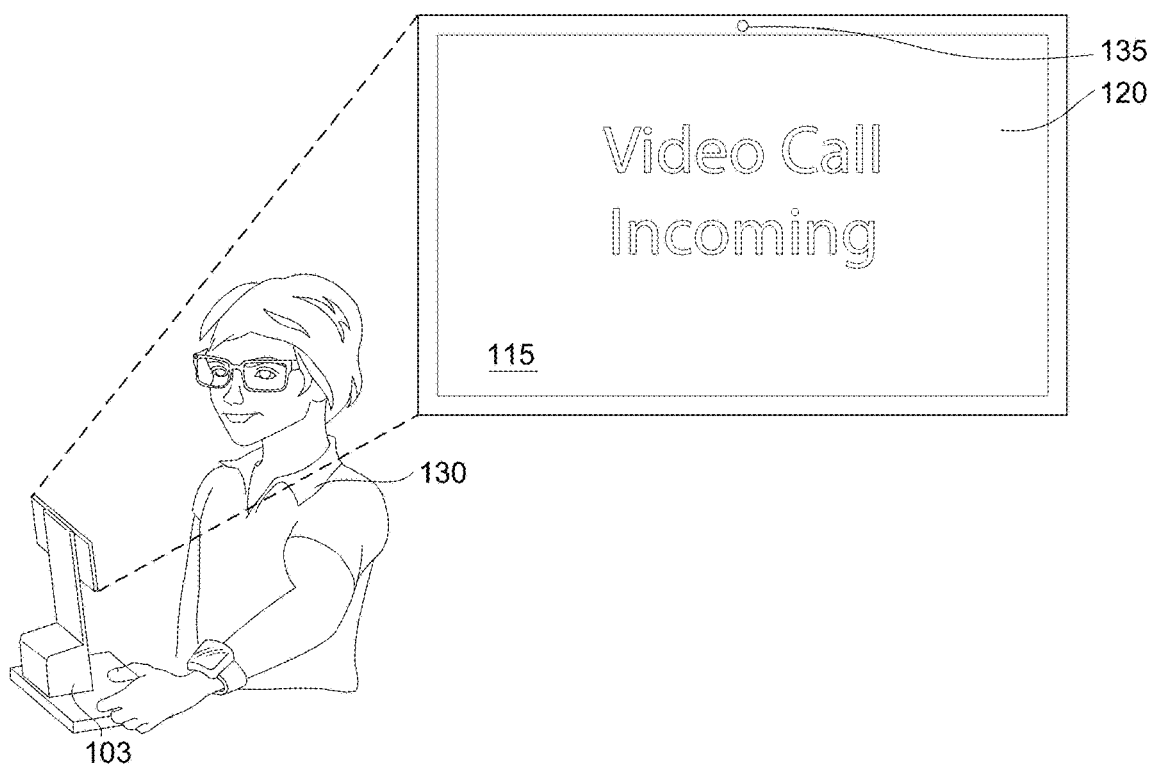
FIGS. 1G-1J, illustrate a portable device of a user transmitting and receiving audio data and/or video data in conjunction with an ongoing video call, in accordance with some embodiments. Further.
Figure 1H:
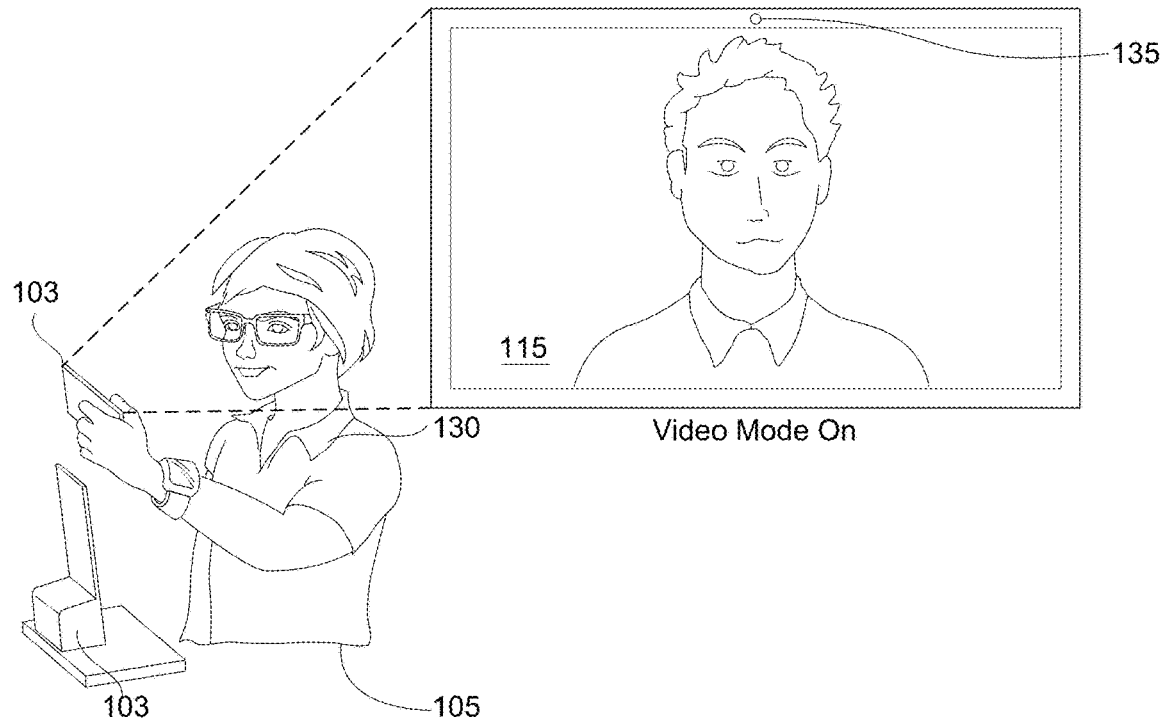

In some embodiments, audio and/or video data is presented at the portable device 103 in accordance with a determination, by the portable device 103, that one or more video-viewing preconditions are present. For example, as shown in FIG. 1G, the user 130 can receive, at the portable device 103, a video call. In some embodiments, the portable device 103 presents on its display 115 a user interface element 120 that provides a notification to the user 130 of the incoming video call (e.g., text within the user interface that states "Video Call Incoming"). The user 130 then accepts the video call. While the video call is incoming, the portable device 103 monitors sensor data to make determinations as to whether one or more video-viewing preconditions are present at the portable device 103. As described above, when video-viewing preconditions are present, the portable device 103 is caused to automatically switching between video and other modes (e.g., including an audio-only mode) during the ongoing video call. When the portable device 103 determines that the video-viewing precondition is present at the portable device 103, the portable device 103 causes presentation of video data on its display 115 as shown in FIG. 1H. More specifically, the portable device 103, based on a determination that video-viewing preconditions are present (e.g., display 115 of the portable device 103 is raised above the user 130's waist or midsection 105), causes received video data to be presented via the display 115 of the portable device 103. In some embodiments, the portable device 103 presents on its display 115 another user interface element that notifies the user 130 that video mode is on.

Figure 1I:
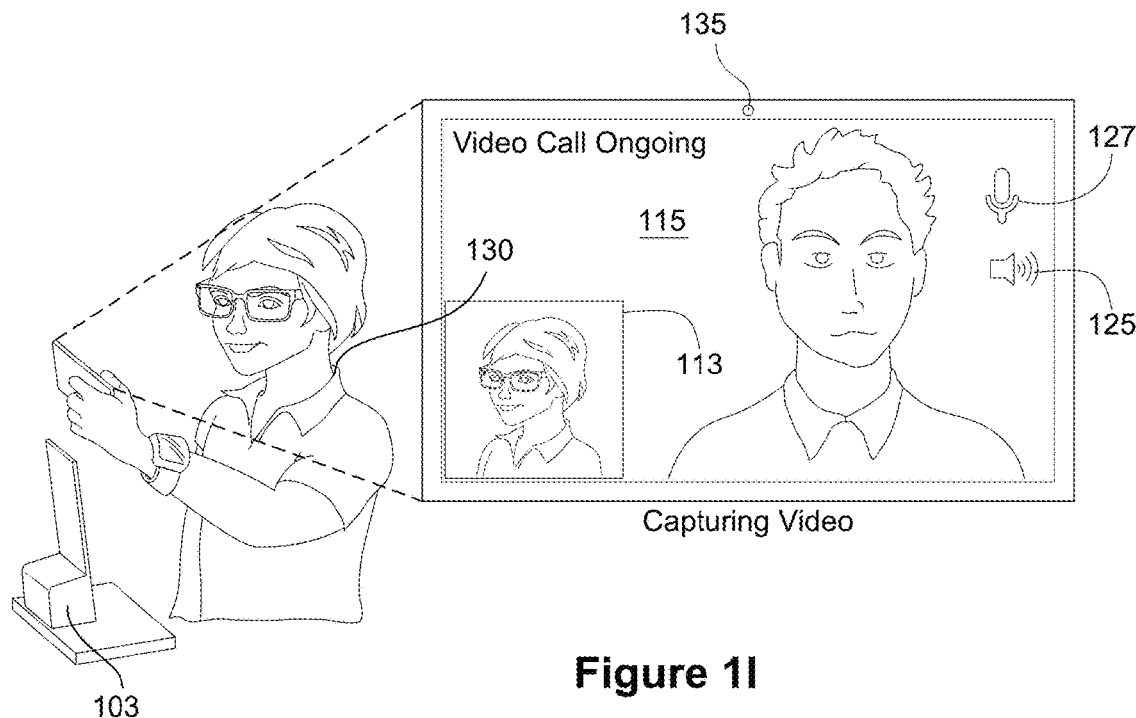

As shown in FIG. 1I, in some embodiments, the portable device 103 is configured to capture audio and/or video data and to send (by way of a network) the data to a remote user (e.g., to a computing device 350 (FIG. 3A) associated with another user distinct from user 130). In some embodiments, indicators 127 and/or 125 are presented on the display 115 of the portable device 103 to provide the user with a visual indication as to whether audio is being presented (e.g., via speaker indicator 125) and/or audio is being collected by a microphone (e.g., via microphone indicator 127). Similarly, in some embodiments, the portable device 103 captures, via an image sensor 135, and sends (by way of a network) captured video data to a remote user. In some embodiments, the user 130 is notified of an ongoing capture via a notification presented on the display 115 (e.g., Video call Ongoing"), as well preview 113 of the capture video data. The portable device 103 is configured to remain in video mode and/or capture mode while video-viewing preconditions are present and/or one or more conditions described above in reference to FIGS. 1A-1D are satisfied.

Figure 1J:
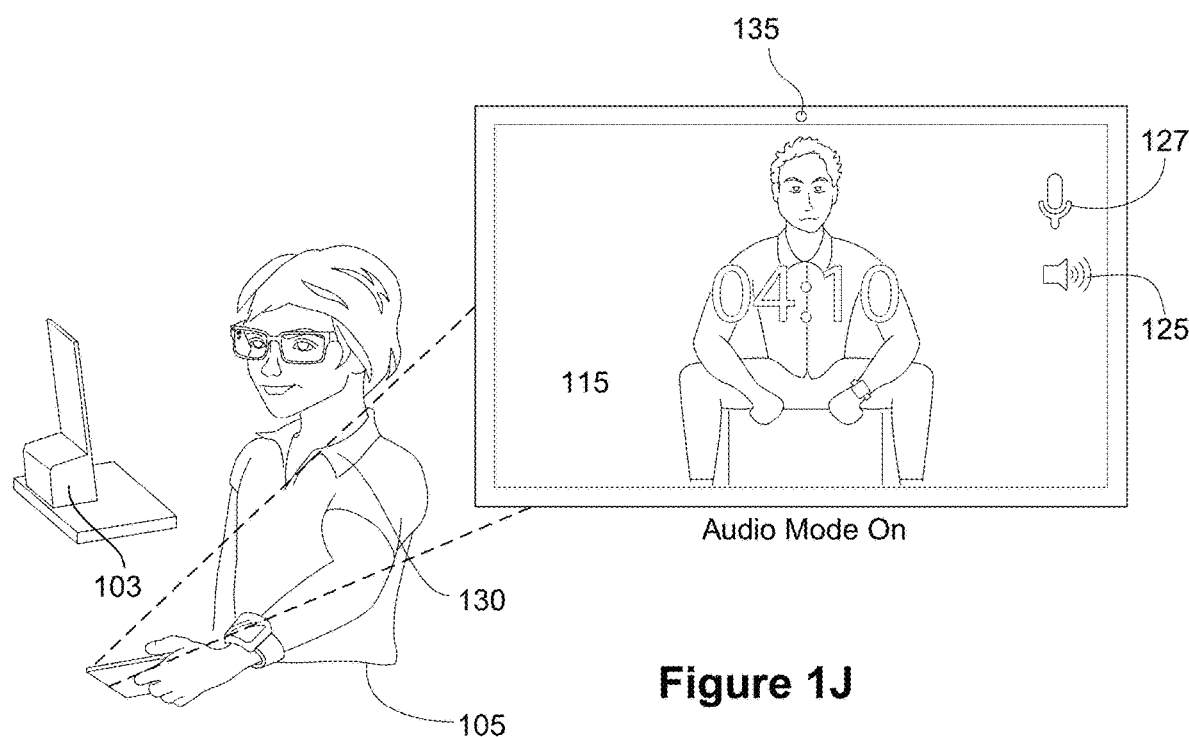

When the video-viewing preconditions are not present, the portable device 130 can switch to an audio only mode. For example, as shown in FIG. 1J, when the one or more video-capturing preconditions are not present (e.g., the user 130 drops the display 115 of the portable device 103 to or below their waist or midsection 105), the portable device 103 ceases to capture and/or present video data while still presenting, capturing and sending audio data. The portable device 103 can switch automatically between audio and video modes based on the presence of one or more video-viewing preconditions. Additional information on the video-viewing preconditions, the audio mode, and the video mode are provided above in reference to FIGS. 1A-1D.

Figure 1K:
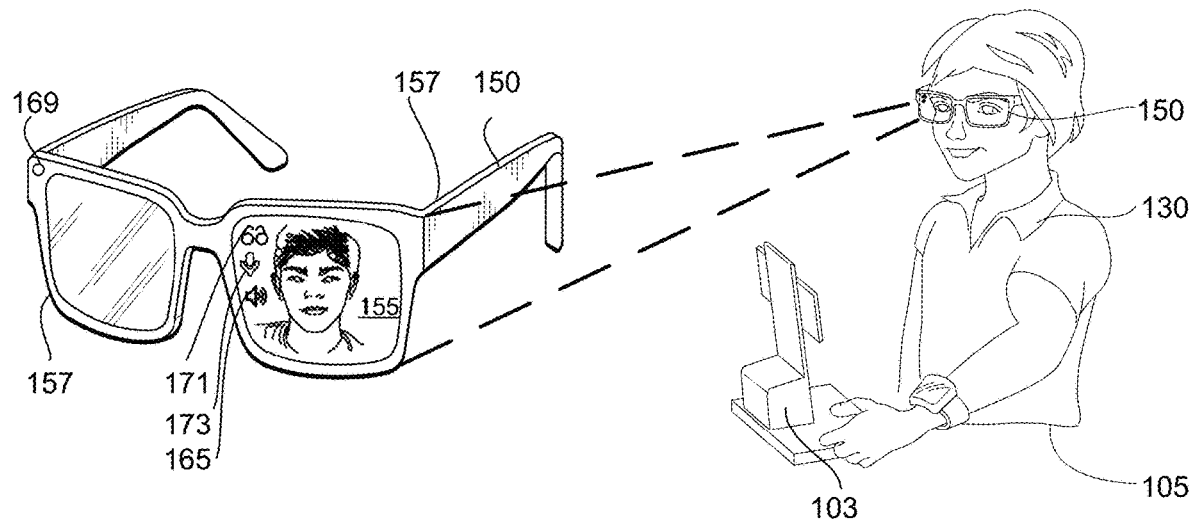
FIGS. 1K-1L illustrate an example of the portable device operating in a coordinated fashion with a head-worn wearable device (in this example, a pair of smart glasses), in accordance with some embodiments.
Figure 1L:
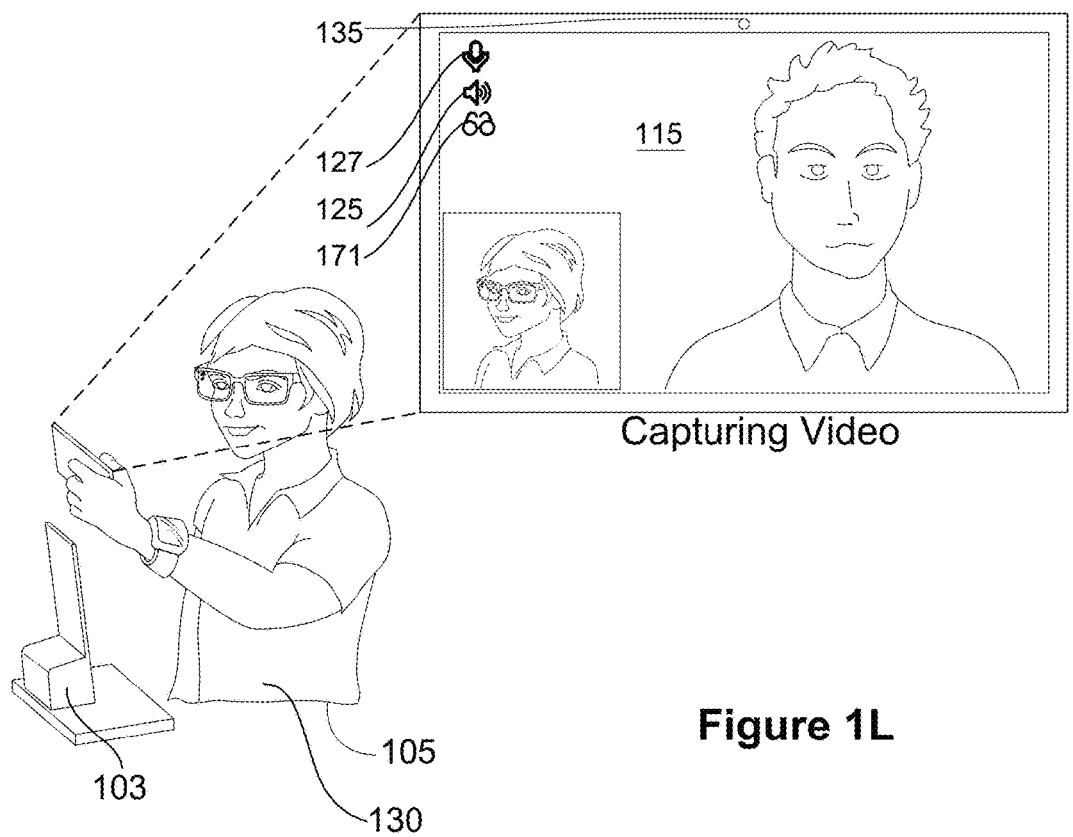

FIGS. 1K-1L show the interaction between a portable device and another communicatively coupled device, in accordance with some embodiments. For example, as shown in FIG. 1K, the portable device 103 is communicatively coupled with smart glasses 150. As described above in reference to FIGS. 1E and 1F, the smart glasses 150 include speakers, a microphone, an integrated display 155, and an imaging device 169 (e.g., a camera or other type of image sensor), and can cause the presentation, capture, and transmission of audio and/or video data. The one or more components of the smart glasses 150 can be integrated and/or coupled to a part of a frame 157 of the smart glasses 150. Similar to the interaction between the wrist-wearable device 102 and the smart glasses 150, the portable device 103 is configured to cause the smart glasses 150 to one or more of capture, receive, and present one or both of audio data and video data. Particularly, in some embodiments, the portable device 103 can cause the smart glasses 150 to capture and receive audio data and/or video data in accordance with a determination that the one or more video-capturing preconditions and/or the one or more video-viewing preconditions are not present at the portable device 103.

As further shown in FIG. 1K, in accordance with a determination that video-viewing and/or video-capturing preconditions are not present at the portable device 103, the portable device 103 can cause presentation of the audio data and video data via the smart glasses 150. The smart glasses 150 can provide a video-capturing indicator 171, audio-capturing indicator 173, and/or audio-presentation indicator 165 to the user 130 when audio data is being presented, captured, and/or transmitted.

When the video-viewing and/or video-capturing preconditions are present at the portable device 103, the portable device 103 can switch the presentation, capture, and transmission of audio data and/or video data from the smart glasses 150 to itself. For example, as shown in FIG. 1L, when video-viewing and/or video-capturing preconditions are again present at the portable device 103 (e.g., display 115 of the portable device 103 raised above the user 130's midsection 105), the portable device 103 causes the smart glasses 150 to cease capturing, transmitting, and presenting audio data and/or video data and starts to capture, transmit, and present audio data and/or video data via its own speakers, microphone, and image sensor 135. The portable device 103 can provide the user 130 with a visual indication as to whether audio is being presented (e.g., via speaker indicator 125), audio is being collected by a microphone (e.g., via microphone indicator 127), and/or video is being captured (e.g., via video-capturing indicator 171).

Additional information on the interaction between at least two communicatively coupled device based on the presence of video-capturing preconditions and/or video-viewing preconditions is provided above in reference to FIGS. 1E-1F.

The above examples of video-viewing preconditions and video-capturing preconditions examples are non-exhaustive. In some embodiments, one or more video-viewing preconditions and video-capturing preconditions are the same (e.g., the same preconditions are used to determine both when to allow viewing of video data at the wrist-wearable device 102 and when to allow capturing of video data at the wrist-wearable device 102). Alternatively, one or more video-viewing preconditions and video-capturing preconditions are distinct (e.g., at least one different precondition is used to determine when to allow viewing of video data or when to allow capturing of video data, such that video data can be presented but not captured at the wrist-wearable device 102 or captured but not presented at the wrist-wearable device 102). Moreover, video-viewing and video-capturing preconditions can be separate preconditions (e.g., different satisfaction of different preconditions, which can be based on sensor data, leads to separate satisfaction of the video-viewing and video-capturing preconditions), can be the same preconditions (e.g., satisfaction of the same preconditions, which can be based on sensor data, leads to satisfaction of both of the video-viewing and video-capturing preconditions), can be device-specific preconditions (e.g., different conditions, which can be separately evaluated, for different types of devices), can be preconditions satisfied based on conditions at different devices evaluated together, and combinations thereof. Additional examples of the video-viewing preconditions and video-capturing preconditions are provided below in reference to FIGS. 2A-4.

FIG. 2A illustrates a smart-video presentation process 201 for providing video and/or audio data to a user based on presence or absence of one or more video-viewing preconditions at the wrist-wearable device, in accordance with some embodiments. The depicted process can be implemented as a smart-video-presentation management algorithm, which can be executed by one or more processors of the wrist-wearable device 102 while a video call is ongoing at the wrist-wearable device 102. In accordance with the illustrated process, the wrist-wearable device 102 is configured to automatically turn video presentation off and on at the wrist-wearable device 102 during an ongoing video call based on determinations concerning presence or absence of one or more video-viewing preconditions (e.g., based on the data from the one or more sensors (discussed below in FIG. 10)).

Figure 10:
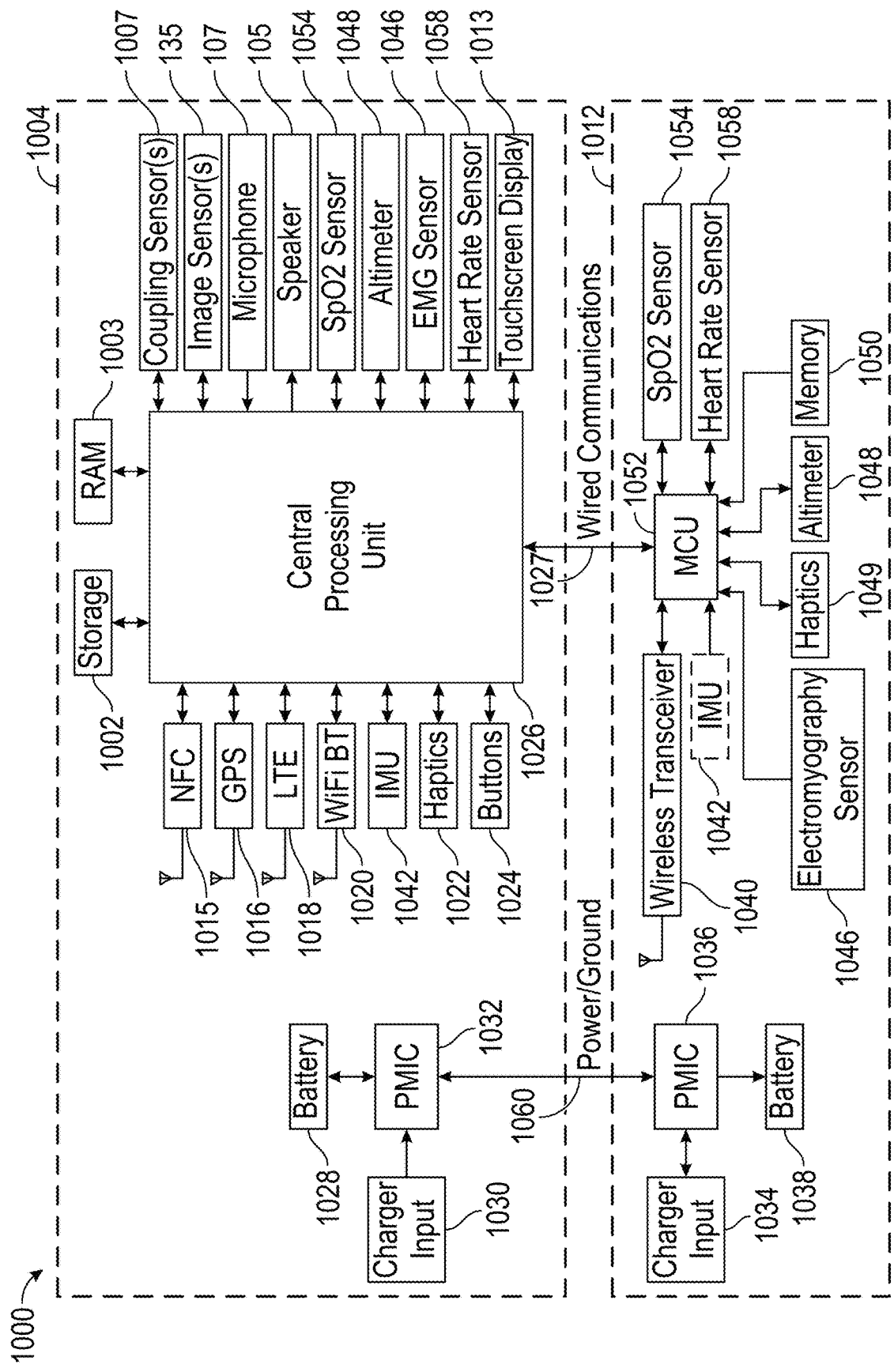
FIG. 10 is a block diagram of a wrist-wearable device system, according to at least one embodiment of the present disclosure.

At "start" point 202 a display 115 of the wrist-wearable device 102 presents video and audio data in accordance with a determination (which determination is conducted automatically and without instructions from the user) that one or more video-viewing preconditions are present at the wrist-wearable device 102. The determination that the one or more video-viewing preconditions are present at the wrist-wearable device 102 is based on data sensed by the one or more sensors (various example sensors are shown in FIG. 10) as described above in reference to FIGS. 1A-1F. For example, during an ongoing video call, the wrist-wearable device 102 activates a video mode 206 when it detects, via the one or more sensors, that the one or more video-viewing preconditions are present (e.g., data from the one or more sensors, including data from an inertial measurement unit (IMU) indicates that a wrist of the user 130 on which the wrist-wearable device 102 is worn is raised to at least the predetermined raised position discussed above).

While video mode 206 is active, the wrist-wearable device 102 presents the video data (via the display 115) and audio data (via a speaker; FIG. 10) to the user. In some embodiments, the wrist-wearable device 102 presents the video data on an entirety of its display 115. In alternative embodiments, the wrist-wearable device 102 presents the video data on a portion of its display 115. In some embodiments, when the video mode 206 is turned on, the display will automatically adjust the display brightness (e.g., increase the display to the highest setting or adjust the brightness based on ambient lighting conditions (e.g., detected by one or more sensors FIG. 10)). In some embodiments, the brightness will be the highest possible display brightness as determined by the surrounding ambient lighting conditions to ensure proper viewing of the video data.

As further shown in FIG. 2A, the wrist-wearable device 102 deactivates (or turns off) the video mode 206 when the one or more video-viewing preconditions are not present (an example scenario in which the one or more video-viewing preconditions are no longer present is illustrated in FIG. 1D). When the video mode 206 is turned off, the wrist-wearable device 102 operates in a different calling mode (e.g., in this example, an audio-only calling mode 210 during which only audio data (and/or other non-video data, such as text or a display color) is presented by the wrist-wearable device 102). For example, in some embodiments, the wrist-wearable device 102 can determine, based on data obtained from the sensors, that the video-viewing preconditions are not present (e.g., in the example of FIG. 1D, the wrist of the user 130 has been lowered to a position below the raised position (and below the predetermined raised position discussed above) such that the one or more video-viewing precondition are no longer present). In the above example, because one or more video-viewing preconditions have not been met, the video mode 206 is disabled and the audio-only mode 210 is activated.

In some embodiments, the audio-only mode 210 includes providing or displaying, via the display 115, textual or non-video information about a video or audio call (e.g., indicating that the audio-only mode 210 is active, providing call information (e.g., caller ID, call length), etc.). For example, the display 115 can present the amount of time that the user has been on the call with another person. In some embodiments, the display 115 can present the name of the person that the user is speaking with. In some embodiments, the display 115 can present an image of the person that the user is speaking with. In some embodiments, when the wrist-wearable device 102 is in the audio-only mode 210, the display brightness is lowered. The brightness can be lowered to conserve battery life, power, keep the temperature of the wrist-wearable device 102 cooler, etc. In some embodiments, while the wrist-wearable device 102 is in the audio-only mode 210, the display 115 brightness is lowered to the lowest possible display brightness.

In some embodiments, the wrist-wearable device 102 periodically (e.g., once every 20 ms) determines whether the one or more video-viewing preconditions are present, and if the one or more video-viewing preconditions are present, the wrist-wearable device 102 reactivates the video mode 206. For example, while a video call is ongoing and the wrist-wearable device 102 is in the audio-only mode 210, the wrist-wearable device 102 will periodically determine whether the one or more video-viewing preconditions are once again present (by evaluating sensor data), and in accordance with a determination that the one or more video-viewing preconditions are present, the wrist-wearable device 102 will once again present audio and video data to the user of the wrist-wearable device 102. In this way, the wrist-wearable device 102 adaptively presents audio and/or video data of the user 130 based on the sensor data. In some embodiments, a sensor-based trigger (e.g., a threshold amount of temperature change at the wearable device or a threshold amount of movement of the wearable device indicating a potential change in position, and other like sensor-based triggers) can be used in addition to, or as an alternative to, a periodic or interval-based determination as to presence or absence of the one or more video-viewing preconditions.

While the example of FIG. 2A is described with reference to an audio-only mode at the wrist-wearable device, a similar process is also utilized to switch from using the video calling mode to one of the other calling besides, including another calling mode in which hardware of a head-worn wearable device is used instead of analogous hardware at the wrist-wearable device. Examples of this were described above and are not repeated for brevity, but it should be understood that those examples could be utilized in conjunction with the smart-video presentation process 201 either as alternatives to, or in addition to, use of an audio-only calling mode.

FIG. 2B illustrates a smart-video capturing process 203 for capturing video and/or audio data from a user based on one or more video-capturing preconditions, in accordance with some embodiments. As described above, the video can be captured via an image sensor 135, and the audio data can be captured via a microphone. Like FIG. 2A, the depicted process can be implemented as a smart-video-capturing algorithm, which can be executed by one or more processors of the wrist-wearable device 102 while a video call is ongoing at the device 102. In accordance with the illustrated process, the wrist-wearable device 102 is configured to automatically turn the video capturing off and on at the device 102 during an ongoing video call based on determinations concerning presence or absence of one or more video-capturing preconditions (e.g., based on the data from the one or more sensors (FIG. 10).

At "start" point 252 the wrist-wearable device 102 is in video capture-mode 406 and captures video and audio data. In some embodiments, the wrist-wearable device 102 activates the video-capture mode 256 in accordance with a determination (which determination is conducted automatically and without instructions from the user) that the one or more video-capturing preconditions are present at the wrist-wearable device 102. The determination that the one or more video-capturing preconditions are present at the wrist-wearable device 102 are based on the data sensed by the one or more sensors (FIG. 10). For example, during an ongoing video call, the wrist-wearable device 102 activates a video-capture mode 256 when it detects, via the one or more sensors, that the wrist of the user 130 is raised to at least the predetermined raised position. As compared to the video-viewing preconditions, in some circumstances, the video-capturing preconditions include a precondition that is satisfied when sensor data indicates that the wrist-wearable device is in a raised position but do not include a precondition related to a tilt position of the wrist-wearable device (thus, the video-capturing precondition can be satisfied under such circumstances, even when the video-viewing precondition is not satisfied). Additional examples are also within the scope of this disclosure, including different video-viewing and video-capturing preconditions for different types of devices, each of which can be separately evaluated.

In some embodiments, the wrist-wearable device 102 periodically determines whether the one or more video-capturing preconditions are present (e.g., every 20 ms while a video calling is ongoing), and if the one or more video-capturing preconditions are present, the wrist-wearable device 102 captures, via image sensor 135 (e.g., a camera) and/or a microphone, video data and audio data, respectively. The wrist-wearable device 102 further transmits (or sends) the captured video data and/or audio data to one or more other devices (e.g., devices distinct from the wrist-wearable device 102, such as computing device 350 of a counterpart video-calling participant). For example, while a video call is ongoing, the wrist-wearable device 102 will periodically determine whether the one or more video-capturing preconditions are present, and in accordance with determining that the one or more video-capturing preconditions are present, the wrist-wearable device 102 will capture and send video data and audio data of the user to a computing device 350 (e.g., via a network). Alternatively, if the one or more video-capturing preconditions are not present, the wrist-wearable device 102 turns the video-capture mode off 260 and captures only audio data, via the microphone. Another example is one described earlier, in which instead of switching to capture audio data only, if it is determined that the wrist-wearable device is communicatively coupled with a head-worn wearable device, hardware of the head-worn wearable device can be used in conjunction with the video call (e.g., a camera, microphone, and/or speaker of the head-worn wearable device can be used in various circumstances). FIG. 2B also shows that in these other examples in which a head-worn wearable device is determined to be communicatively coupled to the wrist-wearable device, and after making use of the camera of the head-worn wearable device for capturing video data for the ongoing video call instead of the camera of the wrist-wearable device, the display of the wrist-wearable device can display indicator 171 to visually indicate that the camera of the head-worn wearable device is being utilized. In this way, the wrist-wearable device 102 adaptively captures audio and/or video data of the user 130 based on the sensor data. For example, the wrist-wearable device 102 can switch between capturing video and audio data and capturing only audio data based on the user raising and lowering their wrist, turning their wrist (and the display 115 and/or imaging sensor 135 away and toward the user, etc.). In some embodiments, the wrist-wearable device 102 determines (concurrently with the determination that the one of the video-viewing preconditions are present) whether one or more video-capturing preconditions are present.

In some embodiments, while the one or more video-capturing preconditions are present, the wrist-wearable device 102 presents the additional video data along with the received video data. In other words, the user's own video (e.g., reflection video in real-time, pre-recorded video, etc.) can be shown on a portion 265 of the display 115 along with video data received from a device of a counterpart video-calling participant (associated with another person (other than the user 130); e.g., computing device 350, FIG. 3A). Alternatively, in some embodiments, while the video call is ongoing and the one or more video-capturing preconditions are present at the wrist-wearable device 102, the user's face is replaced on the portion 265 of the display with an avatar representing the user's face. For example, rather than including only live video data captured by the image sensor 135 at the wrist-wearable device, the additional video data can be modified to include an avatar in place of the user's face as it was captured by the image sensor 135 with the live video data. In this way, the wrist-wearable device 102 conserves battery power by reducing the total amount of information that is presented by the display 115. As discussed below, this avatar-replacement feature can be performed based on a request from a user to do so or can be done automatically, without user input, based on determinations made using additional biometric sensor data (and/or other sensor data) from the one or more sensors.

In some embodiments, the wrist-wearable device also provides haptic feedback each time it switches between calling modes (e.g., from a video calling mode to an audio-only calling mode or to a calling mode in which hardware of a head-worn wearable device is utilized). The haptic feedback can be different depending on which mode is being activated (e.g., different haptic feedbacks are provided for each of (i) video mode; (ii) audio-only mode; and (iii) calling mode in which hardware of the head-worn wearable device is utilized).

As described above, the wrist-wearable device 102 can switch between capturing audio and video data and capturing only video data based on one or more video-capturing preconditions being present or not. For example, in some embodiments, the wrist-wearable device 102 can determine, based on data obtained from the sensors, that the wrist of the user 130 has been lowered to a position below a raised position and below a predetermined raised position (i.e., not satisfying a video-capturing preconditions). In some embodiments, the wrist-wearable device 102 can determine, based on data obtained from the sensors, that the lighting is too bright or that there is not enough lighting to accurately or clearly capture video data of the user such that a video-capturing precondition is not met. In the above examples, because one or more video-capturing preconditions have not been met, the wrist-wearable device 102 captures and sends, to the computing device 350, only audio data (and/or uses a camera from another device, e.g., from a head-worn wearable device, to capture video data for use during the video call). In some embodiments, the wrist-wearable device 102 can send an avatar 275, a saved image, or a pre-recorded video for display at the computing device 350 during the video call.

In some embodiments, the wrist-wearable device 102 periodically determines whether the one or more video-capturing preconditions are present, and if the one or more video-capturing preconditions are present, the wrist-wearable device 102 activates the video-capture mode 256 (i.e., when the one or more video-capturing preconditions are present, the video-capture mode 256 is enabled or turned on again). For example, while a video call is ongoing and the video-capture mode is off 260, the wrist-wearable device 102 will periodically (e.g., once every 20 ms, or each time a sufficient change in sensor data is detected as a triggering condition to conduct the determination again) determine whether the one or more video-capturing preconditions are present, and in accordance with the one or more video-capturing preconditions being present, the wrist-wearable device 102 will capture and send video data and audio data of the user to a computing device 350. In this way, the wrist-wearable device 102 adaptively presents audio and/or video data to the user 130 based on the sensor data. For example, the wrist-wearable device 102 can switch between the video-capture mode on 406 and video-capture mode off 260 based on the user raising and lowering their wrist, turning their wrist (and the display 115 away and toward the user, etc.).

FIGS. 3A-3F illustrate example user interfaces used in conjunction with presenting video-mode data or data for other calling modes based on whether one or more video-viewing preconditions are satisfied at a wrist-wearable device, in accordance with some embodiments. FIGS. 3A-3F also illustrate example user interfaces used in conjunction with capturing video and/or audio data based on whether one or more video-capturing preconditions are satisfied at a wrist-wearable device, in accordance with some embodiments. As described above, the wrist-wearable device 102 can receive audio and/or video data from another device 350 associated with another user during an ongoing video call. In particular, wrist-wearable device 102 communicatively couples with the other device 350 via network 360, which allows the wrist-wearable device 102 and the other device 350 to transmit and receive data with one another. In some embodiments, the wrist-wearable device 102 includes hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocol, including communication protocols not yet developed as of the filing date of this document. Examples of the network hardware are provided below in reference to FIG. 10.

In some embodiments, while in video mode 206 (FIG. 2), the wrist-wearable device 102 monitors the temperature (at the wrist-wearable device 102) via the one or more sensors. In accordance with a determination that a temperature at the wrist-wearable device 102 reaches or exceeds a predefined temperature value (e.g., between 40-50 degrees Celsius), the wrist-wearable device 102 presents, via the display 115, a user interface element (e.g., first warning message 314) notifying the user 130 that the wrist-wearable device 102 needs to cool down. In some embodiments, the warning message 314 includes instructions indicating how a user 130 can lower the temperature of the wrist-wearable device 102. For example, while the wrist-wearable device 102 is the video mode 206 and after determining that the predefined temperature value has been reached or exceeded (e.g., reaching or exceeding a predefined temperature value of greater than 46 degrees Celsius), the wrist-wearable device 102 can present a first warning message 314 instructing the user 130 to either lower their wrist (activating audio-only mode 210 (FIG. 2) or one of the other calling modes described herein that does not use the wrist-wearable device's camera for video-capturing purposes) or manually disable video calling (manually enabling audio-only mode 210 (e.g., by pressing the video toggle button 320 described below in FIG. 3D)) to ensure that the wrist-wearable device 102 is able to cool down. In some embodiments, the wrist-wearable device 102 presents the first warning message 314 after the predefined temperature value has been measured (e.g., sensed via the sensors) for a first period of time (e.g., 4, 4.5, or 5 seconds). In other words, the wrist-wearable device 102 has been at or exceeded the predefined temperature value for a first period of time. In this way, the wrist-wearable device 102 first attempts to prevent excessive battery drain and or damage to other components or the user based on high temperatures by asking the user to take a specified action (e.g., lowering their wrist or arm, or interacting with a user interface on the wrist-wearable device to manually switch to an audio-only mode during the ongoing video call).

Figure 3A:
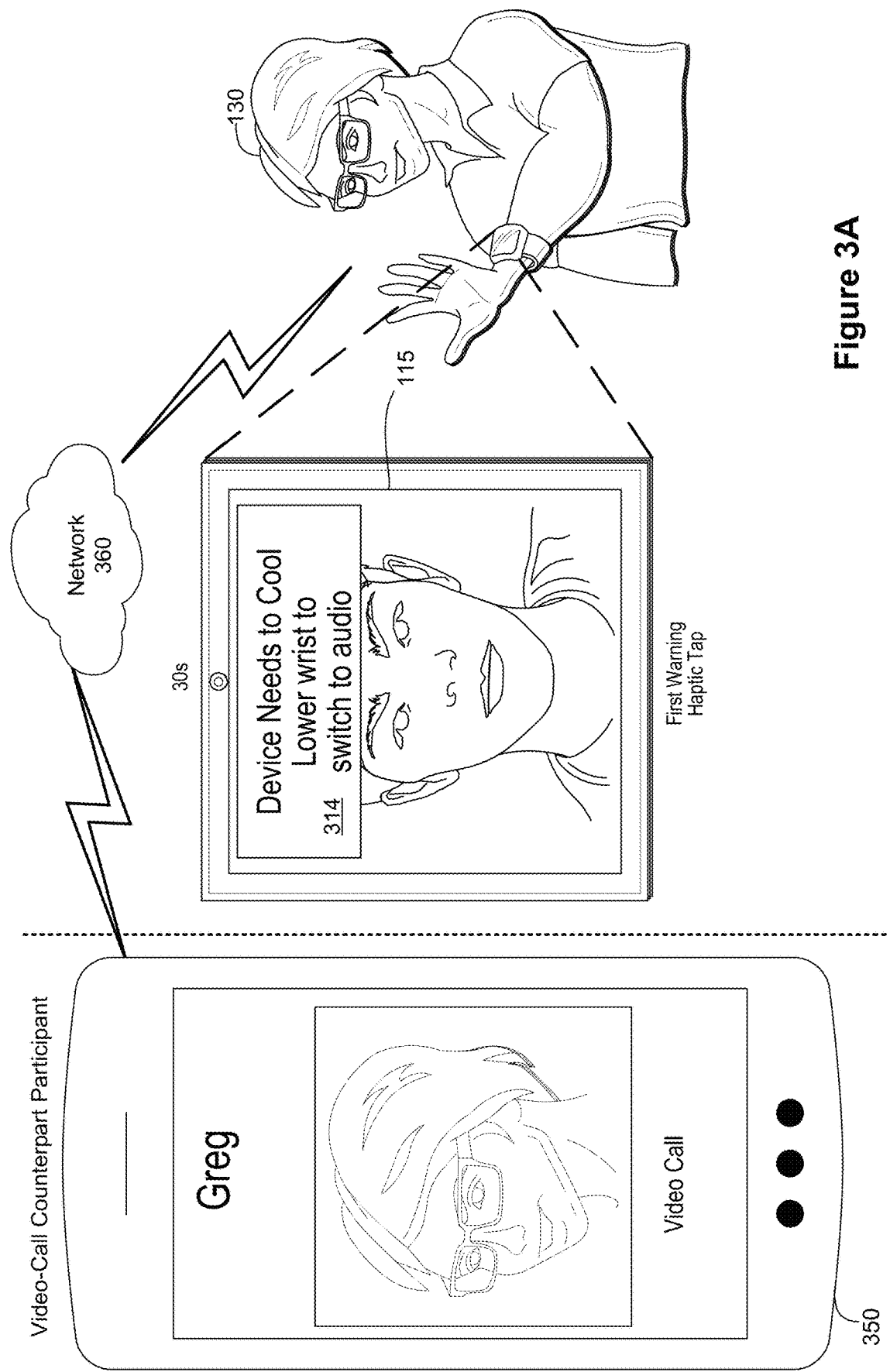
FIGS. 3A-3F illustrate example user interfaces used in conjunction with presenting video or audio-only data based on whether one or more video-viewing preconditions are satisfied at a wrist-wearable device and capturing and sending video and audio data based on whether one or more video-capturing preconditions are satisfied at the wrist-wearable device, in accordance with some embodiments.

As shown in FIG. 3A, the user interface element that includes the warning can be displayed as text that is overlaid on top of the video data that is being presented on the display 115 of the wrist-wearable device 102. While this one example uses a textual warning to the user 130, other embodiments can also use other feedback to provide warnings to a user 130 in conjunction with the textual warning or as alternatives thereto (for instance, an audio warning can be presented, and/or haptic feedback can be provided, etc.). Further, even though the warning message 314 is displayed to the user 130, the wrist-wearable device 102 continues to capture audio and video data and send the captured audio and video data, via the network 360, to the other computing device 350.

Figure 3B:
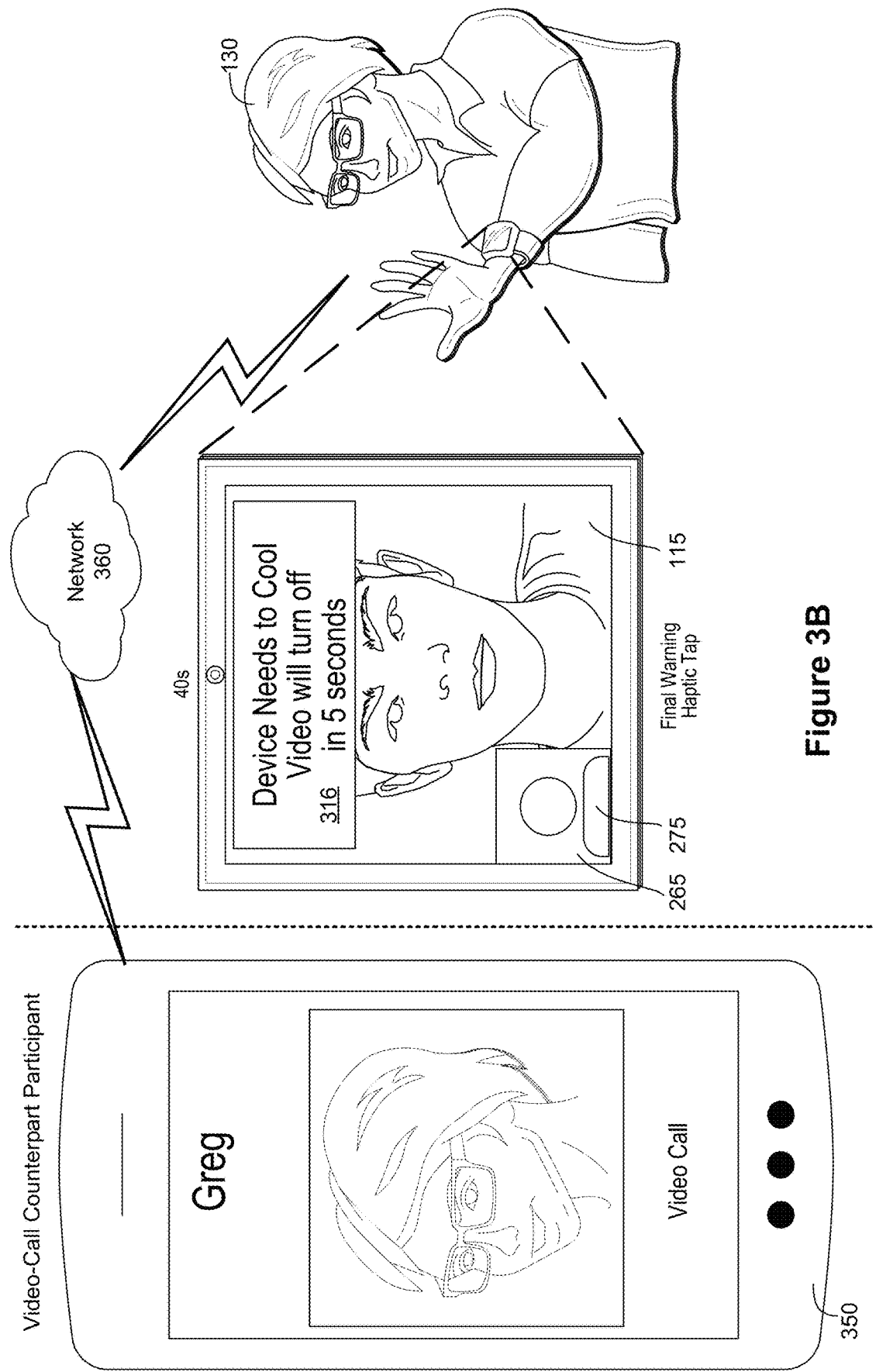

Turning to FIG. 3B, the wrist-wearable device 102 can provide more than one warning message (e.g., second warning massage 316 after having earlier provided first warning message 314). For example, while the wrist-wearable device 102 is in the video mode 206 and after determining that the predefined temperature value has been exceeded for the first period of time, the wrist-wearable device 102 can present a second warning message 316 informing the user 130 that the video will be disabled after a second period of time (e.g., 5 seconds). When the video is disabled, the wrist-wearable device 102 switches to audio-only mode 210 (or to a calling mode in which hardware at another device is utilized) to allow the wrist-wearable device 102 to cool down. In some embodiments, the video mode 206 can be turned off (and replaced with the audio-only mode 210), by the user 130 selecting (e.g., tapping on top of) the second warning message 316. The second warning message can also be dismissed by closing (e.g., swiping up, selecting an exit box, etc.) the second earning message 316. In some embodiments, the wrist-wearable device 102 presents the second warning message 316 after the predefined temperature value has been measured (e.g., sensed via the sensors FIG. 10) for an additional period of time (in this case 10 seconds expiration of the first period of time has already expired). In other words, the wrist-wearable device 102 has been at or exceeded the predefined temperature value for the first period of time plus the additional period of time. In some embodiments, the first and additional periods of time can be dynamically adjusted based on battery life of the wrist-wearable device 102 (e.g., increasing or decreasing these periods of time based on the remaining battery life) and/or based on power consumption at the wrist-wearable device 102 (e.g., increasing or decreasing these periods of time based on the power being used by the wrist-wearable device 102).

In some embodiments, each warning message is associated with a different predefined temperature value. For example, the first warning message 314 can be associated with a first predefined temperature value (e.g., 42 degrees Celsius) and the second warning message 316 can be associated with a second predefined temperature value greater than the first predefined temperature value (e.g., 46 degrees Celsius).

In some embodiments, the wrist-wearable device 102 can replace the user's own video (e.g., reflection video in real-time, pre-recorded video, etc.) shown on portion 265 of the display 115, with the user's avatar 275 or a saved image. This allows the wrist-wearable device 102 to continue to capture and send audio and video data to the other computing device 350, via the network 360, while also conserving energy and processing power by limiting the amount of information that is presented to the user 130 via the display 115. In some embodiments, the user 130 can manually enable the data presented in the portion 265 of the display 115 (e.g., their captured image data, avatar, saved image, pre-recorded image, etc.).

Figure 3C:
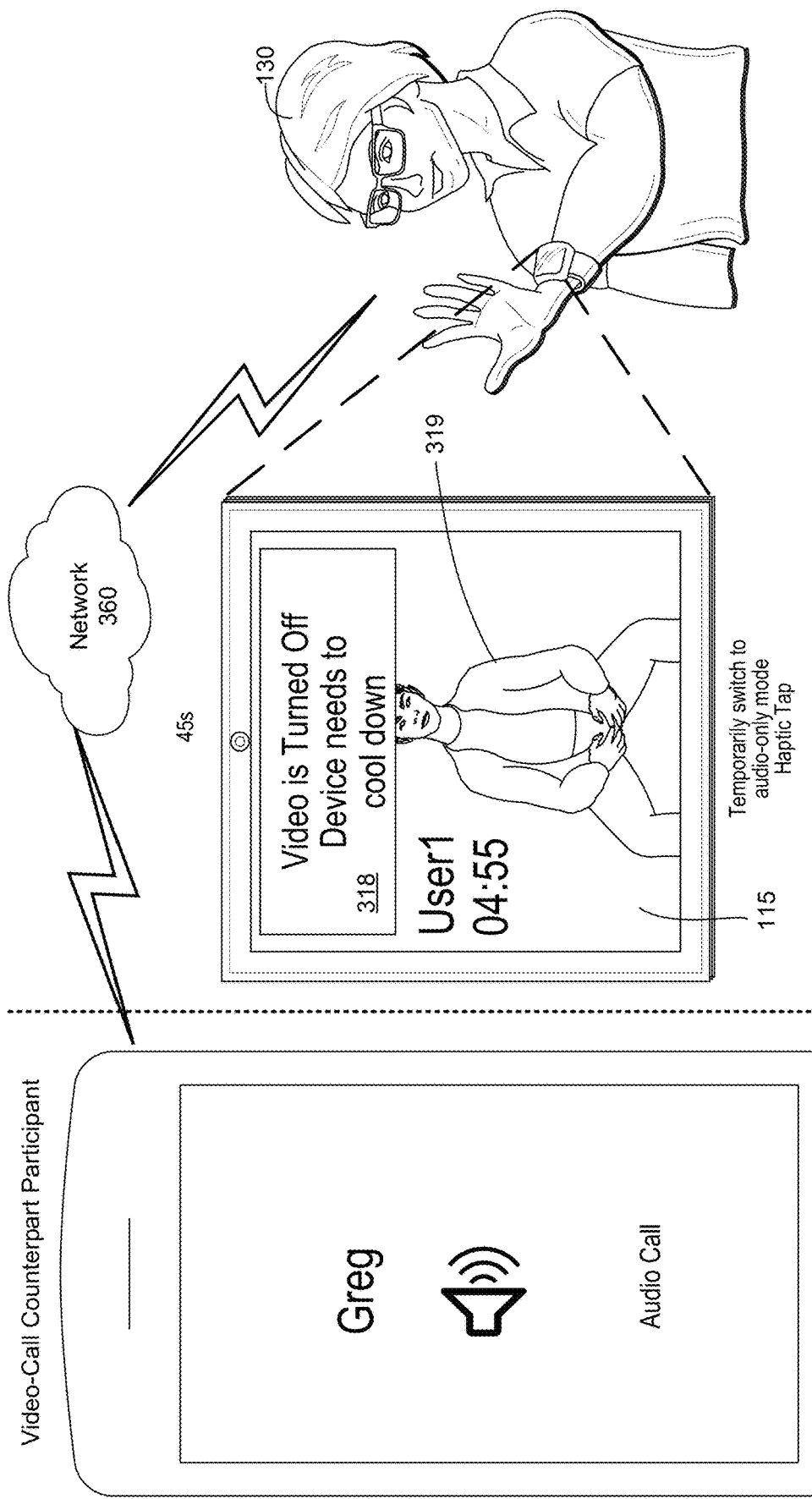

After the additional period of time, if the wrist-wearable device 102 is still in the video mode 206 (e.g., video call is still ongoing and the user has not taken an action to manually switch to audio-only mode), a third warning message 318 is presented by the wrist-wearable device 102 (e.g., via the display 115). For example, as shown in FIG. 3C, the third warning message 318 states that the video mode 206 has been replaced with an audio-only (or other) mode 210 until the temperature conditions at the wrist-wearable device are sufficiently low to allow for presenting and/or sending video content again. In some embodiments, both the temperature conditions (which can be one of the video-viewing preconditions) and the other video-viewing preconditions must all be present at the wrist-wearable device again before presentation and/or capturing of video data would resume. In other embodiments, once the switch is made to audio-only (or other) mode 210 due to temperature data, then the device never switches back to presentation and/or capturing of video data for the ongoing video call (e.g., due to a safety issue having been detected, the device 102 will not switch back to presentation and/or capturing of video data for the ongoing video call, but it could switch back for subsequent video calls).

Instead of or in addition to using the first and additional periods of time, in some embodiments, the wrist-wearable device 102 can also utilize an additional predefined temperature value (that is greater than the predefined temperature value) to cause the device to immediately switch to the audio-only mode 210 without regard to how long the device 102 has been at any particular temperature value. In some embodiments, when the video mode 206 is inactive (or turned off), the wrist-wearable device 102 presents an avatar associated with the video-call counterpart participant (e.g., the user of device 350, FIG. 3C). In this way, the wrist-wearable device 102 conserves battery power or lowers its internal temperature by displaying an avatar instead of actual video data. Alternatively, in some embodiments, when the video mode 206 is inactive (or turned off), the computing device presents only audio data (via a speaker).

In some embodiments, after displaying a warning message (e.g., any of the first, second, or third warning messages 314, 316, and 318), in accordance with a determination that the temperature at the wrist-wearable device has reached or exceeded a predefined temperature value for a threshold period of time and in accordance with a determination that the wrist-wearable device 102 is communicatively coupled with smart glasses 150 worn by the user 130, the wrist-wearable device 102 causes the smart glasses 150 (head-mounted display or other head-worn wearable device) to present audio data and/or video data via a speaker and display integrated in the smart glasses 150. Additionally, in some embodiments, the wrist-wearable device 102 can cause the smart glasses 150 to capture audio data and/or video data via an imaging device and/or microphone integrated in the smart glasses 150. Additional information on use of the smart glasses 150 (or other head-worn wearable device) is provided above in reference to FIG. 1E.

In some embodiments, a temperature check can serve as a safety override, such that even if the video-viewing precondition is present (and therefore would normally allow for continued operation in the video mode 206), that will be overridden by a determination that conditions at the wrist-wearable device are no longer safe for continued operation in the video mode 206.

In some embodiments, the temperature at the wrist-wearable device 102 is a temperature value that is determined based on more than one temperature input, including one or more of the following temperature inputs: an ambient temperature near the wrist-wearable device, a temperature of the user's skin near the wrist-wearable device, and a temperature of a battery that is powering the wrist-wearable device. In other words, no single temperature measurement is used to arrive at a temperature of the wrist-wearable device, but instead the temperature for the wrist-wearable device is a combined or weighted value based on the multiple different temperature inputs described above.

Figure 3D:
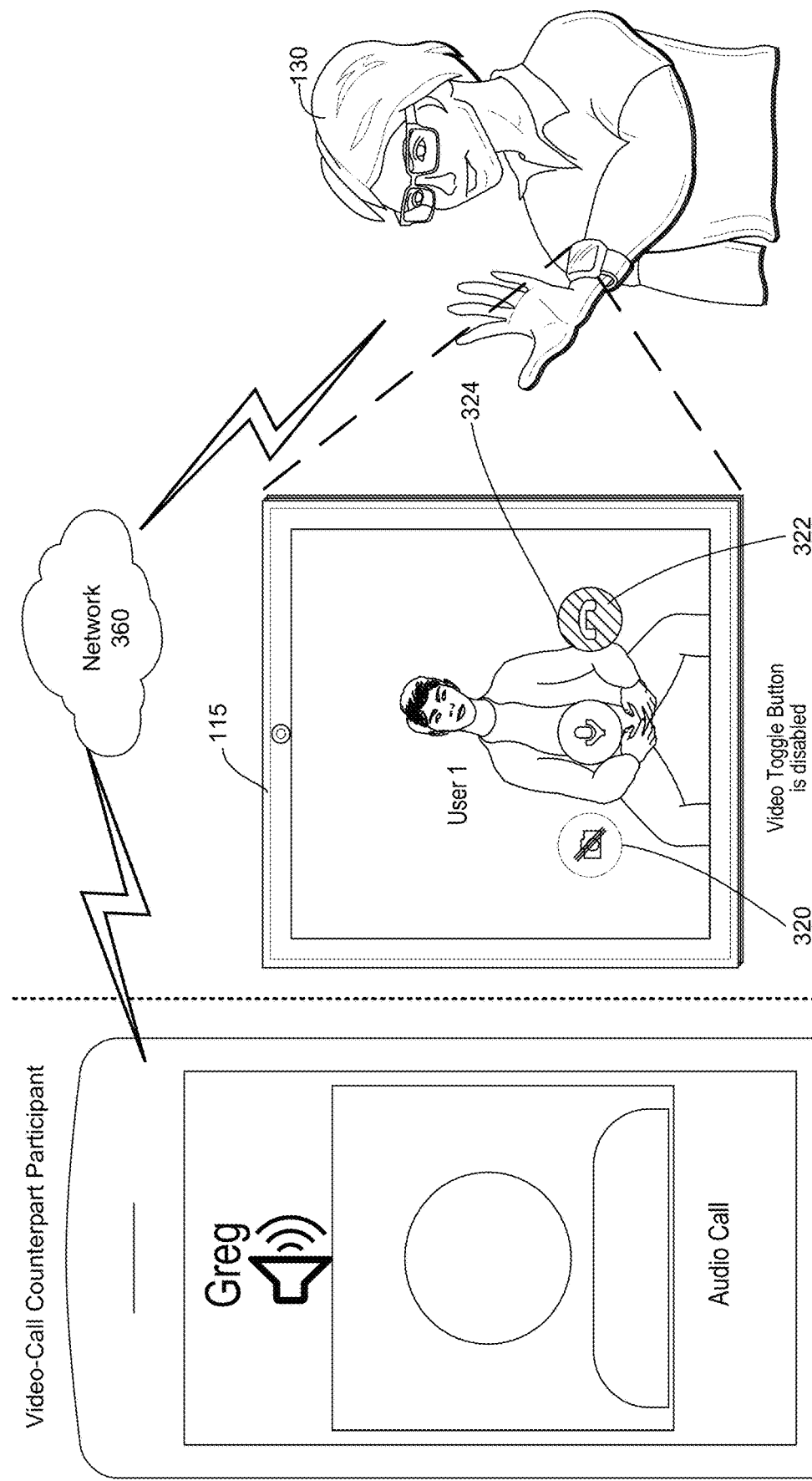
Figure 3E:
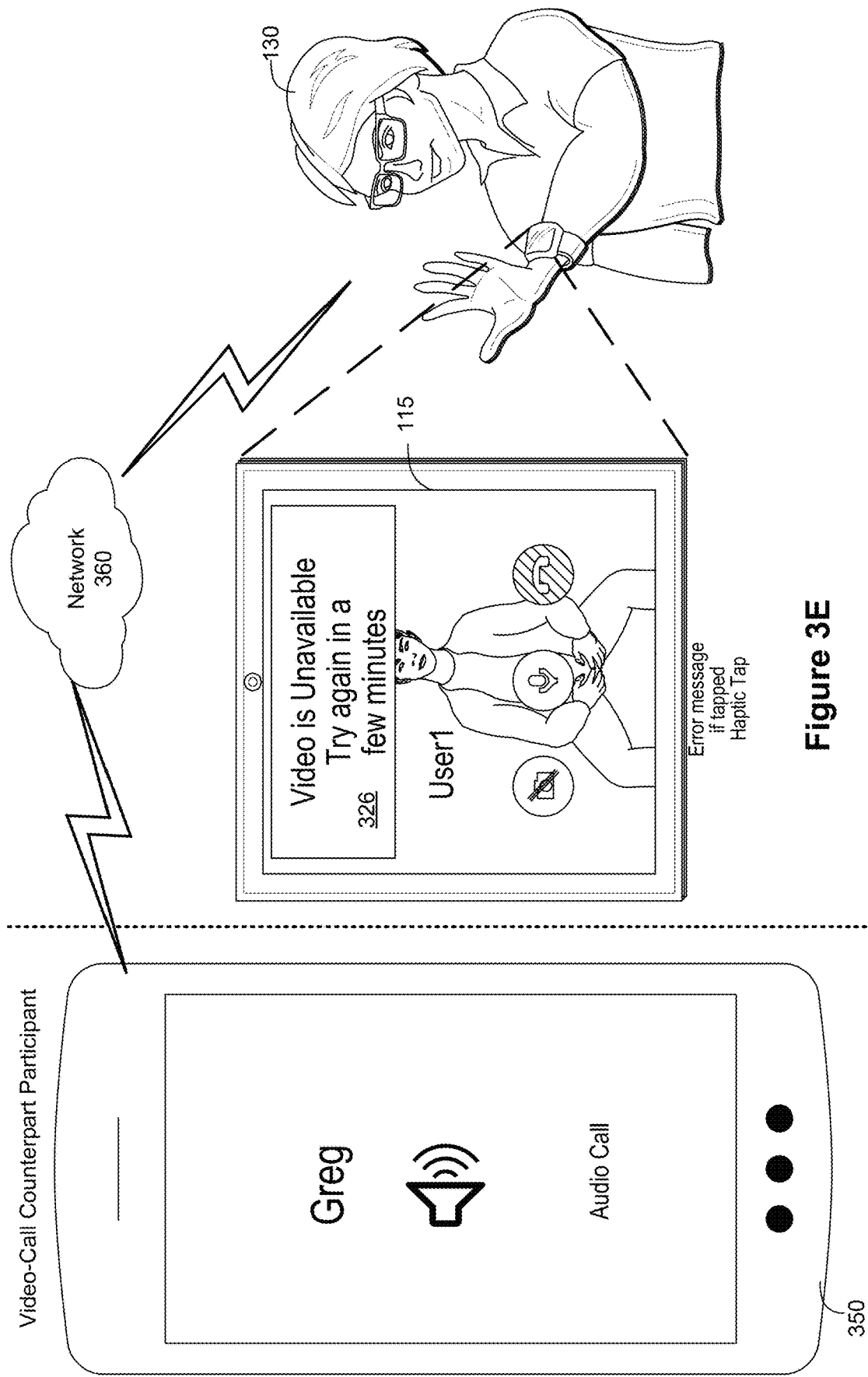

As shown in FIG. 3D, in some embodiments, in conjunction with an ongoing video call (and during either or both of the audio-only mode or other calling mode, and the video mode) the display 115 can present one or more icons. In some embodiments, a first icon can be a video toggle button 320 through which the user is able to manually enable or disable the capture of video data. For example, when a user 130 presses the video toggle button 320, the wrist-wearable device 102 switches between capturing (and sending) only audio data and capturing (and sending) both audio and video data. In some embodiments, once the temperature values discussed above have been exceeded, the video toggle button 320 is disabled to protect the wrist-wearable device 102 from damage (e.g., over heating), prevent the capture of video data if this temperature-specific video-capturing precondition is not present (preventing the accidental capture of video data), thereby extending the total battery life of the wrist-wearable device 102 and ensuring a safe operation of the device 102. For example, as shown in FIG. 3E, after the wrist-wearable device 102 disables capturing video data in response to the predefined temperature value being exceeded (e.g., greater than 42 degrees Celsius), the device 102 also disables the video toggle button 320 to allow the wrist-wearable device 102 to cool down, such that any subsequent input at the video toggle button then causes display of the textual message shown on the display 115 in FIG. 3E. In some embodiments, the wrist-wearable device 102 sends the user's avatar 275 or saved image to the computing device 350 to be displayed at the computing device 350 in place of the user's captured video data.

In some embodiments, a second icon is a mute button 322. In this embodiment, the mute button 322, when selected, is configured to mute, or unmute the user's microphone. In other words, the mute button 322 allows the user to manually toggle (enable or disable) the audio data captured by the wrist-wearable device 102 (once the mute button 322 has been pressed during an ongoing video call, then the device 102 would no longer send audio data to the device 350 of the video-call counterpart participant). In some embodiments, a third icon is the end-call button 324. In some embodiments, when the user selects the end-call button 324, the video call is terminated, thereby causing the device 102 to cease operating in the audio-only mode 210 and/or video mode 206. In some embodiments, when the user selects the video toggle button 320 while it is in its disabled state, the wrist-wearable device 102 displays, on the display 115, a fourth message 326. In this example, the fourth message 326 is presented in response to the user selecting the video toggle button 320 before the wrist-wearable device 102 has been able to cool down. For example, the fourth message 326 can state that the video mode 206 (or video-capture mode 256) is unavailable. In some embodiments, the fourth message 326 suggests an amount of time to wait before trying again (e.g., try again in a few minutes, estimated cool down in 5 minutes, etc.). In some embodiments, the fourth message 326 provides a recommendation for the user to take to enable the video mode 206 (e.g., plug the device into a power source).

In some embodiments, the display 115 is operated in a low-power mode during the duration of the audio-only mode 210 (or other calling mode in which hardware of another device is utilized instead of hardware of the wrist-wearable device). In some embodiments, the display 115 can also be turned off even while the wrist-wearable device 102 continues to cause presentation of only the audio data, which thereby helps the device 102 to cool down more quickly, thereby extending battery life.

Figure 4A:
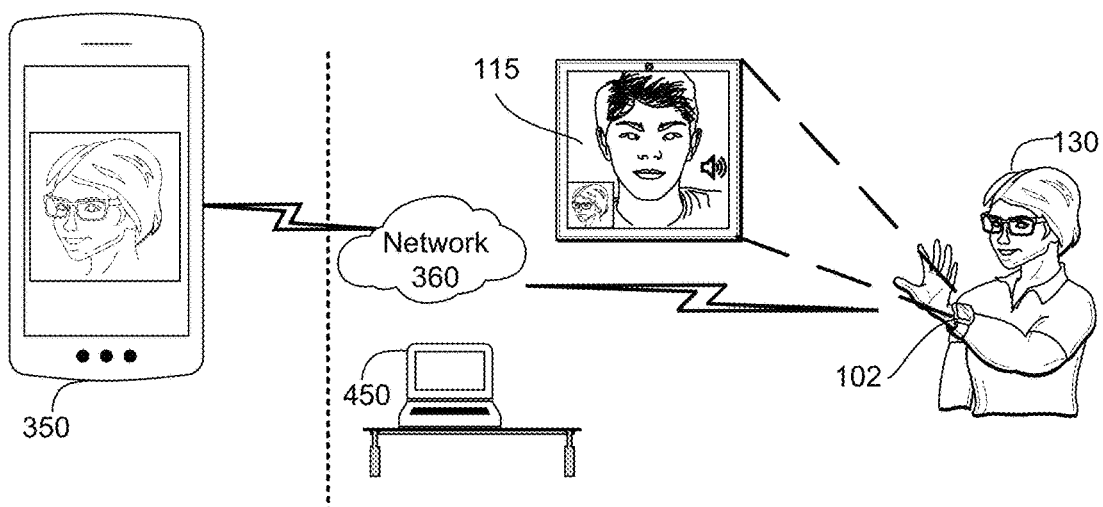
FIGS. 4A-4C illustrate the wrist-wearable device 102 detecting another electronic device associated with the user and using the other electronic device to present, capture, and/or send audio and video data during an ongoing video call, in accordance with some embodiments.
Figure 4B:
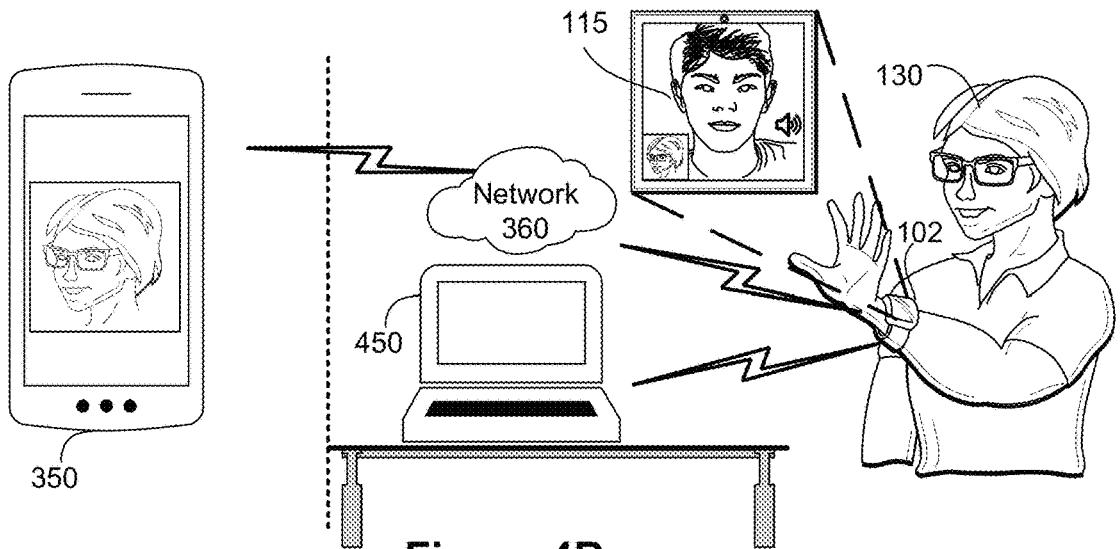
Figure 4C:
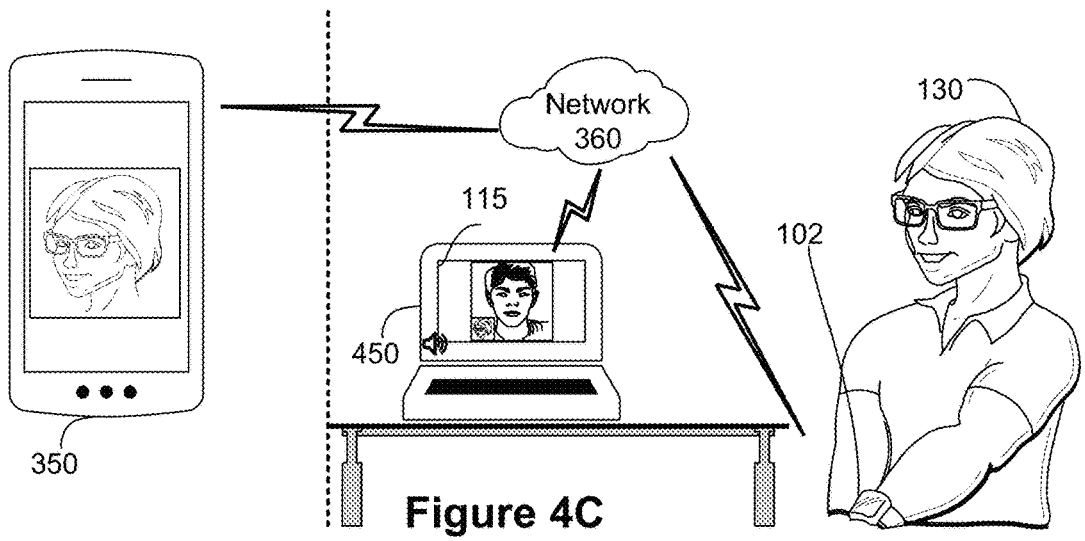

Other messages can also be presented during the ongoing video call. For instance, if the device 102 moves in proximity (e.g., within a short-range communication range, such as Bluetooth low-energy range) of another device associated with the user of the wrist-wearable device (e.g., the user's laptop, tablet, tv, etc.), the device 102 can cause presentation of a message asking the user whether the video and audio data (depending on which modes the device 102 is operating in) should be presented at the other device instead. In some embodiments or circumstances, transferring the presentation of audio and/or video data to the other device can occur automatically based on the user's preferences to do so automatically. One example of this is shown in FIGS. 4A-4C, in which the device 102 has moved within short-range communication range of the other device 450 (here, a laptop) and, thus, the presentation of video and audio data from an ongoing video call switches over to the other nearby device that is also associated with the user of the device 102. In these examples, association with the user can be based on each device being signed into a common account associated with the user (e.g., a social media or other account for the user). Another example is that described specifically above with reference to use of video-viewing and video-calling preconditions to automatically, and without express instructions from a user, cause the switching from using hardware of the wrist-wearable device to instead make use of hardware of the head-worn wearable device under the circumstances (and determinations using sensor data) as described above and below.

Figure 3F:
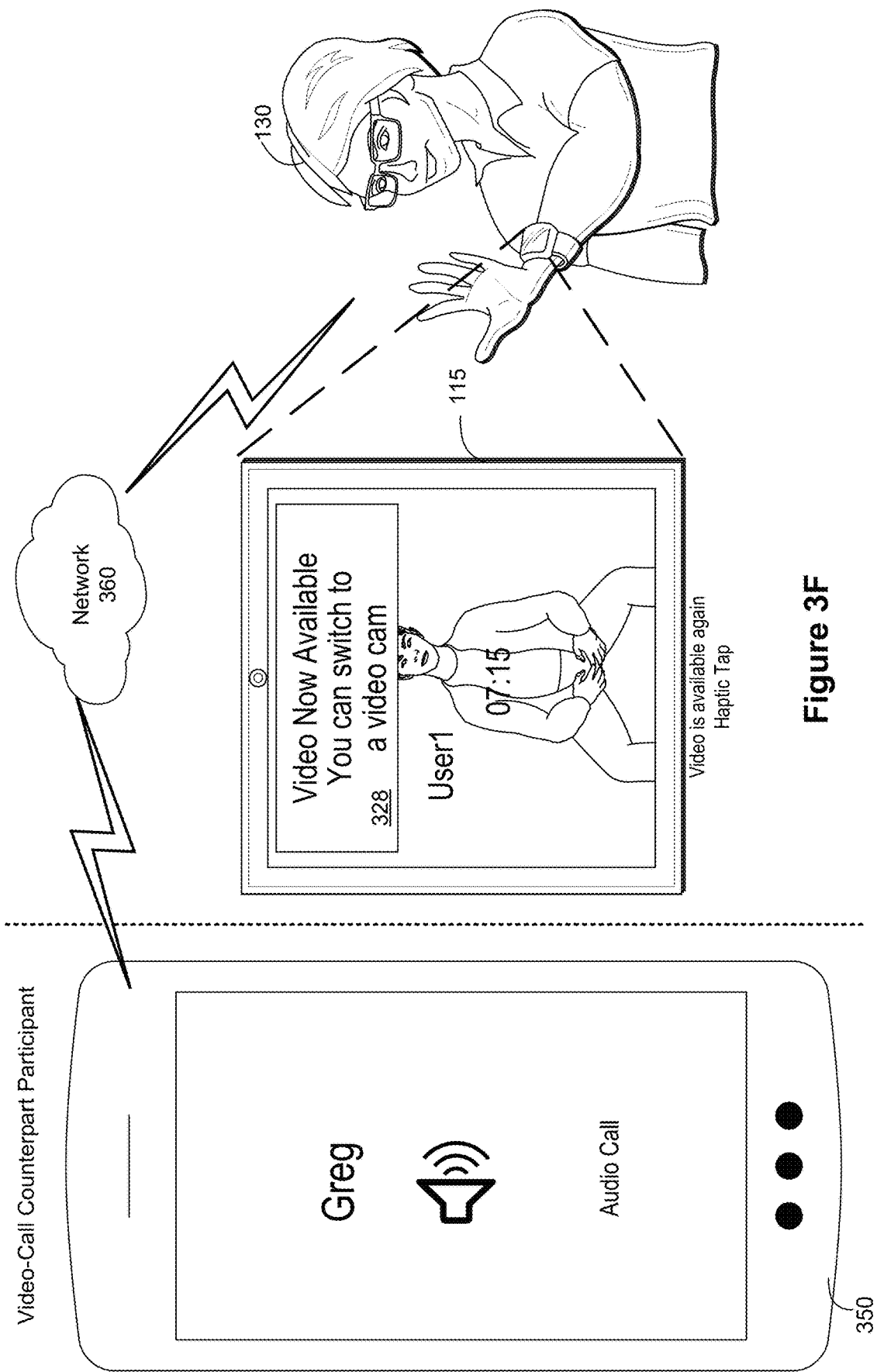

In FIG. 3F, in accordance with a determination that the temperature at the wrist-wearable device 102 is below the predefined temperature value and that the video-viewing preconditions are present at the wrist-wearable device once again, the display of the video data at the display 115 of the wrist-wearable device 102 can be automatically resumed without any express instruction from a user requesting such resuming. In some embodiments, a fifth message 328 is displayed which informs the user that the video-viewing preconditions are satisfied once again. In some embodiments, the fifth message 328 can state that the video mode 206 is available again. In some embodiments, the video toggle button 320 is also re-enabled and the user can select the video toggle button 320 to manually enable the capture of video data. In some embodiments, the video toggle button 320 can be used to allow the image sensor 135 to continue to capture data regardless of the position of the wrist-wearable device 102. For example, a user may wish to share video data captured using a front image sensor 135 (shown in FIG. 9A) while the display is facing away from the user, the user can press the video toggle button 320 to continuously allow the image sensor 135 to capture video data (i.e., temporarily disabling the automatic switching between audio-only mode 210 and video mode 206). In some embodiments, the wrist-wearable device 102 automatically switches from audio-only mode 210 back to video mode 206 once the temperature-safety issues are resolved (device 102 has cooled to safe temperature) and the pertinent video-viewing preconditions are present again (device 102 in raised position, etc.).

In some embodiments, the wrist-wearable device 102 limits the data presented to the user in order to allow the user to continue to provide video and audio data. For example, if the video-capture mode 256 is on, the computing device 350 can continue to receive, via the network 360, captured video and audio data from the wrist-wearable device 102 while the user 130 is only presented with audio data. In some embodiments, another message is displayed which informs the user that the image sensor 135 is on. In some embodiments, the wrist-wearable device 102 automatically enables the capture of video data when the video-capturing preconditions are present. In some embodiments, the wrist-wearable device 102 automatically switches from video-capture mode off 260 back to video-capture mode on 406 once the video-capturing preconditions are present.

While the primary examples provided in FIGS. 3A-3F relate to use of video-viewing preconditions to manage power consumption and processor utilization at the wrist-wearable device 102 during a video call (e.g., by automatically and without user intervention switching between audio-only mode 210 and video mode 206), the use of video-viewing preconditions also applies to other circumstances in which a wrist-wearable device is presenting a video stream, such as playing a movie, tv show, or other video content, and also to capturing scenarios in which the camera is being used to capture a video outside of the video-calling context. Thus, the techniques described herein are not limited to use in conjunction with video calling alone but are instead applicable to additional circumstances in which video content is presented at a wrist-wearable device such that the ability to intelligently switch between displaying video and displaying audio only helps to properly manage power consumption at the wrist-wearable device for various types of video data that can be presented at a wrist-wearable device. Similarly, the use of video-capturing preconditions also applies to use case outside of video calls, such as capturing of video data using a camera of the wrist-wearable device but not during an ongoing video call (e.g., creating a family video using a camera of the wrist-wearable device), such that the device can automatically switch between capturing video and audio data or audio-only data depending on determinations related to presence or absence of the video-capturing preconditions described herein. More details on these other example contexts for these other techniques are provided below in reference to FIGS. 6, 7, 11, and 12 (as well as above in the summary section).

The examples provided in FIGS. 2-3F for the video-viewing preconditions can also apply to the video-capturing preconditions. For example, if the wrist-wearable device 102 determines that the temperature thresholds described above have been exceeded, then the warning messages can indicate not only that video will no longer be presented, but also that video will no longer be captured by the device 102 (in some embodiments, video capturing can be disabled before video presentation is disabled as video capturing can often user more power and processing resources than video presentation).

FIGS. 4A-4C illustrate the wrist-wearable device 102 detecting another electronic device associated with the user and using the other electronic device associated to the user to present, capture, and/or send audio and video data during an ongoing video call, in accordance with some embodiments. In some embodiments, the wrist-wearable device 102 detects when the other electronic device 450 is located in proximity to (e.g., within a short-range communication range, such as Bluetooth low-energy range) the wrist-wearable device 102. In some embodiments, the wrist-wearable device 102 detects the other electronic device via a network 360 (e.g., a Wi-Fi or a cellular network). As described above in FIGS. 3A-3F, when wrist-wearable device 102 moves within proximity of the other device 350 associated with the user of the wrist-wearable device 102 (e.g., the user's laptop, tablet, tv, etc.), the device 102 can cease to present video and audio data (depending on which modes the device 102 is operating in) at the display of the device 102 and can instead cause presentation of the video and/or audio data at the other device (in certain embodiments, switching to capture video and/or audio via the other device can also occur).

For example, as shown in FIG. 4A, the user is initially far away from his laptop (electronic device 450), and as such, video and audio data received from the computing device 350 is presented to the user 130 via the display 115 and the speaker of the wrist-wearable device 102. Similarly, the wrist-wearable device 102 can capture video data and audio data of the user 130 (via an image sensor 135 and microphone; FIGS. 1A-1F) and send the captured video data to the computing device 350, via the network 360.

When the user 130 approaches the electronic device 450, the wrist-wearable device 102 detects the electronic device 450 within proximity of the device 102, and, as shown in FIG. 4C, causes the electronic device 450 to receive and present audio and video data received from the computing device 350 (in some embodiments, the video call is transferred to the device 450 such that the device 102 ceases to receive the video and audio data entirely; in other embodiments, data associated with the video call is relayed from the device 102 to the device 450 for presentation at the device 450, such that device 102 serves as a relay for the video call data). In some embodiments, capturing of video and audio data in conjunction with the video call is also transferred to the other device (e.g., device 450); while in other embodiments, the device 102 continues to capture video and audio data, and then sends the captured user video and audio data to the computing device 350.

As further shown in FIG. 4C, once the presentation and/or capturing of video and audio data for the video call is transferred to the device 450, the video call can continue even if a video-viewing precondition (or video-capturing precondition) is not present (e.g., user's wrist position is in a lowered position).

In some embodiments or circumstances, transferring the presentation of audio and/or video data to the other device can occur after a user taps on a user interface element displayed on the display 115 of the device 102, or can occur automatically based on the user's preferences to do so automatically once the device 102 is determined to be in proximity to a trusted device, such as device 450 in the depicted example of FIGS. 4A-4C.

In some embodiments, the association of devices (e.g., device 102 and device 450) with the user can be based on each device being signed into a common account associated with the user (e.g., a social media or other account for the user). In some embodiments, the association with the user can be based on each device being part of the same private networks (e.g., a home Wi-Fi, a hotspot, etc.). In some embodiments, the association with the user can be based the use of authentication tokens (e.g., authentication keys sent to one another via Bluetooth).

In some embodiments, the electronic device 450 must have either a larger-capacity battery than a battery of the wrist-wearable device 102, or a connection to a power source in order to be made available for the transferring of video and/or audio data discussed above. In some embodiments, in accordance with a determination that a display of the other electronic device 450 is available, the video mode 206 of the wrist-wearable device 102 is stopped and the presentation of the video to the display of the other electronic device 450 is started. Similarly, the wrist-wearable device 102 can switch from capturing video data from its image sensor 135 to capturing data from the electronic device 450's image sensor (if available). If the electronic device 450 does not have an image sensor or the image sensor is unavailable, the wrist-wearable device 102 can continue to capture video data using its own image sensor 135 while disabling the display 115. In this way, by making use of display capabilities of nearby devices, the techniques described herein can further help to reduce power-consumption and temperature levels at the wrist-wearable device, thereby helping to avoid draining the battery of the wrist-wearable device 102, avoid unsafe temperature conditions at the wrist-wearable device, and ensuring longer video calls by making use of displays available at nearby devices. While device 450 is depicted as a desktop computer in FIGS. 4A-4C, the other electronic device 450 can also be a laptop, a tablet, a smartphone, a smart display, and other similar devices. The proximity-based use of hardware capabilities of other devices can be used in addition to the use of hardware capabilities specifically from a head-worn wearable device (as described below in reference to FIGS. 6, 7, 11, and 12), such that video-viewing and capturing preconditions can be used to cause seamlessly switching between hardware components of a head-worn wearable device and wrist-wearable device, while separately using the proximity-based techniques described with reference to 4A-4C as well.

Figure 5A:
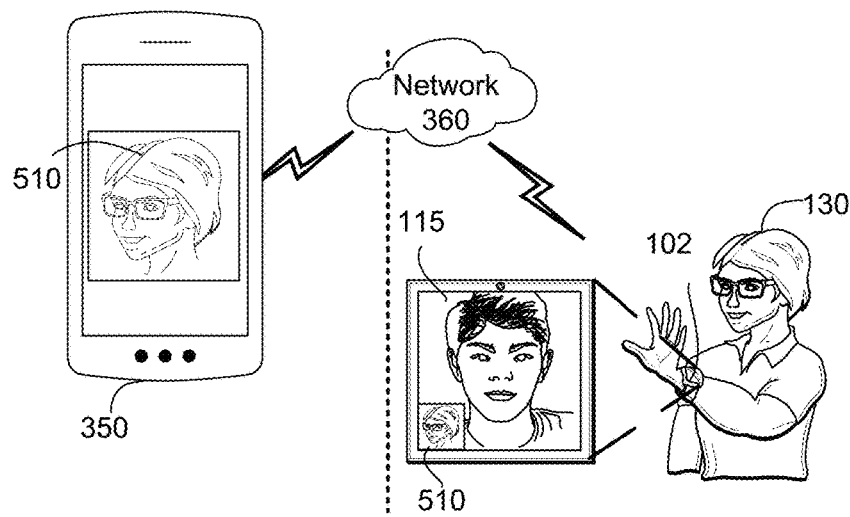
FIGS. 5A-5C illustrate the wrist-wearable device 102 replacing the user's face with an avatar representing the user's face while the video call is ongoing and the video-capturing precondition is present at the wrist-wearable device 102, in accordance with some embodiments.
Figure 5B:
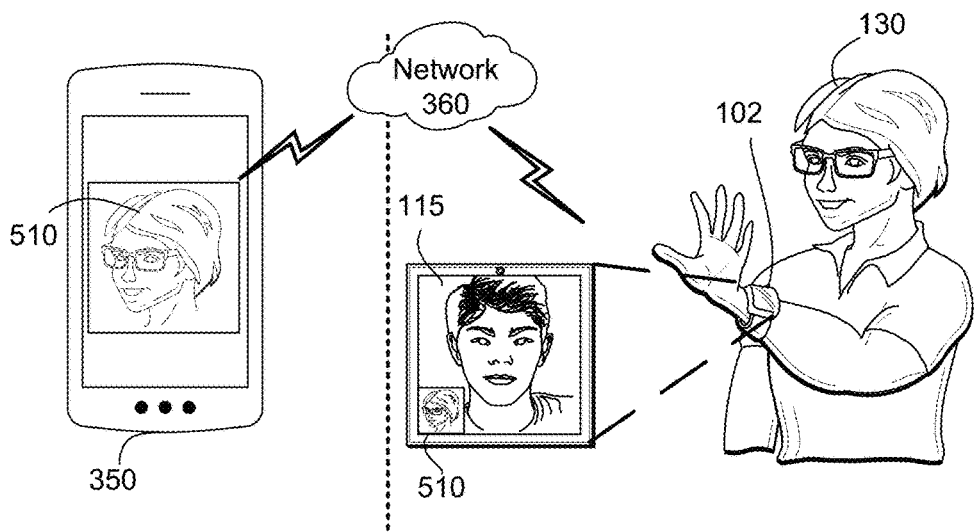
Figure 5C:
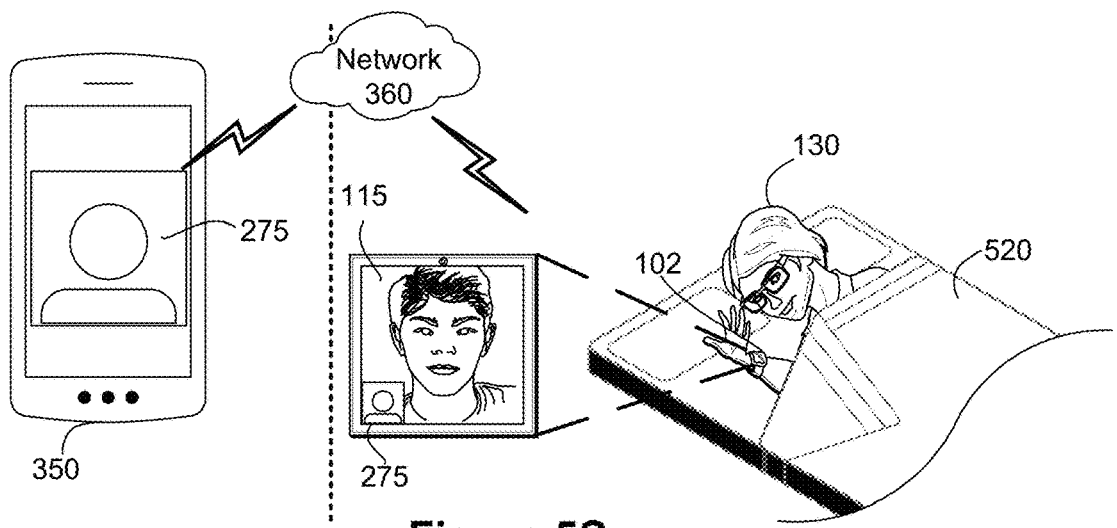

FIGS. 5A-5C illustrate the wrist-wearable device 102 replacing the user's face with an avatar representing the user's face while the video call is ongoing and the video-capturing precondition is present at the wrist-wearable device 102, in accordance with some embodiments. In some embodiments, the wrist-wearable device 102 replaces the user's face 510 with an avatar 275 in accordance with a determination that additional sensor data from the one or more sensors (FIG. 10) indicates that the user's face 510 should be replaced in the additional video data. For example, in some embodiments, the wrist-wearable device 102 replaces the user's face 510 with an avatar representing the user's face 275 when it is determined that the user 130 wants privacy based on his location data (e.g., within his bedroom, in the bathroom, at the gym, etc.). In another example, in some embodiments, the wrist-wearable device 102 replaces the user's face 510 with an avatar representing the user's face 275 based on captured biometric data, such as an elevated heart rate indicating that the user is exercising or dealing with elevated levels of stress. In another example, the sensor data can indicate that the user 130 has just woken up and replaces the user's face 510 with an avatar representing the user's face 275 as he may be disheveled. In addition to avatars that can mirror a user's facial expressions and head and/or body pose positions, in some circumstances (e.g., when the audio-only mode is activated) an avatar image (a fixed image rather than a dynamic avatar) can replace a user's profile photo during a call. This avatar-replacement can be made active based on an express opt-in from users that would like to make use of this feature, such that the feature is disabled by default and only activated based on express user consent beforehand.

As shown in FIGS. 5A-5C, the user 130 can be approaching his bedroom or bed 520 (shown schematically next to the user as bed 520 in FIG. 5C), and the wrist-wearable device 102 (after the user has opted-in to make use of this avatar-replacement feature), using the user's location data captured by the one or more sensors, can determine that when the user 130 is in his bedroom, that the user would like his privacy and replace the captured video data with the avatar 275. This allows the user to continue communicating with the computing device 530 while also allowing the user 130 to maintain their privacy. The above examples are non-limiting. The wrist-wearable device 102 can use any captured sensor data or combination of sensor data to make a determination that the user's face 510 should be replaced with an avatar 275 representing the user's face. In some embodiments, the user 130 can specify one or more scenarios, locations, and/or sensed sensor data in which his or her face should be replaced with an avatar representing his or her face.

One non-limiting example as to how the wrist-wearable device can generate an avatar that replaces a user's face during a video call (and can still move with the user and represent the user's facial expressions) is now described. In some embodiments, the avatar is generated using one or more neural networks and feature maps, such as a first neural network, a second neural network, and a neural texture. In some embodiments, when each neural network and feature map is trained, parameters for the neural texture, the first neural network, and the second neural network are randomly initialized. For an iteration of a training process, the wrist-wearable device 102 (or other computing device, such as computer, a sever, etc.) generates a training rendered image of the user. To generate the training rendered image, the wrist-wearable device 102 (or other computing device) can construct a three-dimensional training geometry to represent the user in a training pose captured by an image sensor 135 image frame based on a body shape model. In some embodiments, the three-dimensional training geometry (e.g., a coarse mesh representation) is obtained by solving an inverse kinematic problem to fit the posed body shape to a 3D point cloud. The wrist-wearable device 102 (or other computing device) can also use additional detected body key points to construct the three-dimensional training geometry. The wrist-wearable device 102 (or other computing device) can generate a first training rendered neural texture based on a UV mapping between (1) a portion of the three-dimensional training geometry that is visible from a viewing direction of the frame and (2) the neural texture. Each texel (or texture element) of the neural texture can have k-channel latent representation. As such, the first training rendered neural texture can also include k latent channels. Although this example describes generating the first training rendered neural texture during a training of the neural texture, the first neural network, and the second neural network in a particular manner, other examples can generate the first training rendered neural texture during a training of the neural texture, the first neural network, and the second neural network in any suitable manner.

In some embodiments, the wrist-wearable device 102 (or other computing device) generates an avatar (or a virtual image) of the user using the trained neural texture, the first neural network, and the second neural network. In some embodiments, the wrist-wearable device 102 (or other computing device) adjusts parameters of a three-dimensional geometry corresponding to the user to make the three-dimensional geometry represent a desired pose for the user. In some embodiments, the wrist-wearable device 102 (or other computing device) accesses a neural texture encoding an appearance of the user. In some embodiments, the wrist-wearable device 102 (or other computing device) generates a first rendered neural texture based on a mapping between (1) a portion of the three-dimensional geometry that is visible from a viewing direction and (2) the neural texture. The first rendered neural texture can include latent channels. In some embodiments, the wrist-wearable device 102 (or other computing device) generates a second rendered neural texture by processing the first rendered neural texture using a first neural network. The second rendered neural texture can include color channels and latent channels. In some embodiments, the wrist-wearable device 102 (or other computing device) determines normal information associated with the portion of the three-dimensional geometry that is visible from the viewing direction. In some embodiments, the wrist-wearable device 102 (or other computing device) generates a rendered image for the user in the desired pose by processing the second rendered neural texture and the normal information using a second neural network (i.e., generates an avatar). In some embodiments, a rendered image for the user can be modified by swapping at least a part of the neural texture. In some embodiments, wrist-wearable device 102 (or other computing device) identities a pose of the user. In some embodiments, the neural textures can be mix-and-matched between previously trained neural textures. This is just one example of a technique more generating an appropriate avatar, others are also within the scope of this disclosure, as one of skill will appreciate upon reading this disclosure.

Figure 6:
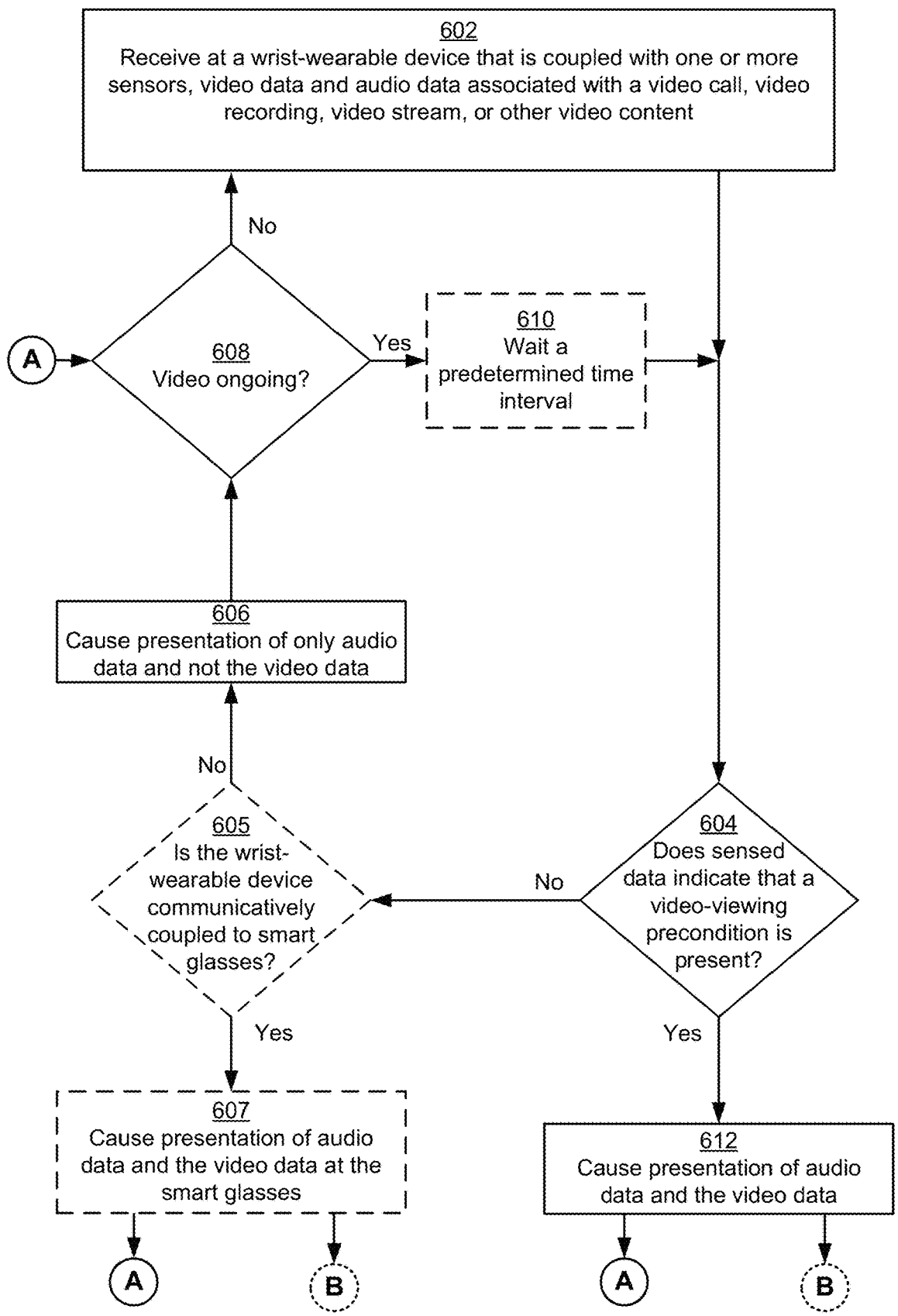
FIG. 6 illustrates a flow diagram of a method for presenting audio and/or video data at a wrist-wearable device during a video call, according to some embodiments.

FIG. 6 illustrates a flow diagram of a method for presenting audio and/or video data at a wrist-wearable device during a video call, video recording, video stream, or other video content being presented at a wrist-wearable device, according to some embodiments. The method includes receiving (602) at a wrist-wearable device 102 (FIGS. 1A-1F) that is coupled with one or more sensors (FIG. 10), video data and audio data associated with a video call, video recording, video stream, or other video content.

After receiving the video data and audio data, the wrist-wearable device 102 determines whether the sensed data (e.g., from the sensors such as a heart rate sensor 1058, EMG sensor 1046, SpO2 sensor 1054, altimeter 1048, thermal sensor or thermal couple, ambient light sensor, ambient noise sensor 1058, 1054, and/or IMU 1042 (FIG. 10)) of the wrist-wearable device 102 indicates (604) that a video-viewing precondition is present. In some embodiments, the video-viewing precondition is a position and/or orientation of the wrist-wearable device 102, a battery life, maximum temperature of the device, minimum power requirements (e.g., the wrist-wearable device 102 has exited a low power mode, the wrist-wearable device is connected to a power source, etc.), etc., with additional descriptions and examples provided earlier above. The wrist-wearable device 102 can determine whether more than one video-viewing precondition is present simultaneously. The wrist-wearable device 102 can also determine whether one or more video-viewing preconditions are present automatically without user intervention.

In some embodiments, if the video-viewing precondition is not present, the wrist-wearable device 102 determines (605) whether it is communicatively coupled to smart glasses (e.g., smart glasses 150 (FIG. 1E) or other head-mounted display). In some embodiments, if the wrist-wearable device 102 is communicatively coupled to smart glasses, the wrist-wearable device 102 causes (607, which occurs after the determination at 605—Yes) the presentation of audio data and video data at the smart glasses as described above in reference to FIG. 1E as well (which descriptions apply equally here in conjunction with this method). For example, when the wrist-wearable device 102 is moved to a lowered position (such that a position-based video-viewing precondition is no longer determined to be satisfied, which determination is based on sensor data from the wrist-wearable device), the wrist-wearable device 102 causes the smart glasses 150 to present the audio data and video data. In some embodiments, after causing the smart glasses to present the audio data and video data, the method proceeds to operation 608 and continues to perform the subsequent operations as shown in method of FIG. 6.

If the wrist-wearable device 102 is not communicatively coupled to smart glasses, the wrist-wearable device 102 causes (606, which occurs after the determination at 605—No) the presentation of only audio data and not the video data at the wrist-wearable device. While presenting the audio data (e.g., the device is operating in the audio-only mode discussed above), the wrist-wearable device 102 determines whether the video is (608) ongoing (e.g., depending on which type of video is ongoing, this can involve checking if a video call is ongoing, whether a video recording is still playing, whether a video stream is still playing, or whether other video content is still playing). If the video is not ongoing (e.g., determination No at 608), the wrist-wearable device 102 returns to operation 602 and waits to receive video data and audio data before executing the operations of FIG. 6 anew for some other video content that is to be presented.

Alternatively, if the video call is determined to be ongoing (e.g., determination Yes at 608), the wrist-wearable device 102 returns to operation 604 and determines whether the video-viewing preconditions are present. In some embodiments, the wrist-wearable device 102 waits a predetermined time interval (e.g., 5 milliseconds, 10 milliseconds, 15 milliseconds, 1 second, 2 seconds, etc.) at operation 610, before returning to operation 604. In this way, the wrist-wearable device 102 does not continuously drain its battery life collecting sensor data and/or determining whether the video-viewing preconditions are present. In some embodiments, as was discussed above, the determination as to whether the video-viewing precondition is present is performed after certain changes in sensor data are detected (e.g., device moving at a certain speed or with a certain acceleration, which can indicate a positional change of the device 102).

By returning to operation 604, the wrist-wearable device 102 can automatically switch between different video-presentation modes based on presence of absence of the video-viewing preconditions as the video call continues/is ongoing. As described above, in FIGS. 2-3F, this method depicted in FIG. 6 allows the wrist-wearable device 102 to extend its battery life, control the maximum temperature of the device, maintain a suitable power requirement, ensure a safe operation for users wearing the device 102, etc.

Returning to operation 604, if the video-viewing precondition is present (determination Yes at 604), the wrist-wearable device 102 causes (612) the presentation of audio data and video data (e.g., the device 102 stays in a video mode, such as that described in reference to FIG. 2's video-call example). In some embodiments, after the audio data and video data is presented, the method proceeds to operation 608 and continues to perform the operations as described above. While the method of FIG. 6 is shown in simplified form, the skilled artisan, upon reading this disclosure, will appreciate that aspects of the method of FIGS. 8A-8E can also be performed in conjunction with the operations shown for the method of FIG. 6, and will also appreciate that various aspects of the methods of FIGS. 6, 7, 8, 11, and 12 can be performed together at different points in time (or even simultaneously) to allow for seamless control of various video viewing and capturing techniques.

FIG. 7 illustrates a flow diagram of a method for capturing and, optionally sending, audio and/or video data by a wrist-wearable device 102 while capturing a video (which video can be a live video stream, video for a video call, or a locally-recorded video, and the like), according to some embodiments, which method can be performed in conjunction with the method of FIG. 6 (described above, and as shown in FIGS. 6 and 7 the methods are linked by the "B" operation indicating that the methods can performed sequentially, but the methods can also be performed in parallel as well). The method of FIG. 7 includes, capturing (702) video data via an image sensor 135 (e.g., a camera) that is integrated within a wrist-wearable device 102 and audio data via a microphone at the wrist-wearable device 102. In some embodiments, the wrist-wearable device 102 includes several image sensors 135 and microphones. In some embodiments, the image sensor 135 is centered on the face of the display 115 and faces away from the user's wrist. In some embodiment, the speaker is positioned on a bottom portion of the wrist-wearable device 102.

In some embodiments, the wrist-wearable device 102 determines whether one or more video-capturing preconditions are (704) present. In some embodiments, the video-capturing preconditions include position or orientation of the wrist-wearable device 102, a battery life, maximum temperature of the device, minimum power requirements (e.g., the wrist-wearable device 102 has excited a low power mode, the wrist-wearable device is connected to a power source, etc.), etc., with examples and more details having been provided above and also below in reference to the methods of FIGS. 8, 11, and 12.

If the video-capturing preconditions are present at the wrist-wearable device, the wrist-wearable device 102 continues to capture video and audio data and, optionally, sends (706, which occurs after the determination at 704—Yes) the captured video data and the captured audio data to a device associated with at least one other user (such as for the example in which the users are participating in a video call, and another example includes video streaming of video content in which the captured video is made available to a number of different users accessing the live video stream).

The wrist-wearable device 102 also determines whether video capturing is (708) ongoing. If video capturing is not ongoing (e.g., determination No at 708), the wrist-wearable device 102 ceases capturing video data and audio data and returns to operation 702 and waits for capturing of video to occur again before executing operations of the method shown in FIG. 7 anew.

Alternatively, if video capturing is determined to be ongoing (e.g., determination Yes at 708), the wrist-wearable device 102 returns to operation 704 and determines whether the video-capturing preconditions are present. In some embodiments, the wrist-wearable device 102 waits predetermined time interval (e.g., 5 milliseconds, 10 milliseconds, 15 milliseconds, 1 second, 2 seconds, etc.) at operation 710, before returning to operation 704. In this way, the wrist-wearable device 102 does not continuously drain its battery life collecting sensor data and/or determining whether the video-capturing preconditions are present. In some embodiments, as was discussed above, the determination as to whether the video-capturing precondition is present is performed after certain changes in sensor data are detected (e.g., device moving at a certain speed or with a certain acceleration, which can indicate a positional change of the device 102).

By returning to operation 704, the wrist-wearable device 102 can automatically determine whether to capture video data and capture audio data based on presence or absence of the one or more video-capturing preconditions. As discussed above, the above method of FIG. 7 allows the wrist-wearable device 102 to extend its battery life, control the maximum temperature of the device, maintain a suitable power requirement, etc.

Returning to operation 704, in some embodiments, if the video-capturing preconditions are not present, the wrist-wearable device 102 determines (705) whether it is communicatively coupled to smart glasses (e.g., smart glasses 150 (FIG. 1E) or other head-mounted display). In some embodiments, if the wrist-wearable device 102 is communicatively coupled to smart glasses, the wrist-wearable device 102 causes (707, which occurs after the determination at 705—Yes) the capture of audio data and/or video data via hardware at the smart glasses rather than similar/analogous hardware at the wrist-wearable device. In some embodiments, the wrist-wearable device 102 receives the audio data and/or video data captured at the smart glasses and transmits the captured audio data and/or video data. Alternatively, in some embodiments, the wrist-wearable device 102 causes the smart glasses to transmit the captured audio data and/or video data. In some embodiments, after causing the smart glasses to capture the audio data and video data, the method proceeds to operation 708 and continues to perform the operations as described above.

If the wrist-wearable device 102 is not communicatively coupled to smart glasses (determination No at 705), the wrist-wearable device 102 ceases capturing (712) the video data while still capturing audio data. In some embodiments, following the ceasing (712) of the video data, the wrist-wearable device 102 optionally, e.g., for video calling or video streaming example, sends (714) only the audio data. By only capturing and sending audio data, the wrist-wearable device 102 can lower its temperature, extend its battery life, etc. In some embodiments, after optionally sending only the audio data, the method proceeds to operation 708 and continues to perform the operation as described above.

Figure 7:
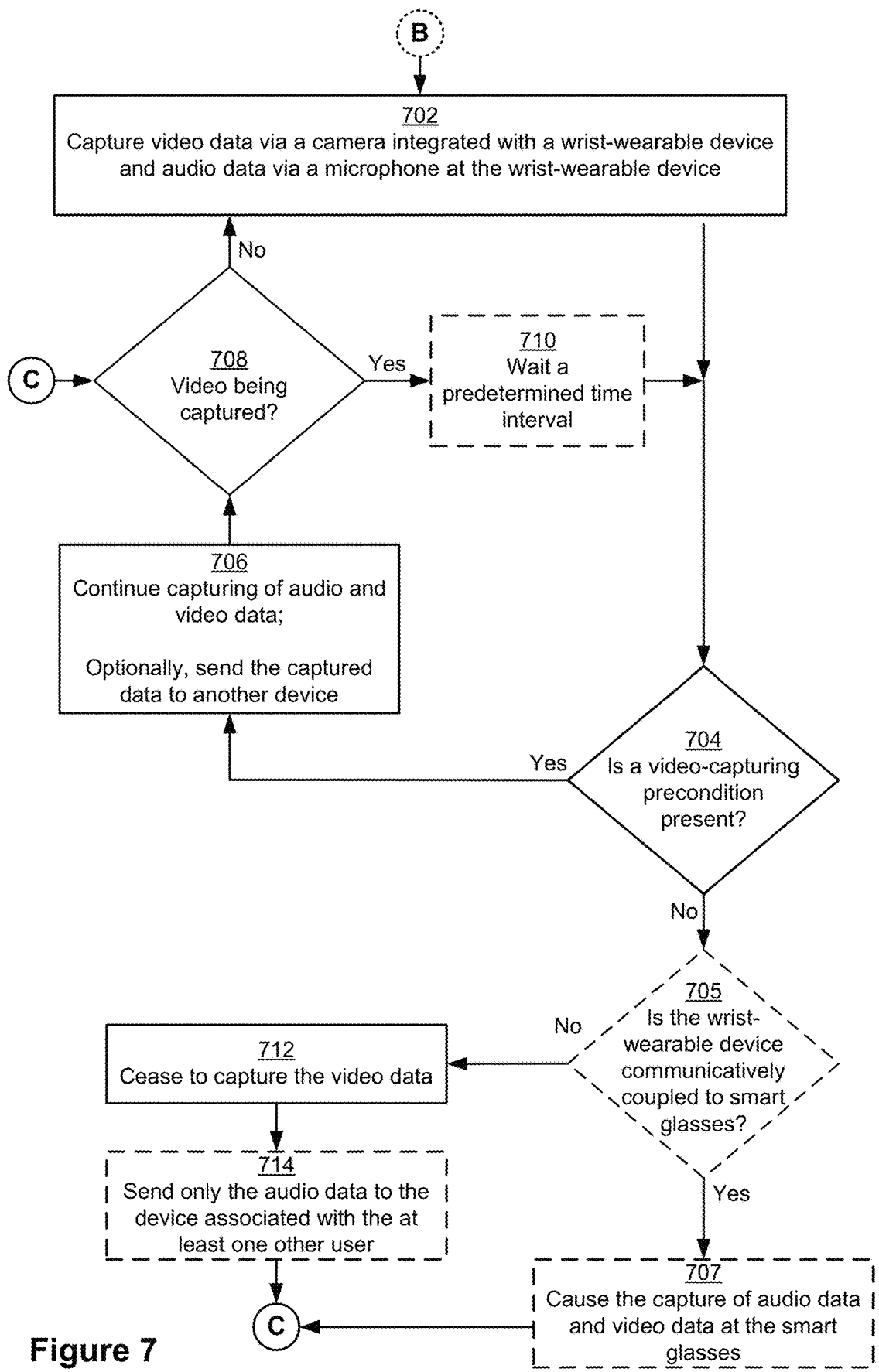
FIG. 7 illustrates a flow diagram of a method for capturing and sending audio and/or video data by a wrist-wearable device during a video call, according to some embodiments.

As is also shown in FIG. 7, the depicted method is performed in conjunction with the method shown in FIG. 6. In particular, the "B" step shown at the top of FIG. 7 shows how the method of FIG. 6 can relate to the method of FIG. 6 (e.g., the method of FIG. 7 can be performed after the method of FIG. 6 has executed). Alternatively, the methods of FIGS. 6 and 7 can be performed simultaneously, such that the common operations (e.g., operation 608 and 708; operations 610 and 710) are only performed once. In certain embodiments in which the video-viewing and video-capturing preconditions include the same plurality of preconditions, then only one method need be performed and the determination at either operation 604 and 704 would then cause appropriate changes to both presentation and capturing of video and/or audio data. In embodiments in which there is at least one different precondition in the respective pluralities of video-viewing and video-capturing preconditions, then have separate determinations 604 and 704 helps to ensure that presentation and capturing aspects are handled separately, thereby enabling a finer level of control over the operation and performance of device 102.

FIGS. 8A-8E illustrate a detailed flow diagram of the method 800 of video calling at a wrist-wearable device 102 (FIGS. 1A-1F), according to some embodiments. In particular, the method 800 includes presenting audio and/or video data and/or capturing and sending audio and/or video data by a wrist-wearable device during a video call. Operations (e.g., steps) of the method 800 can be performed by one or more processors (e.g., central processing unit 1026 and/or MCU 1052 FIG. 10) of a wrist-wearable device 102. In some embodiments, the wrist-wearable device 102 is coupled with one or more sensors (e.g., various sensors shown in FIG. 10, such as a heart rate sensor 1058, EMG sensor 1046, SpO2 sensor 1054, altimeter 1048, thermal sensor or thermal couple, ambient light sensor, ambient noise sensor), a display 115, a speaker, an image sensor 135, and a microphone to perform the one or more operations of FIGS. 8A-8E. The speaker can be integrated with the wrist-wearable device 102 or can be associated with a device that is separate from the wrist-wearable device but is communicatively coupled thereto, such as a pair of headphones, a Bluetooth speaker, or other like devices that include speakers for presenting audio data. At least some of the operations shown in FIGS. 8A-8E correspond to instructions stored in a computer memory or computer-readable storage medium (e.g., storage 1002, ram 1003, and/or memory 1050 FIG. 10). Operations 802-838 can also be performed in part using one or more processors and/or using instructions stored in memory or computer-readable medium of an electronic device 450 (FIGS. 4A-4C) communicatively coupled to the wrist-wearable device 102 (e.g., a tablet device can perform operations 802-838 alone or in conjunction with the one or more processors of the wrist-wearable device 102).

The method 800 includes receiving (802) video data and audio data associated with a video call between a user of the wrist-wearable device 102 and at least one other user distinct from the user. The method 800 also includes, while causing presentation of the video data via the display 115 of the wrist wearable device 102 and the audio data via the speaker that is in communication with the wrist-wearable device 102, determining (804) whether sensed data from the one or more sensors indicates that a video-viewing precondition is present at the wrist-wearable device 102. In some embodiments, before video data is presented via the display 115 of the wrist wearable device 102, the method 800 determines that the viewing precondition is present at the wrist-wearable device 102.

In some embodiments, the video-viewing precondition is a sensor-based condition that must be present at the wrist-wearable device in order for the wrist-wearable device to present video data for viewing. While the video-viewing precondition is present at the wrist-wearable device and while the wrist-wearable device is causing presentation of both the video data and the audio data, the wrist-wearable device can also continue to receive video data via its own image sensor 135 (e.g., front-facing camera) and to provide that video data to the at least one other user. The term video-calling mode (e.g., video mode 206) can be used to describe operating the wrist-wearable device in a mode during which it both receives the video and audio data from a device of the at least one other user and also captures video and audio data that is sent to the device of the at least one other user (e.g., computing device 350; FIG. 10).

In some embodiments, the one or more sensors include (806-*a*) an inertial measurement unit (IMU), and the sensed data from the one or more sensors includes (806-*b*) the sensed data from the IMU that allows one or more processors of the wrist-wearable device to determine (e.g., estimate) a position and orientation of the wrist-wearable device 102 while it is worn on a wrist of the user. The IMU can be a component of the capsule portion (e.g., capsule portion or watch body 1004 and its IMU 1042, FIG. 10) and/or a component of the band portion (e.g., band portion 1012 and its IMU 1042, FIG. 10) of the wrist-wearable device. Further, determining whether the video-viewing precondition is present at the wrist-wearable device includes (806-*c*) determining whether the position and/or orientation of the wrist-wearable device indicates that the user's wrist is in a raised position or a lowered position, such that the video-viewing precondition is not present at the wrist-wearable device when the user's wrist is determined to be in the lowered position.

Some embodiments also make use of a video-capturing precondition, which as was noted above, can include the same or different preconditions relative to the video-viewing precondition. In some embodiments, the method 800 further includes, while the video call is ongoing and a video-capturing precondition is present (808-*a*) at the wrist-wearable device 102, capturing (808-*b*) additional video data and additional audio data via a camera (e.g., image sensor 135) integrated with the wrist-wearable device 102 and a microphone at the wrist-wearable device 102 (i.e., video-capture mode is on 406). The method 800 further includes sending (808-*c*) the additional video data and the addition audio data to a device associated with the at least one other user participating in the video call. The method 800 further includes in accordance with a determination that the video-capturing precondition is (808-*d*) not present at the wrist wearable device 102 (i.e., video-capture mode is off 260), ceasing (808-*e*) to capture the additional video data and sending (808-*f*) only the audio data to the device associated with the at least one other user (e.g., computing device 350).

Turning next to additional operations of the method 800 that are depicted in FIG. 8B, in some embodiments, determining whether the video-capturing precondition is present at the wrist-wearable device 102 includes determining (810-*a*) whether the position and/or orientation of the wrist-wearable device 102 indicates that the user's wrist is in the raised position or the lowered position. The video-capturing precondition is (810-*b*) not present at the wrist-wearable device 102 when the user's wrist is determined to be in the lowered position. Alternatively, the video-capturing precondition is (810-*c*) present at the wrist-wearable device 102 when the user's wrist is determined to be in the raised position. For example, the wrist-wearable device 102 can determine, based on the sensor data, that the user's wrist is just below the user's waist 105, and thus in a lowered position. The position and/or orientation of the sensor data can also be used by the wrist-wearable device 102 to determine whether a video-viewing precondition or a video-capturing precondition is present. For example, the sensor data can indicate that the user's wrist is above the eye level of the user, and thus in the raised position.

In some embodiments, when it is determined that the user's wrist is in the raised position, the video-viewing precondition is satisfied only if the user's wrist is (820-*a*) also positioned such that the display 115 of the wrist-wearable device 102 is viewable by the user. The method 800 further includes while the user's wrist is in the raised position and the display is (820-*b*) viewable by the user, determining (820-*c*) that the video-capturing precondition is present at the wrist-wearable device 102 and the video-viewing precondition is not present at the wrist-wearable device 102. Based on the determination (820-*c*) that the video-capturing precondition is present at the wrist-wearable device 102 and the video-viewing precondition is not present at the wrist-wearable device 102, sending (820-*d*) the additional video data and the additional audio data to the device of the at least one other user and causing presentation of only the audio data at the speaker that is in communication with the wrist-wearable device 102.

In some embodiments, while the video is ongoing and the video-capturing precondition is present at the wrist-wearable device, the method 800 includes replacing (812) the user's face in a portion of the additional video data with an avatar representing the user's face. For example, rather than including only live video data captured by the image sensor 135 at the wrist-wearable device 102, the additional video data can be modified to include an avatar in place of the user's face as it was captured by the image sensor 135 with the live video data. This can be done based on a request from a user to do so or can be done automatically, without user input, based on determinations made by the wrist-wearable device 102 using additional sensor from the one or more sensors.

In some embodiments, replacing the user's face in the portion of the additional video data is (814) performed in accordance with a determination that additional sensor data from the one or more sensors indicates (based on a determination made by the wrist-wearable device 102) that the user's face should be replaced in the portion of the additional video data.

Figure 8C:
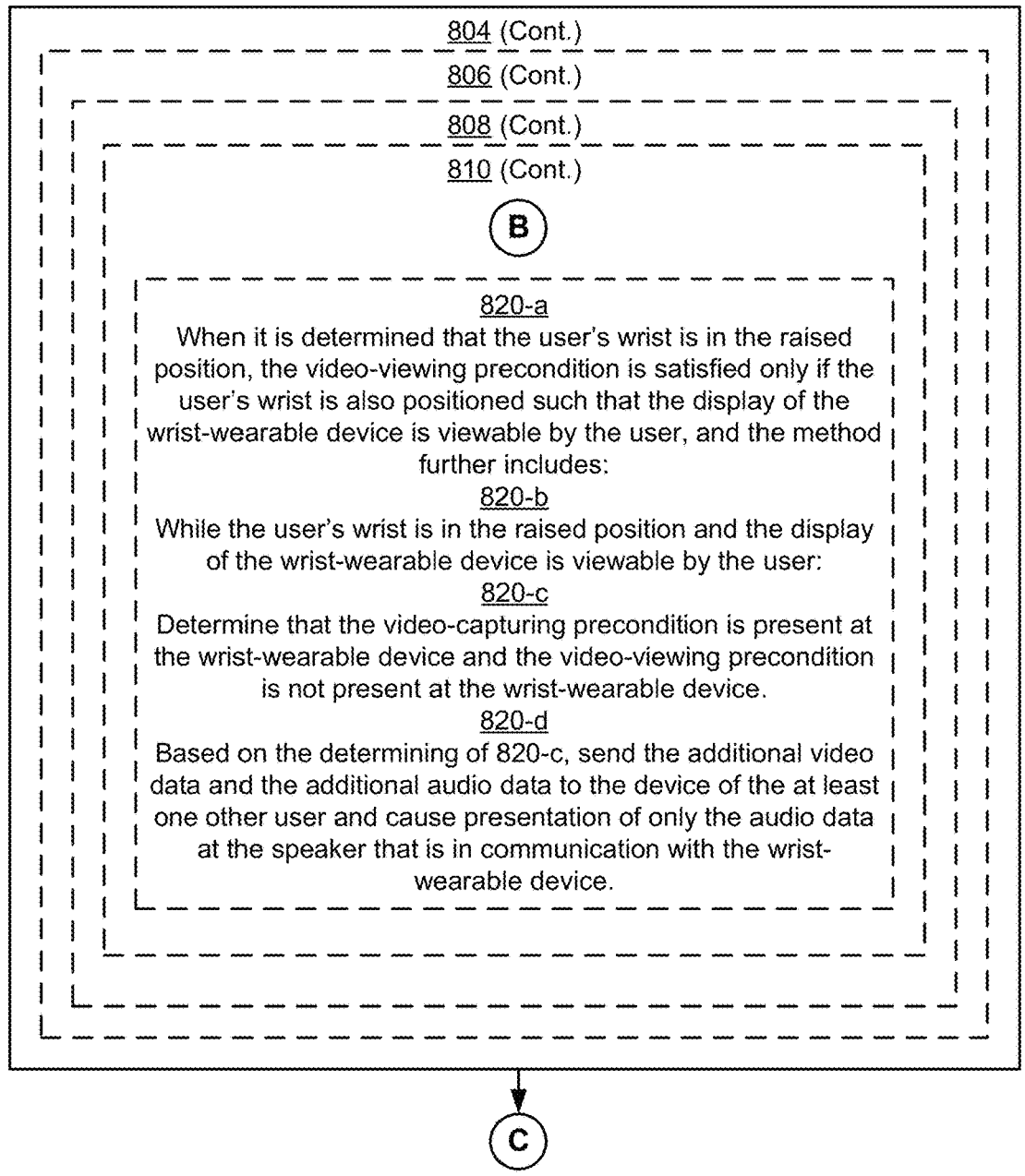

Turning next to the additional operations of method 800 shown in FIG. 8C, in some embodiments, the additional sensor data is (816) obtained from one or more of an ambient noise sensor, an ambient light sensor, a location sensor, and a biometric sensor. For example, the determination that the additional sensor data indicates that the user's face should be replaced in the portion of the additional video data can be made based on a current heart rate of the user as measured by a heart-rate sensor (one type of a biometric sensor) exceeding a predefined heart rate threshold, which can indicate that the user is currently exercising and would prefer to use an avatar to represent their face in the portion of the additional video data, instead of displaying a sweaty or disheveled face. As another example, the determination that the additional sensor data from the one or more sensors indicates that the user's face should be replaced in the portion of the additional video data can be made based on the lighting of the surrounding room or area measured by an ambient light sensor below a predefined brightness threshold, which can indicate that there is not enough lighting such that the user is visible in the captured video data and would prefer to use an avatar to represent their face in the portion of the additional video data, instead of displaying a dark screen. In an additional example, the user can specify locations that they would not like to capture video data (e.g., at work) and based on the additional sensor data (captured by a location sensor (e.g., GPS)) indicating that the user is at a specified location, the wrist-wearable device 102 can cease capturing video data and use an avatar to the user's face in the portion of the additional video data. Additional examples and details regarding the replacement of portions of video data with an avatar were provided above in reference to FIGS. 5A-5C, which operations for use of an avatar can also be used in conjunction with the method 800.

In some embodiments, replacing the user's face in the portion of the additional video data with an avatar is (818) performed based on an instruction from the user. For example, as shown in FIGS. 3A-3F, a user interface element (e.g., video toggle button 320) can be presented during the video call that allows the user to provide the instruction to replace their face with an avatar representing their face by simply clicking on the user interface element (i.e., disabling the image sensor 135 such that the avatar is used instead of the users captured image data). Changing back to again include their face instead of the avatar representation can then achieved by clicking on user interface element, which is shown in FIGS. 3A-3F (e.g., video toggle button 320).

In some embodiments, the display 115 being viewable by the user includes that the display 115 is at a particular viewing angle that allows the user to see substantially all of the display 115 (e.g., the display 115 is positioned at an angle relative the user's eyes, such that when the user is looking towards the display 115, their eyes can view substantially all of the display 115 at a viewing angle no greater than 20 degrees, 30 degrees, or 45 degrees). In this way, use of the video-capturing precondition further helps (in addition to use of the video-viewing precondition) to ensure that power consumption is managed appropriately to avoid draining the power source and to avoid unsafe heat conditions at the wrist-wearable device.

In some embodiments, only the video-viewing precondition is used and no separate video-capturing precondition is used, such that the determination as to whether to send the local video and audio data from the wrist-wearable device can also be tied to the video-viewing precondition and need not be tied to a separate video-capturing precondition (e.g., in these embodiments, when the video-viewing precondition is present, then both video and audio can be sent to the other user's device; and, when the video-viewing precondition is not present, then only audio would be sent to the other user's device).

Figure 12:
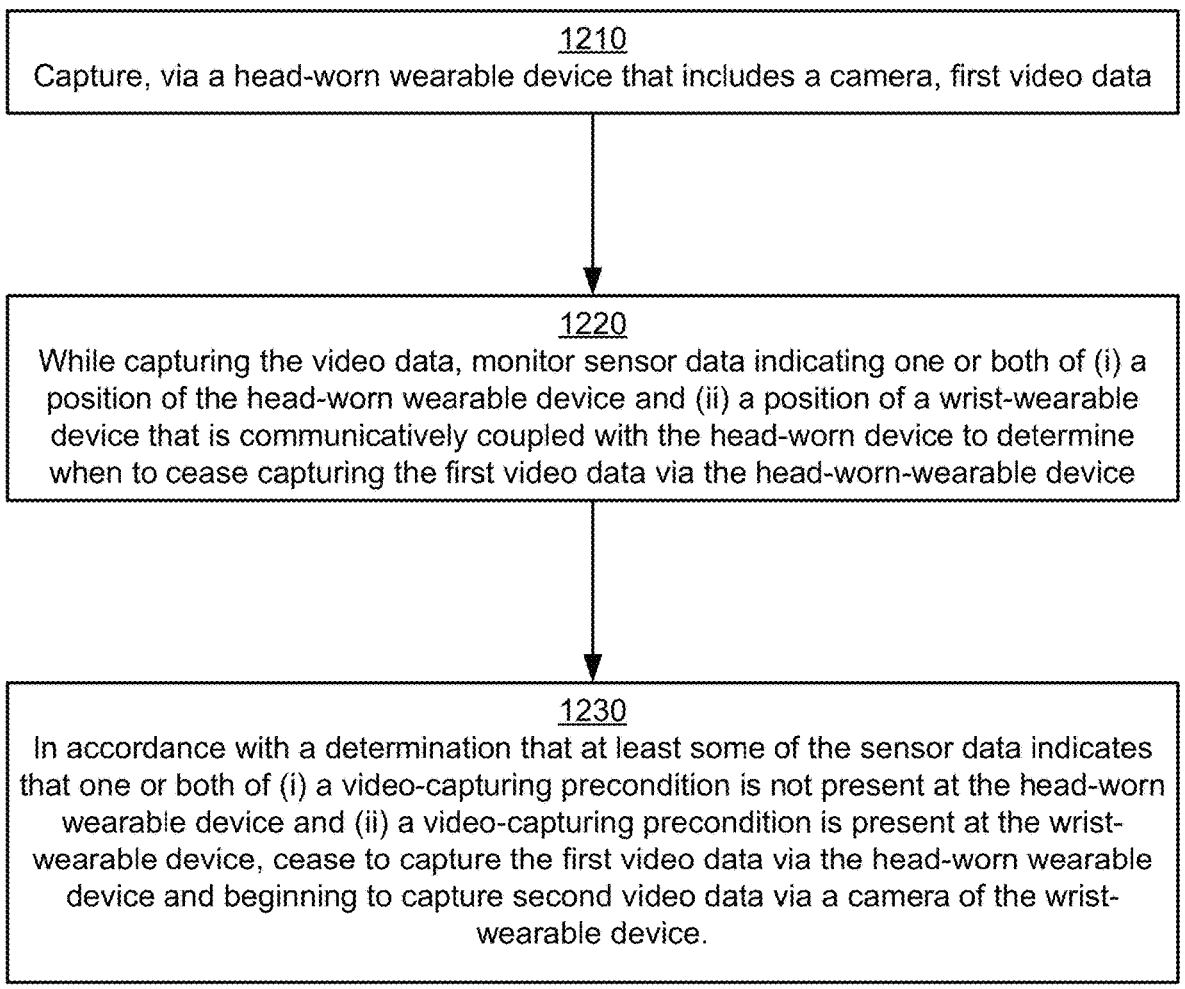
FIG. 12 illustrates a detailed flow diagram of a method of a coordinated video capturing technique for a head-worn wearable device and a wrist-wearable device (e.g., creating coordinated video using video data captured by a camera of the wrist-wearable device and by a camera of the wrist-wearable device), according to some embodiments.

While the primary example provided herein relates to use of video-viewing preconditions to manage power consumption and processor utilization at the wrist-wearable device (e.g., by automatically and without user intervention switching between audio and video calling modes), the use of video-viewing preconditions also applies to other circumstances in which a wrist-wearable device is presenting a video stream, such as playing a movie, tv show, or other video content (e.g., examples of this were discussed above in reference to FIGS. 6 and 7 and below in reference to FIGS. 11 and 12). Thus, the techniques described herein are not limited to use in conjunction with video calling alone but are instead applicable to additional circumstances in which video content is presented at a wrist-wearable device such that the ability to intelligently switch between displaying video and displaying audio only helps to properly manage power consumption at the wrist-wearable device.

Turning next to the operations of method 800 shown in FIG. 8D, the method 800 includes in accordance with a determination that the video-viewing precondition is not present at the wrist-wearable device 102, causing (822) presentation of only the audio data and not the video data. In some embodiments, the method 800 includes while causing the presentation of only the audio data and not the video data, determining (824-*a*) whether sensed data from the one or more sensors indicates that the video-viewing precondition is present at the wrist-wearable device 102, and in accordance with a determination that the video-viewing precondition is present at the wrist-wearable device 102, causing (824-*b*) presentation of both the audio data and the video data. In some embodiments, the determination is conducted automatically and without instructions from the user.

As shown in the flowchart of FIG. 6 (operations of which can be performed in conjunction with method 800), the method continues to monitor sensed data from the one or more sensors to continuously determine whether or not the video-viewing precondition is present at the wrist-wearable device 102 and to then determine whether to either (i) cause presentation of both the video data and the audio data or (ii) cause presentation of only the audio data and not the video data. In some embodiments, the determinations are continuous. Alternatively, in some embodiments, to further preserve computing resources, the determinations are substantially continuous, such that they occur at predetermined time intervals, such as every 50-100 ms. For example, the wrist-wearable device 102, after it determines that the video-viewing precondition is not present at the wrist-wearable device 102, switches to operate in what can be referred to as an audio-calling mode in which the wrist-wearable device 102 no longer causes presentation of the video data and instead only causes presentation of the audio data (in some embodiments, the wrist-wearable device 102 also only captures audio data (and not video data) during the audio-calling mode). Thus, these novel techniques of dynamically switching between a video-calling mode and an audio-calling mode ensure (i) that power is not drained at a battery of the wrist-wearable device 102 too quickly (in certain instances, even a two-minute video call can drain a battery of the wrist-wearable device 102), (ii) that computing resources are preserved for other processing tasks, and (iii) that the wrist-wearable device 102 does not become too hot such that it causes an injury to the user or damages any of the components of the wrist-wearable device 102.

In some embodiments, the method 800 includes in conjunction with causing presentation of only the audio data and not the video data, operating (826) the display 115 in a low-power mode in which no video content is displayed at the display 115. In some embodiments, the display 115 can also be turned off even while the wrist-wearable device 102 continues to cause presentation of only the audio data and not the video data.

In some embodiments, the one or more sensors include (828-*a*) a sensor for monitoring a temperature at the wrist wearable device, and the method 800 further includes in accordance with a determination that the temperature at the wrist-wearable device 102 reaches or exceeds a predefined temperature value, displaying (828-*b*) on the display 115 of the wrist-wearable device 102 a user interface element that provides a warning to the user that the wrist-wearable device 102 needs to cool down. For example, as shown in FIG. 3A-3F, the wrist-wearable device 102 presents a warning message, in which a user is instructed to either lower their wrist or manually disable video calling to ensure that the wrist-wearable device 102 is able to cool down. As shown in FIGS. 3A-3F, the user interface element (e.g., 316, 318, 326) that includes the warning can be displayed as overlaying the video data that is being presented on the display 115 of the wrist-wearable device 102. While this one example uses a textual warning to the user, other embodiments can also use other feedback to provide warnings to a user in conjunction with the textual warning or as alternatives thereto (for instance, an audio warning can be presented, and/or haptic feedback can be provided, etc.).

In some embodiments, the determination that the video-viewing precondition is not present at the wrist-wearable device is made (830) after displaying the warning to the user and is based in part on the temperature at the wrist-wearable device having reached or exceeded the predefined temperature value for a threshold period of time. As an example, instead of or in addition to using the threshold period of time (that the user has reached or exceeded the predefined temperature value), some embodiments, as described above in reference to FIGS. 3A-3B, can also utilize an additional predefined temperature value (that is greater than the predefined temperature value) to determine that the video-viewing precondition is not present.

Turning next to FIG. 8E, in some embodiments, the determination that the temperature at the wrist-wearable device 102 has exceeded the predefined temperature value for the threshold period of time is (832) made while a position-based video-viewing precondition remains present at the wrist-wearable device 102. In other words, the temperature check can serve as a safety override, such that even if the video-viewing precondition is present (and therefore would normally allow for continued operation in the video-calling mode), that will be overridden by a determination that conditions at the wrist wearable device are no longer safe for continued operation in the video-calling mode. In some embodiments, the temperature at the wrist-wearable device 102 is a temperature value that is based on more than one temperature input, including one or more of the following temperature inputs: an ambient temperature near the wrist-wearable device 102, a temperature of the user's skin near the wrist-wearable device 102, and a temperature of a battery that is powering the wrist-wearable device 102.

Continuing with the discussion on FIG. 8E, in some embodiments, the method 800 includes in accordance with a determination that the temperature at the wrist-wearable device 102 is below the predefined temperature value and that the position-based video-viewing precondition is present at the wrist-wearable device 102, resuming (834) display 115 of the video data at the display 115 of the wrist-wearable device 102.

In some embodiments, the method 800 includes detecting (836-*a*) that another electronic device associated with the user is located in proximity to (e.g., within a BLE range of or on the same Wi-Fi network as) the wrist-wearable device 102. The other electronic device has one or more of a larger capacity battery than a battery of the wrist-wearable device 102 and a connection to a power source. In accordance with a determination that a display of the other electronic device is available, the method 800 further includes ceasing (836-*b*) to present the video data via the display 115 of the wrist-wearable device 102 and providing to the other electronic device data to cause presentation of the video data on the display 115 of the other electronic device. Alternatively, in some embodiments, the method 800 includes detecting that a heads-up display on the smart glasses (e.g., smart glasses 150; FIG. 1E) associated with the user is located in proximity to the wrist-wearable device 102, and in accordance with a determination that a heads-up display on the smart glasses is available, the method 800 further includes ceasing to present the video data via the display 115 of the wrist-wearable device 102 and providing to the heads-up display on the smart glasses data to cause presentation of the video data on the display 115 of the heads-up display on the smart glasses. In some embodiments, the other electronic device (838) is a laptop, a tablet, a smartphone, or a smart display. In this way, by making use of display capabilities of nearby devices, as shown and described in FIGS. 4A-4C, the techniques described herein can further help to reduce power-consumption and temperature levels at the wrist-wearable device 102, thereby helping to avoid draining the battery of the wrist-wearable device 102, avoid unsafe temperature conditions at the wrist-wearable device 102, and ensuring longer video calls by making use of displays available at nearby devices.

In some embodiments, the method 800 includes in accordance with a determination that the wrist-wearable device 102 is communicatively coupled with smart glasses, the speaker that is in communication with the wrist-wearable device 102 that is used to present the audio data is a speaker coupled with the smart glasses, and in accordance with a determination that the wrist-wearable device 102 is not communicatively coupled with smart glasses, the speaker that is in communication with the wrist-wearable device 102 that is used to present the audio data is a speaker directly coupled with the wrist-wearable device 102.

Figure 9A:
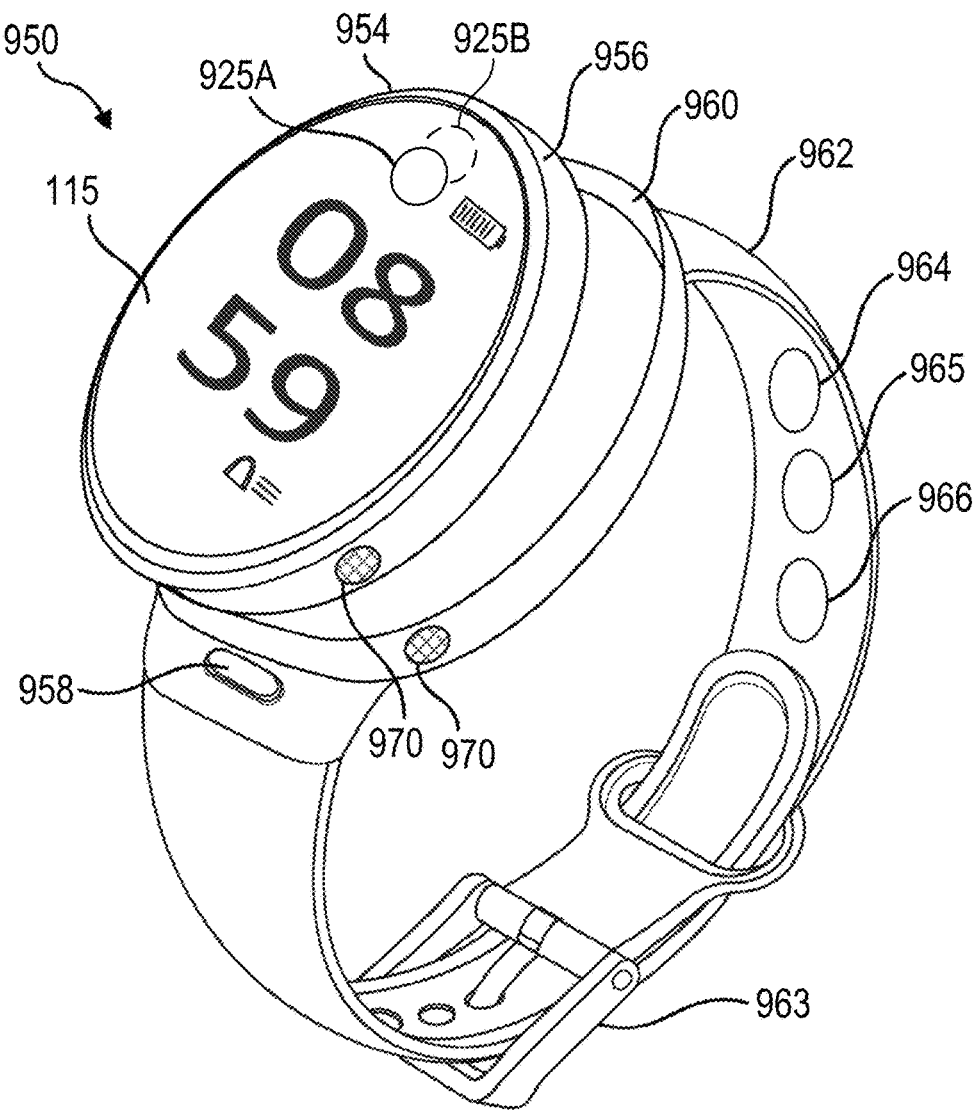
FIGS. 9A-9B illustrate an example wrist-wearable device used in conjunction with the techniques described herein, in accordance with some embodiments. Further.
Figure 9B:
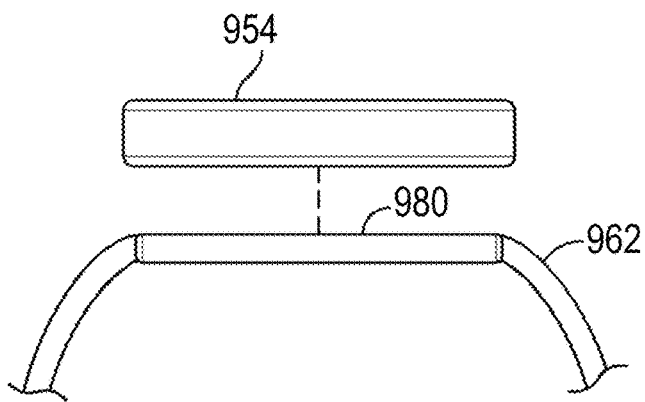

FIGS. 9A and 9B illustrate an example wrist-wearable device 950, in accordance with some embodiments. The wrist-wearable device 950 is an instance of the wearable device 102 described above in reference to FIGS. 1A-8E, such that wearable device 102 should be understood to have the features of wearable device 950 and vice versa. FIG. 9A illustrates a perspective view of the wrist-wearable device 950 that includes a watch body 954 decoupled from a watch band 962. Watch body 954 and watch band 962 can have a substantially rectangular or circular shape and can be configured to allow a user to wear the wrist-wearable device 950 on a body part (e.g., a wrist). The wrist-wearable device 950 can include a retaining mechanism 963 (e.g., a buckle, a hook and loop fastener, etc.) for securing watch band 962 to the user's wrist. The wrist-wearable device 950 can also include a coupling mechanism 960 (e.g., a cradle) for detachably coupling capsule or watch body 954 (via a coupling surface 956 of the watch body 954) to watch band 962.

The wrist-wearable device 950 can perform various functions associated with ongoing video calls as described above with reference to FIGS. 1A-8E and 13A-13D and operations of the methods depicted in FIGS. 11-12 and 14. As will be described in more detail below with reference to FIG. 10, functions executed by the wrist-wearable device 950 can include, without limitation, display of visual content to the user (e.g., visual content displayed on display screen 115), sensing user input (e.g., sensing a touch on button 958, sensing biometric data on sensor 964, sensing neuromuscular signals on neuromuscular sensor 965, etc.), messaging (e.g., text, speech, video, etc.), image capture, wireless communications (e.g., cellular, near field, Wi-Fi, personal area network, etc.), location determination, financial transactions, providing haptic feedback, alarms, notifications, biometric authentication, health monitoring, sleep monitoring, etc. These functions can be executed independently in watch body 954, independently in watch band 962, and/or in communication between watch body 954 and watch band 962. In some embodiments, functions can be executed on the wrist-wearable device 950 in conjunction with an artificial-reality environment which includes, but is not limited to, virtual-reality (VR) environments (including non-immersive, semi-immersive, and fully-immersive VR environments), augmented-reality environments (including marker-based augmented-reality environments, markerless augmented-reality environments, location-based augmented-reality environments, and projection-based augmented-reality environments), hybrid reality, and other types of mixed-reality environments. As the skilled artisan will appreciate upon reading the descriptions provided herein, the novel wearable devices described herein can be used with any of these types of artificial-reality environments.

The watch band 962 can be configured to be worn by a user such that an inner surface of the watch band 962 is in contact with the user's skin. When worn by a user, sensor 964 is in contact with the user's skin. The sensor 964 can be a biosensor that senses a user's heart rate, saturated oxygen level, temperature, sweat level, muscle intentions, or a combination thereof. The watch band 962 can include multiple sensors 964 that can be distributed on an inside and/or an outside surface of the watch band 962. Additionally, or alternatively, the watch body 954 can include the same or different sensors than the watch band 962 (or the watch band 962 can include no sensors at all in some embodiments). For example, multiple sensors can be distributed on an inside and/or an outside surface of watch body 954. As described below with reference to FIG. 10, the watch body 954 can include, without limitation, front-facing image sensor 925A and/or rear-facing image sensor 925B (each an instance of image sensor 135; FIGS. 1A-1F), a biometric sensor, an IMU, a heart rate sensor, a saturated oxygen sensor, a neuromuscular sensor(s) (e.g., EMG sensors 1046 FIG. 10), an altimeter sensor, a temperature sensor, a bioimpedance sensor, a pedometer sensor, an optical sensor, a touch sensor, a sweat sensor, etc. The sensor 964 can also include a sensor that provides data about a user's environment including a user's motion (e.g., an IMU), altitude, location, orientation, gait, or a combination thereof. The sensor 964 can also include a light sensor (e.g., an infrared light sensor, a visible light sensor) that is configured to track a position and/or motion of watch body 954 and/or watch band 962. Watch band 962 can transmit the data acquired by the sensor 964 to watch body 954 using a wired communication method (e.g., a UART, a USB transceiver, etc.) and/or a wireless communication method (e.g., near field communication, Bluetooth™, etc.). Watch band 962 can be configured to operate (e.g., to collect data using sensor 964) independent of whether watch body 954 is coupled to or decoupled from watch band 962.

The watch band 962 and/or watch body 954 can include a haptic device 966 (e.g., a vibratory haptic actuator) that is configured to provide haptic feedback (e.g., a cutaneous and/or kinesthetic sensation, etc.) to the user's skin. The sensor 964 and/or haptic device 966 can be configured to operate in conjunction with multiple applications including, without limitation, health monitoring, social media, game playing, and artificial reality (e.g., the applications associated with artificial reality).

In some examples, the watch band 962 can include a neuromuscular sensor 965 (e.g., an electromyography (EMG) sensor, a mechanomyogram (MMG) sensor, a sonomyography (SMG) sensor, etc.). Neuromuscular sensor 965 can sense a user's intention to perform certain motor actions. The sensed muscle intention can be used to control certain user interfaces displayed on the display 115 of the device 102 and/or can be transmitted to device responsible for rendering an artificial-reality environment (e.g., a head-mounted display) to perform an action in an associated artificial-reality environment, such as to control the motion of a virtual device displayed to the user.

Signals from neuromuscular sensor 965 can be used to provide a user with an enhanced interaction with a physical object and/or a virtual object in an artificial-reality application generated by an artificial-reality system (e.g., user interface objects presented on the display 115, or another computing device 650 (e.g., a head-mounted display)). Signals from neuromuscular sensor 965 can be obtained (e.g., sensed and recorded) by one or more neuromuscular sensors 965 of watch band 962. Although FIG. 9A shows one neuromuscular sensor 965, watch band 962 can include a plurality of neuromuscular sensors 965 arranged circumferentially on an inside surface of watch band 962 such that the plurality of neuromuscular sensors 965 contact the skin of the user. Watch band 962 can include a plurality of neuromuscular sensors 965 arranged circumferentially on an inside surface of watch band 962. Neuromuscular sensor 965 can sense and record neuromuscular signals from the user as the user performs muscular activations (e.g., movements, gestures, etc.). The muscular activations performed by the user can include static gestures, such as placing the user's hand palm down on a table; dynamic gestures, such as grasping a physical or virtual object; and covert gestures that are imperceptible to another person, such as slightly tensing a joint by co-contracting opposing muscles or using sub-muscular activations. The muscular activations performed by the user can include symbolic gestures (e.g., gestures mapped to other gestures, interactions, or commands, for example, based on a gesture vocabulary that specifies the mapping of gestures to commands).

The wrist-wearable device 950 can include a coupling mechanism (also referred to as a cradle) for detachably coupling watch body 954 to watch band 962. A user can detach watch body 954 from watch band 962 in order to reduce the encumbrance of the wrist-wearable device 950 to the user. The wrist-wearable device 950 can include a coupling surface 956 on the watch body 954 and/or coupling mechanism(s) 960 (e.g., a cradle, a tracker band, a support base, a clasp). A user can perform any type of motion to couple watch body 954 to watch band 962 and to decouple watch body 954 from watch band 962. For example, a user can twist, slide, turn, push, pull, or rotate watch body 954 relative to watch band 962, or a combination thereof, to attach watch body 954 to watch band 962 and to detach watch body 954 from watch band 962.

As shown in the example of FIG. 9A, watch band coupling mechanism 960 can include a type of frame or shell that allows watch body 954 coupling surface 956 to be retained within watch band coupling mechanism 960. Watch body 954 can be detachably coupled to watch band 962 through a friction fit, magnetic coupling, a rotation-based connector, a shear-pin coupler, a retention spring, one or more magnets, a clip, a pin shaft, a hook and loop fastener, or a combination thereof. In some examples, watch body 954 can be decoupled from watch band 962 by actuation of release mechanism 970. The release mechanism 970 can include, without limitation, a button, a knob, a plunger, a handle, a lever, a fastener, a clasp, a dial, a latch, or a combination thereof.

The wrist-wearable device 950 can include a single release mechanism 970 or multiple release mechanisms 970 (e.g., two release mechanisms 970 positioned on opposing sides of the wrist-wearable device 950 such as spring-loaded buttons). As shown in FIG. 9A, the release mechanism 220 can be positioned on watch body 954 and/or watch band coupling mechanism 960. Although FIG. 9A shows release mechanism 970 positioned at a corner of watch body 954 and at a corner of watch band coupling mechanism 960, the release mechanism 970 can be positioned anywhere on watch body 954 and/or watch band coupling mechanism 960 that is convenient for a user of wrist-wearable device 950 to actuate. A user of the wrist-wearable device 950 can actuate the release mechanism 970 by pushing, turning, lifting, depressing, shifting, or performing other actions on the release mechanism 970. Actuation of the release mechanism 970 can release (e.g., decouple) the watch body 954 from the watch band coupling mechanism 960 and the watch band 962 allowing the user to use the watch body 954 independently from watch band 962. For example, decoupling the watch body 954 from the watch band 962 can allow the user to capture images using rear-facing image sensor 925B.

FIG. 9B is a side view of the wrist-wearable device 950. The wrist-wearable devices 950 of FIG. 9B can include a watch body interface 980 (another example of a cradle for the capsule portion of the device 102). The watch body 954 can be detachably coupled to the watch body interface 980. Watch body 954 can be detachably coupled to watch body interface 980 through a friction fit, magnetic coupling, a rotation-based connector, a shear-pin coupler, a retention spring, one or more magnets, a clip, a pin shaft, a hook and loop fastener, or a combination thereof.

In some examples, watch body 954 can be decoupled from watch body interface 980 by actuation of a release mechanism. The release mechanism can include, without limitation, a button, a knob, a plunger, a handle, a lever, a fastener, a clasp, a dial, a latch, or a combination thereof. In some examples, the wristband system functions can be executed independently in watch body 954, independently in watch body interface 980, and/or in communication between watch body 954 and watch body interface 980. Watch body interface 980 can be configured to operate independently (e.g., execute functions independently) from watch body 954. Additionally, or alternatively, watch body 954 can be configured to operate independently (e.g., execute functions independently) from watch body interface 980. As will be described in more detail below with reference to the block diagram of FIG. 10, watch body interface 980 and/or watch body 954 can each include the independent resources required to independently execute functions. For example, watch body interface 980 and/or watch body 954 can each include a power source (e.g., a battery), a memory, data storage, a processor (e.g., a CPU), communications, a light source, and/or input/output devices.

In this example, watch body interface 980 can include all of the electronic components of watch band 962. In additional examples, one or more electronic components can be housed in watch body interface 980 and one or more other electronic components can be housed in portions of watch band 962 away from watch body interface 980.

Figure 9D:
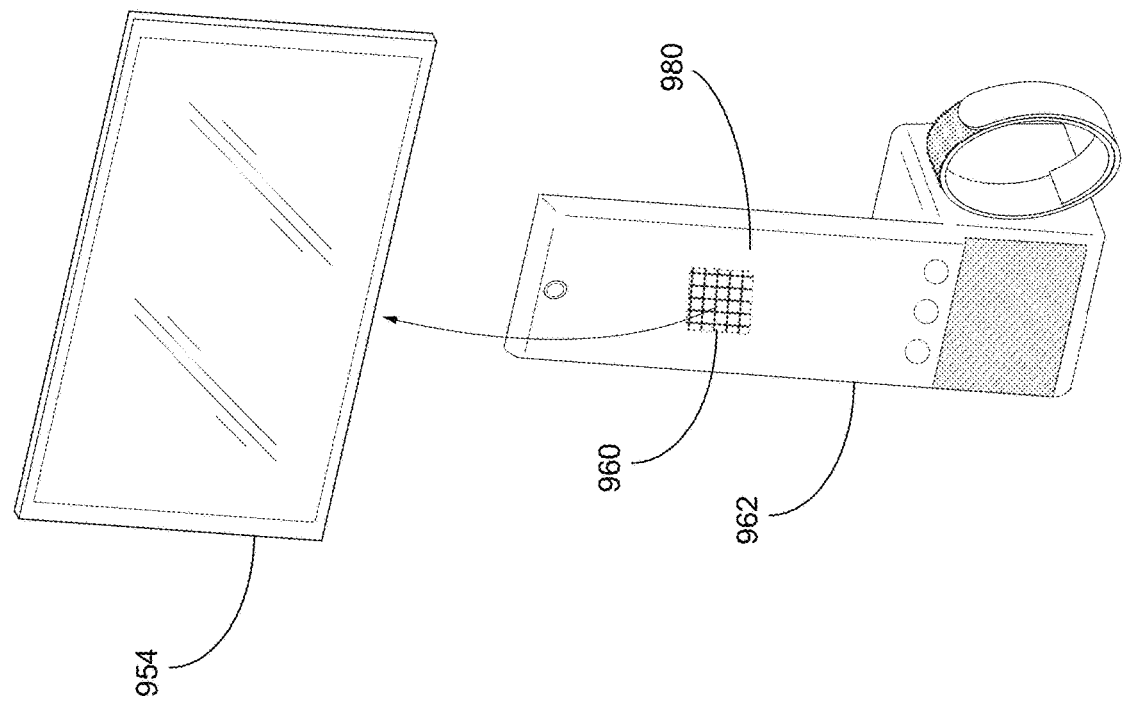
FIGS. 9C-9D illustrate an example portable device used in conjunction with the techniques described herein, in accordance with some embodiments.
Figure 9C:
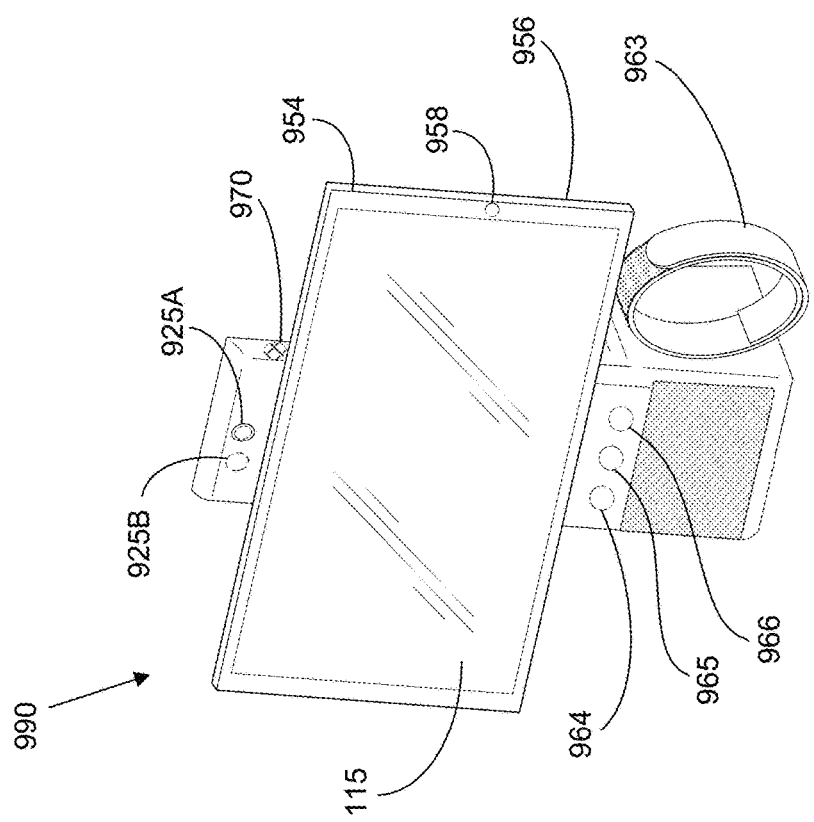

FIGS. 9C and 9D illustrates a portable device 990, in accordance with some embodiments. The portable device 990 is an instance of the portable device 103 described above in reference to FIGS. 1G-1L, such that portable device 103 should be understood to have the features of portable device 990 and vice versa. The portable device 990 includes similar components as the wrist-wearable device 950. For example, the portable device 990 includes a body 954 (e.g., removable or portable display) that can be decoupled from a base 962 (which is similar in function to the watch band 962). The portable device 990 can include a retaining mechanism 963 for securing the base 962 to the user's wrist. Further, the portable device 990 can also include a coupling mechanism 960 (e.g., a cradle) for detachably coupling capsule or body 954 (via a coupling surface 956 of the body 954) to base 962.

The portable device 990 can perform various functions associated with ongoing video calls as described above with reference to FIGS. 1A-8E and 13A-13D and operations of the methods depicted in FIGS. 11-12 and 14. The portable device 990 can include, without limitation, display of visual content to the user (e.g., visual content displayed on display screen 115), sensing user input (e.g., sensing a touch on button 958, sensing biometric data on sensor 964, sensing neuromuscular signals on neuromuscular sensor 965, etc.), messaging (e.g., text, speech, video, etc.), image capture, wireless communications (e.g., cellular, near field, Wi-Fi, personal area network, etc.), location determination, financial transactions, providing haptic feedback, alarms, notifications, biometric authentication, health monitoring, sleep monitoring, etc. The body 954 can include, without limitation, front-facing image sensor 925A and/or rear-facing image sensor 925B (each an instance of image sensor 135; FIGS. 1A-1L). The base 962 and/or body 954 can include a haptic device 966 (e.g., a vibratory haptic actuator) that is configured to provide haptic feedback (e.g., a cutaneous and/or kinesthetic sensation, etc.) to the user. These functions can be executed independently in body 954, independently in base 962, and/or in communication between body 954 and base 962. In some embodiments, functions can be executed on the wrist-wearable device 950 in conjunction with an artificial-reality environment. As the skilled artisan will appreciate upon reading the descriptions provided herein, the novel wearable devices described herein can be used with any type of artificial-reality environment.

As shown in the example of FIG. 9D, coupling mechanism 960 can include a type of frame or shell that allows body 954 coupling surface 956 to be retained within body coupling mechanism 960. Body 954 can be detachably coupled to base 962 through a friction fit, magnetic coupling, a rotation-based connector, a shear-pin coupler, a retention spring, one or more magnets, a clip, a pin shaft, a hook and loop fastener, or a combination thereof. In some examples, body 954 can be decoupled from base 962 by actuation of release mechanism 970. The release mechanism 970 can include, without limitation, a button, a knob, a plunger, a handle, a lever, a fastener, a clasp, a dial, a latch, or a combination thereof.

The device 950 can include a single release mechanism 970 or multiple release mechanisms 970 (e.g., two release mechanisms 970 positioned on opposing sides of the wrist-wearable device 950 such as spring-loaded buttons). As shown in FIG. 9C, the release mechanism 220 can be positioned on body 954 and/or body coupling mechanism 960. Although FIG. 9C shows release mechanism 970 positioned at a corner of body 962, the release mechanism 970 can be positioned anywhere that is convenient for a user of the portable device 990 to actuate.

FIG. 9D is a view of the portable device 990 with a decoupled watch body 954. The portable device 990 of FIG. 9C can include a body interface 980. The body 954 can be detachably coupled to the body interface 980. Body 954 can be detachably coupled to body interface 980 through a friction fit, magnetic coupling, a rotation-based connector, a shear-pin coupler, a retention spring, one or more magnets, a clip, a pin shaft, a hook and loop fastener, or a combination thereof. In some examples, body 954 can be decoupled from body interface 980 by actuation of a release mechanism 970.

In some examples, the system functions can be executed independently in body 954, independently in body interface 980, and/or in communication between body 954 and body interface 980. Body interface 980 can be configured to operate independently (e.g., execute functions independently) from body 954. Additionally, or alternatively, body 954 can be configured to operate independently (e.g., execute functions independently) from body interface 980. As will be described in more detail below with reference to the block diagram of FIG. 10, body interface 980 and/or body 954 can each include the independent resources required to independently execute functions. For example, body interface 980 and/or body 954 can each include a power source (e.g., a battery), a memory, data storage, a processor (e.g., a CPU), communications, a light source, and/or input/output devices.

FIG. 10 is a block diagram of a wrist-wearable device system 1000, according to at least one embodiment of the present disclosure. The wrist-wearable device 102 described in detail above is an example wrist-wearable device system 1000, so wrist-wearable device 102 will be understood to include the components shown and described for system 1000 below. In some embodiments, the portable device 103 described above in reference to FIGS. 1G-1L, 9C, and 9D includes one or more components shown and described for system 1000 below. The wrist-wearable device system 1000 can have a split architecture (e.g., a split mechanical architecture, a split electrical architecture) between a body 1004 (e.g., a capsule or watch body 954) and a watch band 1012 (e.g., a band portion or watch band 962), which was described above in reference to FIGS. 9A-9D. Each of watch body 1004 and watch band 1012 can have a power source, a processor, a memory, sensors, a charging device, and a communications device that enables each of watch body 1004 and watch band 1012 to execute computing, controlling, communication, and sensing functions independently in watch body 1004, independently in watch band 1012, and/or in communication between watch body 1004 and watch band 1012.

For example, watch body 1004 can include battery 1028, CPU 1026, storage 1002, heart rate sensor 1058, EMG sensor 1046, SpO2 sensor 1054, altimeter 1048, IMU 1042, random access memory 1003, charging input 1030 and communication devices NFC 1015, LTE 1018, and Wi-Fi/Bluetooth™ 1020. Similarly, watch band 1012 can include battery 1038, microcontroller unit 1052, memory 1050, heart rate sensor 1058, EMG sensor 1046, SpO2 sensor 1054, altimeter 1048, IMU 1042, charging input 1034 and wireless transceiver 1040. In some examples, a level of functionality of at least one of watch band 1012 or watch body 1004 can be modified when watch body 1004 is detached from watch band 1012. The level of functionality that can be modified can include the functionality of at least one sensor (e.g., heart rate sensor 1058, EMG sensor 1046, etc.). Each of watch body 1004 and watch band 1012 can execute instructions stored in storage 1002 and memory 1050 respectively that enables at least one sensor (e.g., heart rate sensor 1058, EMG sensor 1046, etc.) in watch band 1012 to acquire data when watch band 1012 is detached from watch body 1004 and when watch band 1012 is attached to watch body 1004.

Watch body 1004 and watch band 1012 can further execute instructions stored in storage 1002 and memory 1050 respectively that enables watch band 1012 to transmit the acquired data to watch body 1004 (or other computing device such as a head mounted display or other computing device 350; FIG. 3) using wired communications 1027 and/or wireless transceiver 1040. For example, watch body 1004 can display visual content to a user on touchscreen display 1013 (e.g., an instance of display 115) and play audio content on speaker. Watch body 1004 can receive user inputs such as audio input from microphone and touch input from buttons 1024. Watch body 1004 can also receive inputs associated with a user's location and/or surroundings. For example, watch body 1004 can receive location information from GPS 1016 and/or altimeter 1048 of watch band 1012.

Watch body 1004 can receive image data from at least one image sensor 135 (e.g., a camera). Image sensor 135 can include front-facing image sensor 925A (FIG. 9A) and/or rear-facing image sensor 925B (FIG. 9B). Front-facing image sensor 925A and/or rear-facing image sensor 925B can capture wide-angle images of the area surrounding front-facing image sensor 925A and/or rear-facing image sensor 925B such as hemispherical images (e.g., at least hemispherical, substantially spherical, etc.), 180-degree images, 360-degree area images, panoramic images, ultra-wide area images, or a combination thereof. In some examples, front-facing image sensor 925A and/or rear-facing image sensor 925B can be configured to capture images having a range between 45 degrees and 360 degrees. Certain input information received by watch body 1004 (e.g., user inputs, etc.) can be communicated to watch band 1012. Similarly, certain input information (e.g., acquired sensor data, neuromuscular sensor data, etc.) received by watch band 1012 can be communicated to watch body 1004.

Watch body 1004 and watch band 1012 can receive a charge using a variety of techniques. In some embodiments, watch body 1004 and watch band 1012 can use a wired charging assembly (e.g., power cords) to receive the charge. Alternatively, or in addition, watch body 1004 and/or watch band 1012 can be configured for wireless charging. For example, a portable charging device can be designed to mate with a portion of watch body 1004 and/or watch band 1012 and wirelessly deliver usable power to a battery of watch body 1004 and/or watch band 1012.

Watch body 1004 and watch band 1012 can have independent power and charging sources to enable each to operate independently. Watch body 1004 and watch band 1012 can also share power (e.g., one can charge the other) via power management IC 1032 in watch body 1004 and power management IC 1036 in watch band 1012. Power management IC 1032 and power management IC 1036 can share power over power and ground conductors and/or over wireless charging antennas.

Wrist-wearable device system 1000 can operate in conjunction with a health monitoring application that acquires biometric and activity information associated with the user. The health monitoring application can be designed to provide information to a user that is related to the user's health. For example, wrist-wearable device system 1000 can monitor a user's physical activity by acquiring data from IMU 1042 while simultaneously monitoring the user's heart rate via heart rate sensor 1058 and saturated blood oxygen levels via SpO2 sensor 1054. CPU 1026 can process the acquired data and display health related information to the user on touchscreen display 1013.

Wrist-wearable device system 1000 can detect when watch body 1004 and watch band 1012 are connected to one another (e.g., mechanically connected and/or electrically or magnetically connected) or detached from one another. For example, pin(s) 505, power/ground connections 1060, wireless transceiver 1040, and/or wired communications 1027, can detect whether watch body 1004 and watch band 1012 are mechanically and/or electrically or magnetically connected to one another (e.g., detecting a disconnect between the one or more electrical contacts of power/ground connections 1060 and/or wired communications 1027). In some examples, when watch body 1004 and watch band 1012 are mechanically and/or electrically disconnected from one another (e.g., watch body 1012 has been detached from watch band 1012 as described with reference to FIGS. 9A-9C), watch body 1004 and/or watch band 1012 can operate with modified level of functionality (e.g., reduced functionality) as compared to when watch body 1004 and watch band 1012 are mechanically and/or electrically connected to one another. The modified level of functionality (e.g., switching from full functionality to reduced functionality and from reduced functionality to full functionality) can occur automatically (e.g., without user intervention) when wrist-wearable device system 1000 determines that watch body 1004 and watch band 1012 are mechanically and/or electrically disconnected from one another and connected to each other, respectively.

Modifying the level of functionality (e.g., reducing the functionality in watch body 1004 and/or watch band 1012) can reduce power consumption in battery 1028 and/or battery 1038. For example, any of the sensors (e.g., heart rate sensor 1058, EMG sensor 1046, SpO2 sensor 1054, altimeter 1048, etc.), processors (e.g., CPU 1026, microcontroller unit 1052, etc.), communications elements (e.g., NFC 1015, GPS 1016, LTE 1018, Wi-Fi/Bluetooth™ 1020, etc.), or actuators (e.g., haptics 1022, 1049, etc.) can reduce functionality and/or power consumption (e.g., enter a sleep mode) when watch body 1004 and watch band 1012 are mechanically and/or electrically disconnected from one another. Watch body 1004 and watch band 1012 can return to full functionality when watch body 1004 and watch band 1012 are mechanically and/or electrically connected to one another. The level of functionality of each of the sensors, processors, actuators, and memory can be independently controlled.

As described above, wrist-wearable device system 1000 can detect when watch body 1004 and watch band 1012 are coupled to one another (e.g., mechanically connected and/or electrically connected) or decoupled from one another. In some examples, watch body 1004 can modify a level of functionality (e.g., activate and/or deactivate certain functions) based on whether watch body 1004 is coupled to watch band 1012. For example, CPU 1026 can execute instructions that detect when watch body 1004 and watch band 1012 are coupled to one another and activate front-facing image sensor 925A. CPU 1026 can activate front-facing image sensor 925A based on receiving user input (e.g., a user touch input from touchscreen display 1013, a user voice command from microphone, a user gesture recognition input from EMG sensor 1046, etc.).

When CPU 1026 detects that watch body 1004 and watch band 1012 are decoupled from one another, CPU 1026 can modify a level of functionality (e.g., activate and/or deactivate additional functions). For example, CPU 1026 can detect when watch body 1004 and watch band 1012 are decoupled from one another and activate rear-facing image sensor 925B. CPU 1026 can activate rear-facing image sensor 925B automatically (e.g., without user input) and/or based on receiving user input (e.g., a touch input, a voice input, an intention detection, etc.). Automatically activating rear-facing image sensor 925B can allow a user to take wide-angle images without having to provide user input to activate rear-facing image sensor 925B.

In some examples, rear-facing image can be activated based on an image capture criterion (e.g., an image quality, an image resolution, etc.). For example, rear-facing image sensor 925B can receive an image (e.g., a test image). CPU 1026 and/or rear-facing image sensor 925B can analyze the received test image data and determine whether the test image data satisfies the image capture criterion (e.g., the image quality exceeds a threshold, the image resolution exceeds a threshold, etc.). Rear-facing image sensor 925B can be activated when the test image data satisfies the image capture criterion. Additionally, or alternatively, rear-facing image sensor 925B can be deactivated when the test image data fails to satisfy the image capture criterion.

In some examples, CPU 1026 can detect when watch body 1004 is coupled to watch band 1012 and deactivate rear-facing image sensor 925B. CPU 1026 can deactivate rear-facing image sensor 925B automatically (e.g., without user input) and/or based on receiving user input (e.g., a touch input, a voice input, an intention detection, etc.). Deactivating rear-facing image sensor 925B can automatically (e.g., without user input) reduce the power consumption of watch body 1004 and increase the battery charge time in watch body 1004. In some examples, wrist-wearable device system 1000 can include a coupling sensor 1007 that senses whether watch body 1004 is coupled to or decoupled from watch band 1012. Coupling sensor 1007 can be included in any of watch body 1004, watch band 1012, or watch band coupling mechanism 960 of FIGS. 9A-9C. Coupling sensor 1007 (e.g., a proximity sensor) can include, without limitation, an inductive proximity sensor, a limit switch, an optical proximity sensor, a capacitive proximity sensor, a magnetic proximity sensor, an ultrasonic proximity sensor, or a combination thereof. CPU 1026 can detect when watch body 1004 is coupled to watch band 1012 or decoupled from watch band 1012 by reading the status of coupling sensor 1007.

FIG. 11 illustrates a detailed flow diagram of a method 1100 of determining when to cease capturing video via a head-worn wearable device 150 based on sensor data at the head-worn wearable device 150 and/or at a wrist-wearable device 102 (FIGS. 1A-1F), according to some embodiments. Operations (e.g., steps) of the method 1100 can be performed by one or more processors (e.g., central processing unit 1026 and/or MCU 1052 FIG. 10) of a wrist-wearable device 102 and/or one or more processors of a head-worn wearable device 150. As described above in reference to FIGS. 1A-1F and FIGS. 9A-10, in some embodiments, the wrist-wearable device 102 and/or the head-worn wearable device 150 include one or more sensors, a display, a speaker, an image sensor, and a microphone to perform the one or more operations described below in reference to the method of FIG. 11. A speaker can be integrated with the wrist-wearable device 102 and/or head-worn wearable device 150. A speaker, microphone, display, one or more sensors, and image sensor (or other imaging device) of the head-worn wearable device 150 can be associated with the wrist-wearable device 102 (e.g., via communication between the wrist-wearable device 102 and the head-worn wearable device 150). At least some of the operations shown in FIG. 11 correspond to instructions stored in a computer memory or computer-readable storage medium (e.g., storage 1002, ram 1003, and/or memory 1050 FIG. 10). The example of operations 1110-1130 (and the operations following operation 1130) is (are) performed using one or more processors and/or using instructions stored in memory or computer-readable medium of the head-worn wearable device 150.

The method 1100 includes capturing (1110), via the head-worn wearable device 150 that includes a camera, video data. The method 1100 includes, while capturing the video data, monitoring (1120) sensor data (e.g., data from inertial measurement units, data from capacitive sensors, data for proximity sensors, and other sensor data) indicating one or both of a position of the head-worn wearable device 150 and a position of a wrist-wearable device 102 that is communicatively coupled with the head-worn device 150 to determine when to cease capturing the video data. In one example, the video data is a point-of-view video being captured via the camera of the head-worn wearable device for eventual upload and sharing via a social-media platform. The method 1100 further includes in accordance with a determination that at least some of the sensor data indicates that one or both of a video-capturing precondition is not present at the head-worn wearable device and a video-viewing precondition is present at the wrist-wearable device, ceasing (1130) to capture the video data and causing the video data to be displayed on a display of the wrist-wearable device. Examples of capturing data via the head-worn wearable device 150 and/or the wrist-wearable device 102 are provided above in reference to FIGS. 1A-1F and FIGS. 6-7. And more details regarding the video-viewing and video-capturing preconditions were also provided above and are applicable here as well.

In some embodiments, the determination is based only on at least some of the sensor data indicating that the video-capturing precondition is not present at the head-worn wearable device 150. In some embodiments, the video-capturing precondition is not present at the head-worn wearable device 150 when at least some of the sensor data indicates that the head-worn wearable device 150 is positioned such that a front portion of the head-worn wearable device 150 is facing towards the ground (e.g., the sensor data indicates that a user's head is facing towards the ground, such that the front portion of the head-worn wearable device is also positioned facing towards the ground since it is worn on the user's face). In some embodiments, the front portion of the head-worn wearable device 150 is a portion of the head-worn wearable device 150 that is worn over a user's eyes (e.g., the front portion can include the lenses of a head-worn wearable device, such as when the head-worn wearable device is pair of smart glasses).

In some embodiments, the determination can also be based only on sensor data from the wrist-wearable device, instead of sensor data from the head-worn wearable device. For example, in some embodiments, the determination is based only on at least some of the sensor data indicating that the video-viewing precondition is present wrist-wearable device 102. In some embodiments, the video-viewing precondition is present at the wrist-wearable device 102 when the wrist-wearable device 102 is in a raised position.

In some embodiments, the determination can further be based on sensor data from both the wrist-wearable device and sensor data from the head-worn wearable device. For example, in some embodiments, the determination is based on at least some of the sensor data indicating both the video-capturing precondition is not present at the head-worn wearable device 150 and the video-viewing precondition is present at the wrist-wearable device 102. Additional examples of the video-capturing preconditions and the video-viewing preconditions are provided above in reference to FIGS. 1A-3F and FIGS. 6-8E, and these examples can be used with the method 1100 as well.

FIG. 12 illustrates a detailed flow diagram of a method of a coordinated video capturing technique for a head-worn wearable device and a wrist-wearable device (e.g., creating coordinated video using video data captured by a camera of the wrist-wearable device and by a camera of the wrist-wearable device), according to some embodiments. Operations in FIG. 12 (e.g., steps) of the method 1200 can be performed by one or more processors (e.g., central processing unit 1026 and/or MCU 1052 FIG. 10) of a wrist-wearable device 102 and/or one or more processors of a head-worn wearable device 150. As described above in reference to FIGS. 1A-1F and FIGS. 9A-10, in some embodiments, the wrist-wearable device 102 and/or the head-worn wearable device 150 include one or more sensors, a display, a speaker, an image sensor, and a microphone to perform the one or more operations described below in reference to the method of FIG. 12. A speaker can be integrated with the wrist-wearable device 102 and/or head-worn wearable device 150. A speaker, microphone, display, one or more sensors, and image sensor (or other imaging device) of the head-worn wearable device 150 can be associated with the wrist-wearable device 102 (e.g., via communication between the wrist-wearable device 102 and the head-worn wearable device 150). At least some of the operations shown in FIG. 12 correspond to instructions stored in a computer memory or computer-readable storage medium (e.g., storage 1002, ram 1003, and/or memory 1050 FIG. 10). The example of operations 1210-1230 (and the other operations described following operation 1230) is performed using one or more processors and/or using instructions stored in memory or computer-readable medium of the head-worn wearable device 150.

Method 1200 is now described below. Method 1200 is a method of coordinated video capturing using a wrist-wearable device and a head-worn wearable device. At operation 1210, the method includes capturing, via a head-worn wearable device that includes a camera, first video data.

The method also includes, at operation 1220 (FIG. 12), while capturing the first video data, monitoring sensor data indicating one or both of (i) a position of the head-worn wearable device and (ii) a position of a wrist-wearable device that is communicatively coupled with the head-worn device to determine when to cease capturing the first video data via the head-worn wearable device.

The method further includes, at operation 1230, in accordance with a determination that at least some of the sensor data indicates that one or both of (i) a video-capturing precondition is not present at the head-worn wearable device and (ii) a video-capturing precondition is present at the wrist-wearable device, ceasing to capture the first video data and beginning to capture second video data via a camera of the wrist-wearable device.

In some embodiments, in response to receiving a request from a user to ceasing capturing the second video data, the method can include causing the first video data and the second video data to be combined into coordinated video data. In some embodiments, the method can include causing the coordinated video data to be displayed on a display of the wrist-wearable device. In some embodiments, the determination of operation 1230 is based only on at least some of the sensor data indicating that the video-capturing precondition is not present at the head-worn wearable device. In some embodiments, the video-capturing precondition is not present at the head-worn wearable device when at least some of the sensor data indicates that the head-worn wearable device is positioned such that a front portion of the head-worn wearable device is facing towards the ground. In some embodiments, the front portion of the head-worn wearable device is a portion of the head-worn wearable device that is worn over a user's eyes.

In some embodiments, the determination of operation 1230 is based only on at least some of the sensor data indicating that the video-capturing precondition is present at the wrist-wearable device. In some embodiments, the video-capturing precondition is present at the wrist-wearable device when the wrist-wearable device is in a raised position. In some embodiments, the determination at operation 1230 is based on at least some of the sensor data indicating both (i) the video-capturing precondition is not present at the head-worn wearable device and (ii) the video-capturing precondition is present at the wrist-wearable device. In some embodiments, the method additionally includes, while the second video data is being captured, monitoring sensor data indicating one or both of (i) a position of the head-worn wearable device and (ii) a position of a wrist-wearable device that is communicatively coupled with the head-worn device to determine when to cease capturing the second video data at the wrist-wearable device. In accordance with an additional determination that at least some of the sensor data indicates that one or both of (i) the video-capturing precondition is present at the head-worn wearable device and (ii) the video-capturing precondition is not present at the wrist-wearable device, the method includes ceasing to capture the second video data and beginning to capture third video data via the camera of the head-worn device.

In some embodiments, the method includes, in response to receiving a request from a user to cease capturing the third video data, causing the first video data, the second video data, and the third video data to be combined into coordinated video data. In some embodiments, the method also includes causing the coordinated video data to be displayed on a display of the wrist-wearable device.

In one other embodiment of method 1200, instead of using the video-capturing preconditions to determine when to switch between capturing at the camera of the head-worn wearable device and/or the wrist-wearable device (e.g., operations 1220 and 1230 do not occur), this one other embodiment of method 1200 instead includes, before starting to capture the first video data via head-worn wearable device at operation 1210, a user first making a request to initiate a video stream via an input provided at a display of the wrist-wearable device. In response to the request to initiate the video stream and in accordance with a determination that the wrist-wearable device is communicatively coupled with the head-worn wearable device, the camera of the head-worn wearable device is activated to begin capturing the first video data as part of the video stream. Alternatively or additionally, in some embodiments, a determination to capture the first video data (e.g., video stream, or live stream discussed below in reference to FIGS. 13A-13D) via head-worn wearable device and/or the wrist-wearable device is based on one or more capture triggers being satisfied (where satisfaction of the capture triggers can be determined without requiring any user input). The capture triggers can include location-based triggers (e.g., the user entered a geofenced area, the user reached a landmark, etc.), biometric-sensor-data triggers (e.g., the user reached a target heart rate, a target VO2 max, etc.), physical-activity triggers (e.g., the user reached a target velocity, a target distance, a target altitude, etc.), image-recognition triggers (e.g., without capturing an image, detecting by performing image recognition on a field of view of an imaging device, landmarks, events (e.g., parades, concerts, etc.), people (e.g., celebrities, family, friends, etc.), etc.), time-based triggers (e.g., start capturing video data at noon, at sunset, between 2 and 5 PM, etc.), and/or other triggers.

The capture triggers can be defined and/or selected for use by the user to ensure that only those triggers that the user actively selects are used at any point in time (e.g., the user must opt-in, in these embodiments, to being using any of the various types of capture triggers discussed above).

Figure 13A:
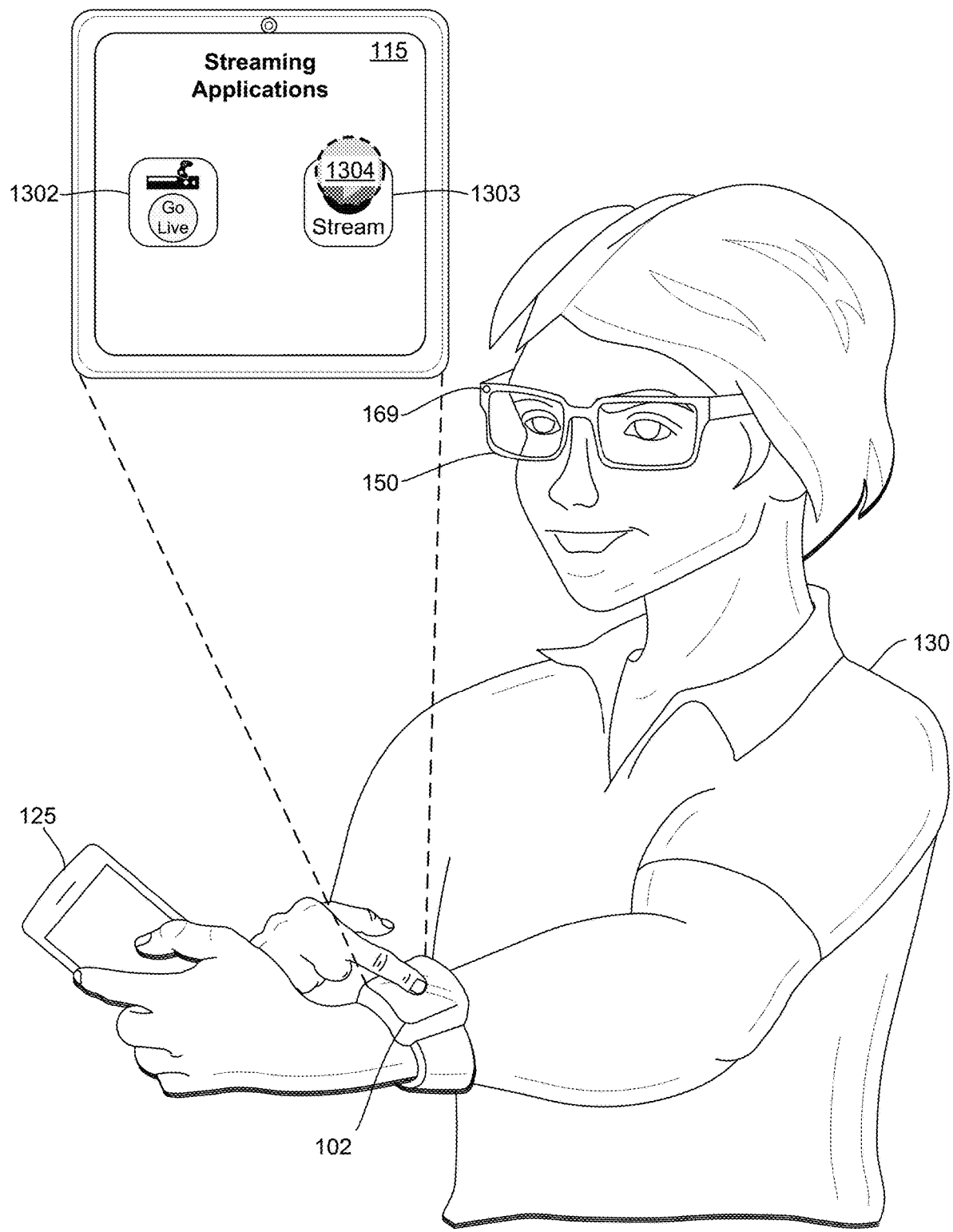
FIGS. 13A-13D illustrate coordinated video streaming and messaging using a wrist-wearable device and a head-worn wearable device, in accordance with some embodiments.
Figure 13B:
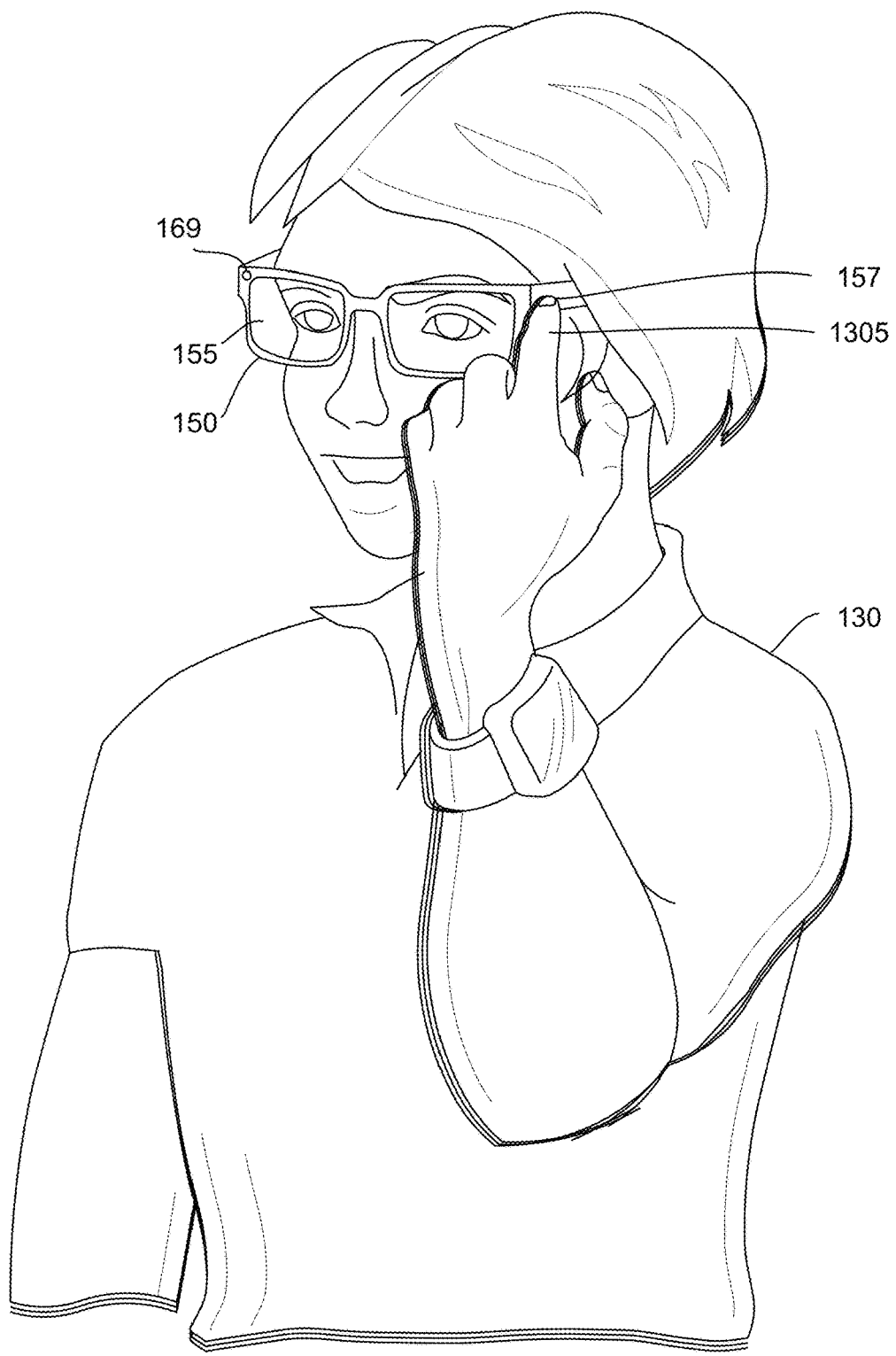
Figure 13C:
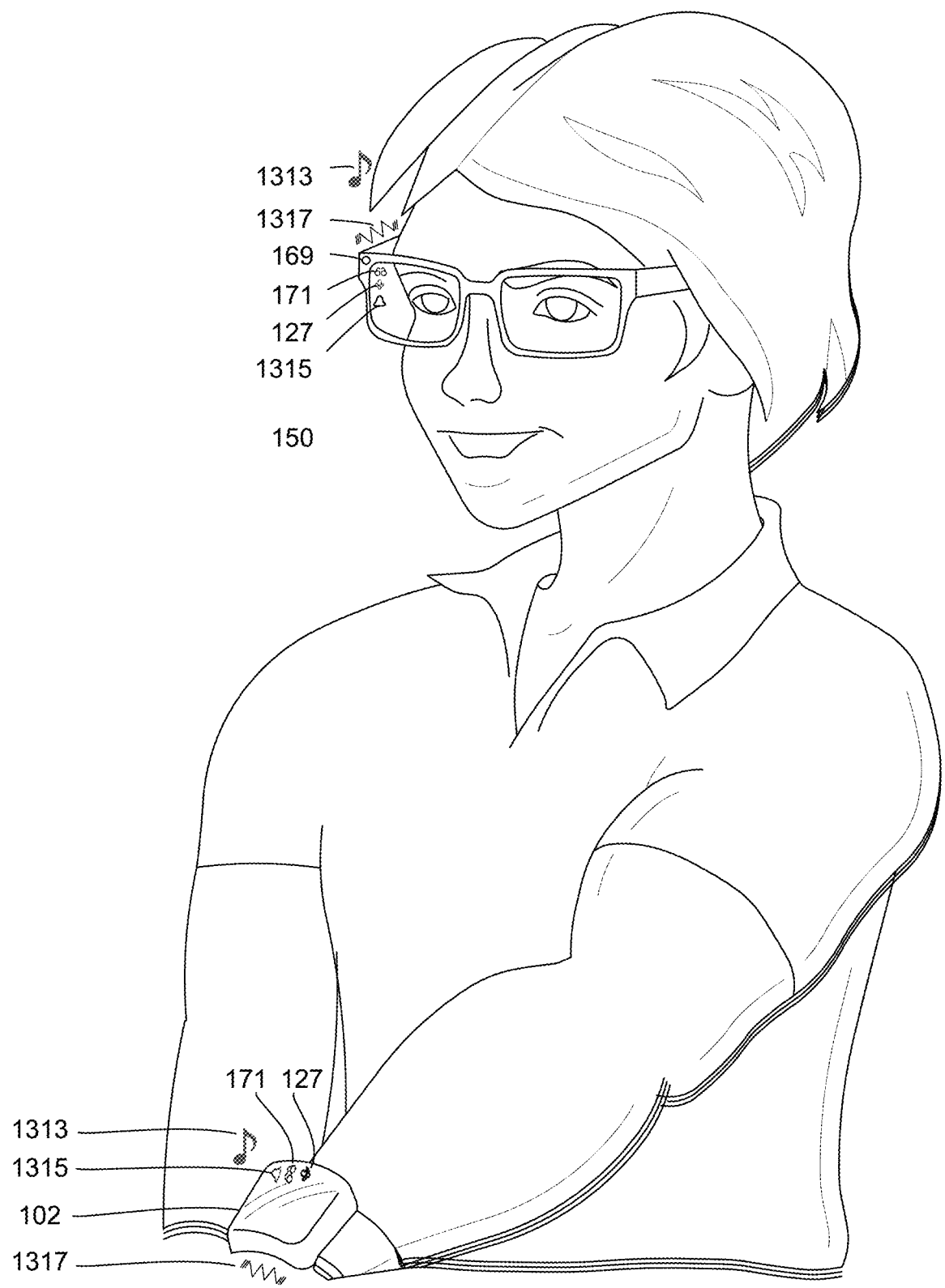
Figure 13D:
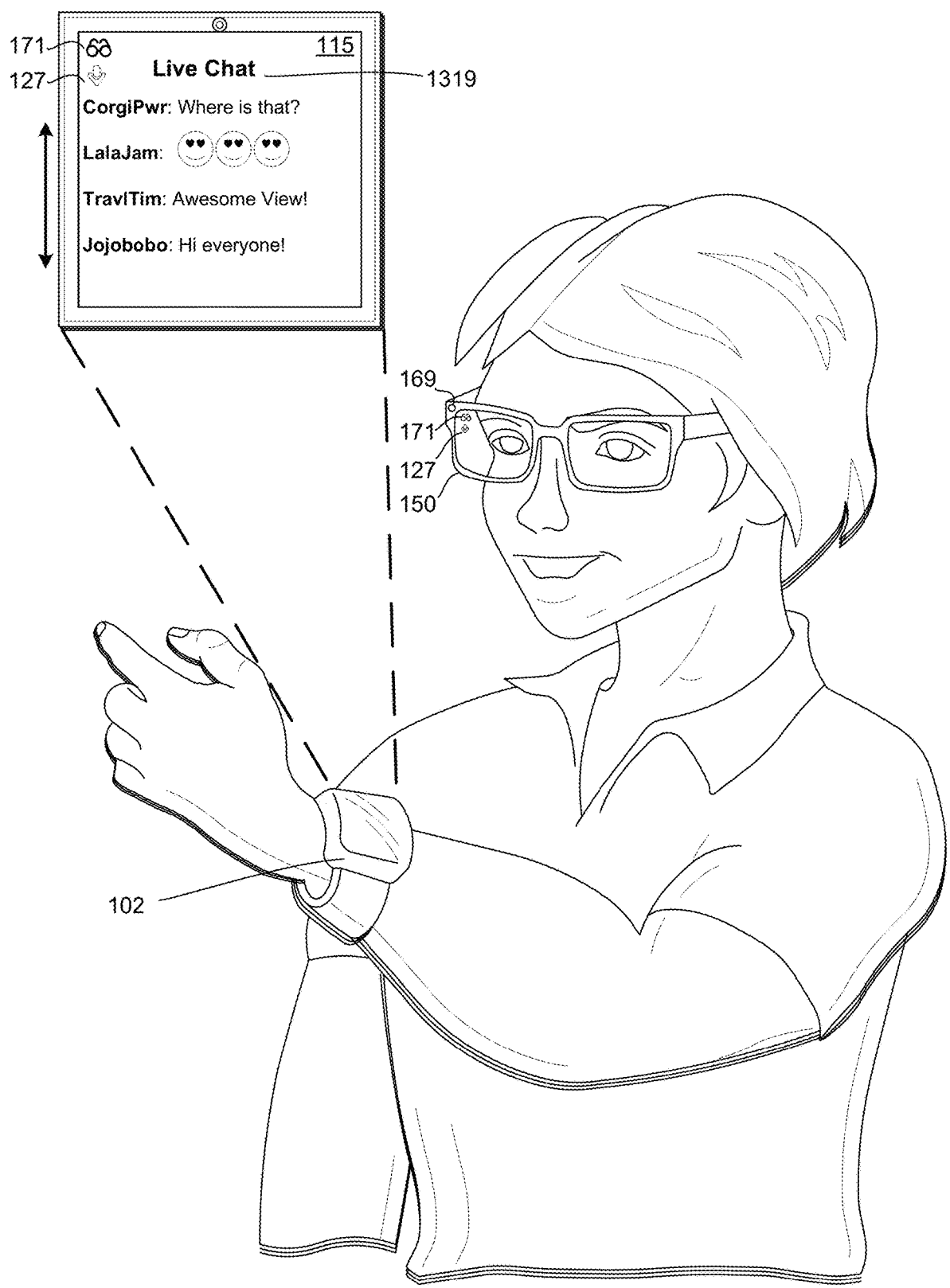

While the camera of the head-worn wearable device is used for this video streaming, sensor data at the wrist-wearable device is monitored to determine whether the wrist-wearable device is in a raised position and, if it is determined that the sensor data (e.g., data from an IMU or other sensor data, which can also be sensor data from the head-worn wearable device that indicates that the user's head is looking down towards the ground) indicates that the wrist-wearable device is in a raised position, then the display of the wrist-wearable device is caused to present a live view of reactions to the ongoing video stream (e.g., an example user interface showing the live view of reactions is presented at the display of the wrist-wearable device in FIG. 13D). This live view of reactions (displayed on the display of the wrist-wearable device once it is determined to be in the raised position) can include textual content (e.g., textual messages commenting on the video stream from other users) and can also include graphical content (e.g., various emojis, emoticons, and/or emotes from other users), and the live view of reactions can be received from a social-networking platform (e.g., Facebook) that is hosting the video/live stream. As an alternative, rather than monitoring the sensor data to determine when to display the live view of reactions, the display of the wrist-wearable device (as part of this alternative option) can be configured to always present the live view of reactions while the video stream is ongoing and will only cease displaying the live view of reactions once the video streaming is ceased. Accordingly, in these embodiments, a user can capture first video data using the head-worn wearable device and interact with a live chat using the display of the wrist-wearable device, thereby furthering a sustained user interaction with both wearable devices, while also improving the man-machine interfaces at both devices.

In addition, in some embodiments, the wrist-wearable device 102 and/or the head-worn wearable device 150 include a built-in user-controlled personal assistant. In some embodiments, the built-in user-controlled personal assistant is configured to read out (e.g., text-to-speech) reactions received while the video/live stream is ongoing. For example, if the user receives a message stating "oh that's cool!" the personal assistant can covey to the user, via speakers of the wrist-wearable device 102 or the head-worn wearable device 150, "oh that's cool!"; or, the personal assistant can instruct the user to look at the display of their wrist-wearable device to view reactions (e.g., indicating "message received from User X, take a look at your watch screen"). Similarly, if the user receives graphical content (e.g., a smiling emoticon or emoji), the personal assistant can convey to the user, via speakers of the wrist-wearable device 102 or the head-worn wearable device 150, the meaning of the graphical content (e.g., "smile" for the smiling emoticon, and can also indicate a name of the contact that sent the graphical content). To further the sustained interactions and improved man-machine interfaces, in conjunction with providing the audible feedback, the wrist-wearable device can optionally be configured to also vibrate as reactions are received (e.g., to provide a haptic response, which haptic response can use predetermined vibration patterns that can be associated with particular contacts to allow the user to quickly and easily know, based on the vibration pattern, which contact is commenting or reacting to their ongoing livestream).

The personal assistant can be controlled by the user via touch inputs (e.g., at a display of the wrist-wearable device 102 or the frames of the head-worn wearable device 150), voice commands, gestures (e.g., gestures performed or intended to be performed by user that are recognized by the wrist-wearable device, gestures detected by processing one or more images capturable in a field of view of the wrist-wearable device and/or head-worn wearable device, sequence of inputs (e.g., single tap, double tap, pattern of taps at a display of the wrist-wearable device 102 or the frames of the head-worn wearable device 150), type of input (e.g., finger slide or long presses detected at a display of the wrist-wearable device 102 or the frames of the head-worn wearable device 150), etc.

FIGS. 13A-13D illustrate coordinated video streaming and messaging using a wrist-wearable device and a head-worn wearable device, in accordance with some embodiments. The wrist-wearable device 102 and the head-worn wearable device (e.g., smart glasses 150) include one or more components described above in reference to FIGS. 1A-12. For example, in some embodiments, the smart glasses 150 include one or more of speakers, a microphone, an imaging device 169 (e.g., a camera or other type of image sensor) and/or a display 155 (e.g., a heads-up display integrated with one or both of the lenses of the smart glasses) for presenting visual data to a user 130; and the wrist-wearable device 102 includes one or more of a display 115, a speaker, a microphone, and/or an image sensor 135 (e.g., a camera). In some embodiments, the wrist-wearable device 102 and/or the smart glasses 150 include one or more sensors (e.g., sensors a heart rate sensor 1058 (FIG. 10), EMG sensor 1046, SpO2 sensor 1054, altimeter 1048, thermal sensor or thermal couple, ambient light sensor, ambient noise sensor, accelerometers, gyroscope sensors, positional sensors (e.g., Hall effect sensor, ultrasonic sensor, etc.), and/or other sensors described herein). In some embodiments, the wrist-wearable device 102 is communicatively coupled to another computing device, such as the smart glasses 150, as described above in reference to FIGS. 1E-1F.

In FIG. 13A, a user 130 provides instructions to use an imaging device 169 of the head-worn wearable device 150 to capture video data for a video stream. In some embodiments, the instructions are received at the wrist-wearable device 102. For example, the wrist-wearable device 102 can display, via display 115, a user interface including one or more video-streaming applications (e.g., a first video-streaming application 1301 and a second video-streaming application 1303), that when selected by the user 130 (represented by user input 1304) cause an instruction to be sent to a head-worn wearable device to use an imaging device 169 of the head-worn wearable device 150 to capture video data for a video stream. Alternatively or in addition to a user-provided instruction or input, as described above in reference to FIG. 12, in some embodiments, a determination to capture video data for the video stream can be based on one or more capture triggers being satisfied (examples and use cases for the capture triggers were provided above and are not repeated here for the sake of brevity).

In some embodiments, the user can adjust one or more capture settings via the wrist-wearable device 102. For example, the user can select a frame rate at which to capture the video, select a capture mode, and/or other capture conditions.

In some embodiments, a video stream is a real-time video and/or audio capture and transmission (which can be referred to as a live stream) that is shared for viewing with users of other devices (e.g., with friends that are invited to view the live stream). In some embodiments, in conjunction with capturing the video stream, one or more electronic messages can be received from the users of other devices that are viewing the live stream. In some embodiments, the user input 1305 to initiate the video stream/live stream is received via the wrist-wearable device 102 (e.g., via a touch command at a display 115 and/or actuation of a button, as shown in the example of FIG. 13A). In some embodiments, the video stream is initiated via a voice command and/or one or more gestures (e.g., hand gestures). As previously mentioned, alternative or additional options for initiating the video stream can occur without any input from the user, such as by using a capture trigger associated with the user 130 having entered a geofenced area that has a predetermined association with initiating a video stream (e.g., the user 130 can opt-in to establish a capture trigger associated with an area of GPS coordinates around the Golden Gate bridge, such that once the user 130 is determined to be within those GPS coordinates (i.e., the capture trigger is satisfied), then an imaging device of the head-worn wearable device and/or the wrist-wearable device can initiate capturing of the video stream and can make that stream available to a predetermined group of users (e.g., to subscribers of a group of bridge lovers).

Alternatively or in addition, in some embodiments, as shown in FIG. 13B, the user 130 provides an input 1305 at the head-worn wearable device 150 (e.g., a tap input at a frame portion of the head-worn wearable device 15) that initiates a video stream and/or adjusts one or more capture settings.

Turning next to FIG. 13C, in some embodiments, responsive to receiving the user input 1304 (FIG. 13A) or 1305 (FIG. 13B), the smart glasses 150 capture, via the imaging device 169, video data. In some embodiments, the imaging device 169 is configured to capture a field of view of the imaging device of the smart glasses 150 (e.g., imaging device 169). In some embodiments, the smart glasses 150 (and/or the wrist-wearable device 102) simultaneously capture audio data using one or more microphones (e.g., a microphone included in the smart glasses 150 and/or the wrist-wearable device 102). The captured video data and/or audio data is transmitted, in real-time, to one or more computing devices (e.g., a sever, a tablet, a computer, a smartphone, etc.) using a network 360 (FIG. 3). In some embodiments, the smart glasses 150, the wrist-wearable device 102, or a combination of the two transmits the captured video data and/or audio data. In some embodiments, another electronic device (e.g., a tablet, a computer, a smartphone, etc.) communicatively coupled to the smart glasses 150, the wrist-wearable device 102, or both transmits the captured video data and/or audio data (e.g., a smartphone can be used as a communication intermediary and can receive video and/or audio data from the head-worn wearable device and/or the wrist-wearable device, can process or otherwise combine that data, and can then send the processed or combined data to a server that then makes the video stream available to the viewers of the video/live stream).

In some embodiments, one or more electronic messages are received, via the network 360, while the video data and/or audio data is captured and transmitted (e.g., while the live stream is ongoing, viewers of the live stream can react to the live stream, which reactions are then available for view by the remaining views of the live stream as well as by the user 130 that is facilitating the live stream). More specifically, the one or more electronic messages are received from a viewer of the video and/or stream. In some embodiments, the one or more electronic messages are received by the smart glasses 150, the wrist-wearable device 102, or a combination of the two (or at an electronic device functioning as an intermediary, such as a smartphone that can be coupled with one or both of the wrist-wearable device and the head-worn wearable device). The one or more electronic messages, when received by the smart glasses 150, the wrist-wearable device 102, or a combination of the two, are responsive to the captured video data for the video and/or audio stream (e.g., the one or more messages include real-time responses and/or reactions to the transmitted video and/or audio data). In some embodiments, the one or more electronic messages are displayed to the user in the order they are received (e.g., are displayed in a chronological order). In some embodiments, the one or more electronic messages are synchronized via the smart glasses 150, the wrist-wearable device 102, or a combination of the two such that one or more electronic messages are provided to the user 130 in the order received. Alternatively or additionally, in some embodiments, the one or more electronic messages are synchronized via one or more computing devices (e.g., a sever, a tablet, a computer, a smartphone, etc.) communicatively coupled to the smart glasses 150, the wrist-wearable device 102, or both. Additional information on the one or more electronic messages is provided below in reference to FIG. 13D.

In some embodiments, the smart glasses 150, the wrist-wearable device 102, or both provide a notification in response to receiving the one or more electronic messages. In some embodiments, the notification can include one or more of an audible indicator 1313, a visual indicator 1315, and a vibration 1317 (or any other haptic response). In some embodiments, indicators are provided on either or both of the displays of the wrist-wearable device and the smart glasses to indicate the hardware components that are being currently utilized. For instance, as described above in reference to FIG. 1F, the display 155 of the smart glasses 150 can provide the user 130 with a video-capturing indicator 171 and/or an audio-capturing indicator 173 such that the user 130 is aware that the imaging device 169 and/or microphone of the smart glasses 150 are being utilized in conjunction with a video stream. Additional information on the video-capturing indicator 171 and/or the audio-capturing indicator 173 is provided above in reference to FIGS. 1E-1F.

As shown in FIG. 13D, the display 115 of the wrist-wearable device 102 displays the one or more electronic messages (e.g., represented within live chat user interface 1319, which live chat user interface 1319 can be overlaid on top of a current part of the ongoing video stream or can be display independently of the live stream). In some embodiments, the one or more messages are text messages, emojis, GIFs, images, links, etc. (in other words, multiple content types can be provided as reactions from viewers of the live stream). In some embodiments, the wrist-wearable device 102 displays the one or more messages in accordance with a determination that a message-viewing precondition is present. In some embodiments, a determination that a message-viewing precondition is present is based on sensor data of the smart glasses 150, the wrist-wearable device 102, or both. In particular, the sensor data of the smart glasses 150, the wrist-wearable device 102, or both can be monitored to indicate one or both of a position of the smart glasses 150 and a position of the wrist-wearable device 102 that is communicatively coupled with the smart glasses 150, and the monitored sensor data can be used to determine when to display, via the display 115 of the wrist-wearable device 102, the one or more messages. In some embodiments, a determination that the message-viewing precondition is present is based on at least some of the sensor data indicating that the smart glasses 150 is positioned such that a front portion of the smart glasses 150 (e.g., front portion of the frame that includes the imaging device 169) is facing towards the wrist-wearable device 102 (e.g., towards the display 115 of the wrist-wearable device 102) and/or at least some of the sensor data indicating that the wrist-wearable device 102 is positioned such that the display 115 of the wrist-wearable device 102 is facing towards the front portion of the smart glasses 150. The above examples are non-limiting. Different message-viewing preconditions can be used to determine when to display the one or more messages. For example, in some embodiments, one or more of the video-viewing preconditions describe above in reference to FIGS. 1A-12 can be used as message-viewing preconditions.

In some embodiments, the one or more messages, when displayed by the wrist-wearable device 102, are synchronized with the video data such that the one or more messages are displayed responsive to the transmitted video data and/or audio data. For example, the user 130 can be video streaming a concert, a backpacking trip, and/or day-to-day activities and the one or more messages can be synchronized such that, when displayed to the user 130, they are responsive to the user 130's real-time experience of the event. In some embodiments, the one or more messages, when displayed by the wrist-wearable device 102, are displayed in the order that they are received (e.g., from the first message received to the last message received, so in a chronological order). In some embodiments, older messages are presented near the top portion of the display 115 and the most recent messages are presented near the bottom portion of the display 115. In some embodiments, the user 130 can include a predetermined message delay such that the one or more messages can be viewed by the user before they are publicly displayed. For example, in some embodiments, a user 130 is responsible for monitoring a live chat 1319 and removing inappropriate or vulgar messages before other users in the live chat 1319 can view the massages, and the predetermined message delay allows the user 130 to review the messages. In some embodiments, the user 130 can provide a user input to scroll (as indicated by the up and down arrow) through the one or more messages displayed by the wrist-wearable device 102. In some embodiments, the user input is provided via a touch command at the display 115 and/or actuation of a button on the wrist-wearable device 102.

As described above in reference to FIG. 12, in some embodiments, the wrist-wearable device 102 and/or the head-worn wearable device 150 includes a built-in user-controlled personal assistant that is configured to present information (e.g., audibly read out one or more messages and/or graphical content, and to also provide indications of the viewer that provided the reactions). In some embodiments, the one or more messages can include text-to-speech (TTS) messages, and the wrist-wearable device 102 and/or the smart glasses 150 cause presentation of audio data (e.g., via the personal assistant) corresponding to received TTS messages via a speaker of the wrist-wearable device 102, speaker of the smart glasses 150, and/or a speaker that is in communication with the wrist-wearable device 102 and/or the smart glasses 150. In some embodiments, the user 130 can select which speaker is used to present audio data corresponding to received TTS messages. Alternatively or additionally, in some embodiments, the speaker used to present the audio data corresponding to received TTS messages is automatically selected based on a position of the wrist-wearable device 102 and/or the smart glasses 150. For example, if the user 130 has the wrist-wearable device 102 in a raised position such that the display 115 is visible to the user 130, the speaker of the wrist-wearable device 102 can be selected to present the audio data. In another example, if the user 130 has the wrist-wearable device 102 in a lowered position such that the display 115 is not visible to the user 130, the speaker of the smart glasses 150 can be selected to present the audio data. Examples of raised and lowered positions of the wrist-wearable device 102 are provided above in reference to FIGS. 1A-1F. In some embodiments, the speaker used to present audio data is automatically selected based on a battery level of the wrist-wearable device 102 and/or the smart glasses 150. For example, in order to extend the battery life of each device, the device with the highest battery level can be automatically selected to present audio data. In some embodiments, the speaker of the smart glasses 150 is selected for presentation of the audio data by default (e.g., because the speakers of the smart glasses 150 are closest to the user 130's ears and operate as the best audio source). In some embodiments, the audio data corresponding to received TTS messages is presented to the user 130 whether or not the message-viewing precondition is present. In other words, the user 130 does not have to look at the display 115 of the wrist-wearable device 102 to receive audio data corresponding to TTS messages. In some embodiments, the user 130 can disable TTS messages or presentation of the audio data corresponding to the TTS messages via the wrist-wearable device 102 and/or the smart glasses 150.

In some embodiments, in accordance with a determination that the message-viewing precondition is not present, the wrist-wearable device 102 ceases to display the one or more messages. When the one or more messages are once again presented to the user (e.g., after a determination that the message-viewing precondition is present once again), the one or more messages are resynchronized with the recently transmitted video data and/or audio data. In other words, the one or more messages, when displayed to the user 130 via the display 115 of the wrist-wearable device 102, are synchronized such that they are as close to real-time with the video and/or audio data captured by the smart glasses 150.

In some embodiments, the user 130 provides instructions to terminate the video stream. In some embodiments, the instructions to terminate the stream are received at the wrist-wearable device 102. Alternatively or additionally, in some embodiments, the instructions to terminate the stream are received at the head-worn wearable device 150. For example, an input to terminate the video stream can be received at a frame 157 of the head-worn wearable device 150, as described above in reference to FIG. 13B. Alternatively or additionally, in some embodiments, the user input to terminate the video stream is received via the wrist-wearable device 102 (e.g., via a touch command at a display 115 and/or actuation of a button). In some embodiments, the video stream is terminated via a voice command and/or one or more gestures (e.g., hand gestures). One other termination techniques used in some embodiments is the use of capture triggers (example of which were discussed above), such that a determination that a capture trigger is no longer present (e.g., user 130 is determined to have departed a predefined geofenced area) causes termination of an ongoing video stream.

FIG. 14 illustrates a detailed flow diagram of a method 1400 of coordinated video streaming and messaging using a wrist-wearable device and a head-worn wearable device, according to some embodiments. Operations (e.g., steps) of the method 1100 can be performed by one or more processors (e.g., central processing unit 1026 and/or MCU 1052 FIG. 10) of a wrist-wearable device 102 and/or one or more processors of a head-worn wearable device 150. The wrist-wearable device 102 and/or the head-worn wearable device 150, as described above in reference to FIGS. 13A-13D, include one or more sensors, a display, a speaker, an imaging device (e.g., a camera), and a microphone to perform the one or more operations of method 1400. At least some of the operations shown in FIG. 14 correspond to instructions stored in a computer memory or computer-readable storage medium (e.g., storage 1002, ram 1003, and/or memory 1050 FIG. 10). The example of operations 1410-1430 is (are) performed using one or more processors and/or using instructions stored in memory or computer-readable medium of either of both of the head-worn wearable device 150 or wrist-wearable device 102.

The method 1400 includes receiving (1410) an instruction to use a camera of a head-worn wearable device to capture video data for a video stream. In some embodiments, the instruction to use the camera of the head-worn wearable device to capture video data for the video stream is received at the wrist-wearable device (but can also be received without an express user instruction, such as based on a determination that a capture trigger has been satisfied). For example, as described above in reference to FIG. 13A, the user 130 can provide an input at the wrist-wearable device to cause the activation of an imaging device of the head-worn wearable device. In some embodiments, the camera of the head-worn wearable device captures video data that is within a field of view of the camera of the head-worn wearable device. In some embodiments, while the camera of the head-worn wearable device is capturing the video data for the video stream, the microphone of the head-worn wearable device is capturing audio data for the video stream.

The method 1400, after receiving the instruction (1420) to use the camera of the head-worn wearable device to capture the video data for the video stream, includes receiving (1423), at a wrist-wearable device that is in communication with the head-worn wearable device, one or more electronic messages from a viewer of the video stream, and monitoring (1425) sensor data indicating one or both of (i) a position of the head-worn wearable device and (ii) a position of the wrist-wearable device to determine when to display, via a display of the wrist-wearable device, the one or more electronic messages. In this description, references to positions of devices should be understood to include position and orientation of those devices, as will be apparent to one of skill upon reading this description in conjunction with the referenced figures. In some embodiments, the one or more electronic messages are received responsive to the video data captured via the camera of the head-worn wearable device and the one or more electronic messages are displayed in the order received. In some embodiments, a determination that the message-viewing precondition is present is based on one or both of (i) at least some of the sensor data indicating that the head-worn wearable device is positioned such that a front portion of the head-worn wearable device is facing towards the wrist-wearable device and (ii) at least some of the sensor data indicating that the wrist-wearable device is positioned such that the display of the wrist-wearable device is facing towards the front portion of the head-worn wearable device. For example, as shown in FIGS. 13C and 13D, the display of the wrist-wearable device does not actively display information (e.g., the reactions from other viewers in conjunction with the live stream) while the wrist-wearable device is at or near the user's wrist and, once the user raises the wrist-wearable device such that a message-viewing precondition is present, the wrist-wearable device displays one or more electronic messages received from a viewer of the stream. Additional examples of the message-viewing precondition are provided above in reference to FIGS. 13A-13D.

In some embodiments, the one or more electronic messages include text-to-speech (TTS) messages, and the method 1400 further includes causing a speaker of the wrist-wearable device or a speaker of the head-worn wearable device to present audio data corresponding to the TTS messages. In some embodiments, the speaker of the wrist-wearable device or the speaker of the head-worn wearable device is automatically selected for use in presenting the audio data corresponding to the TTS messages based on the sensor data indicating one or both of (i) the position of the head-worn wearable device and (ii) the position of the wrist-wearable device that is communicatively coupled with the head-worn device. As discussed earlier, use of position data for purposes of selecting which speaker to use is one example, other examples can use power-availability and consumption requirements to figure out which speakers should be utilized to best conserve power used by the devices.

The method 1400 further includes, in accordance with a determination that the sensor data indicates that a message-viewing precondition is present, displaying (1430), on the display of the wrist-wearable device, the one or more electronic messages from the viewer of the video stream. In some embodiments, displaying the one or more electronic messages includes displaying a plurality of electronic messages for a plurality of different viewers of the video stream (e.g., as shown in FIG. 13D, four different users, each identified by a different user name, are shown as having reacted to the live stream by providing textual and/or graphical reactions), and the plurality of electronic messages are displayed in a chronological fashion. In some embodiments, the method 1400 includes, in accordance with a determination that the message-viewing precondition is no longer present, ceasing to display, via the display of the wrist-wearable device, the one or more messages.

In some embodiments, the method 1400 includes, in conjunction with displaying, on the display of the wrist-wearable device, the one or more electronic messages, displaying a visual indicator reflecting that the wrist-wearable device is in communication with the head-worn wearable device (e.g., an example visual indicator 171 is shown in FIG. 13D). In some embodiments, the method 1400 includes, in response to receiving the one or more electronic messages, causing one or both of the head-worn wearable device and the wrist-wearable device to provide a notification to a user of the head-worn wearable device and the wrist-wearable device, the notification indicating receipt of the one or more electronic messages to the user. The notification includes at least one of a vibration, audible indicator, and visual indicator. Examples of the different indicators and notifications are provided above in reference to FIGS. 13A-13D.

In some embodiments, the method 1400 includes receiving, via the wrist-wearable device, another user input terminating the video stream, and responsive to the other user input terminating the video stream, causing the camera of the head-worn wearable device to cease to capture the video data. As mentioned above, a user-input-based termination event is one example; other examples can make use of capture triggers, such that when a respective capture trigger that activated a live stream is determined to no longer be present, then the live stream is consequently terminated.

The various user interfaces and interactions described above in reference to FIGS. 1A-14 are non-limiting. The various user interfaces and interactions described above in reference to FIGS. 1A-14 can be implemented on devices with other form factors, including wrist-wearable devices with other form factors including any of the form factors for a wrist-wearable device shown in U.S. Design patent application Ser. Nos. 29/740,675 and 29/770,243, each of which is incorporated by reference herein in its respective entirety and on which any of the user interfaces and techniques described herein can be presented.

Any data collection performed by the devices described herein and/or any devices configured to perform or cause the performance of the different embodiments described above in reference to FIGS. 1A-14, hereinafter the "devices," is done with user consent and in a manner that is consistent with all applicable privacy laws. Users are given options to allow the devices to collect data, as well as the option to limit or deny collection of data by the devices. A user is able to opt-in or opt-out of any data collection at any time. Further, users are given the option to request the removal of any collected data.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of determining when to cease capturing video via a head-worn wearable device, the method comprising:
   capturing, via a head-worn wearable device that includes a camera, video data;

while capturing the video data, monitoring sensor data indicating one or both of (i) a position of the head-worn wearable device and (ii) a position of a wrist-wearable device that is communicatively coupled with the head-worn wearable device to determine when to cease capturing the video data; and in accordance with a determination that at least some of the sensor data indicates that a video-capturing precondition is not present at the head-worn wearable device, ceasing to capture the video data and causing the video data to be displayed on a display of the wrist-wearable device, wherein the video-capturing precondition is not present at the head-worn wearable device when at least some of the sensor data indicates that the head-worn wearable device is positioned such that a front portion of the head-worn wearable device is facing towards the wrist-wearable device.

2. The method of claim 1, wherein the front portion of the head-worn wearable device is a portion of the head-worn wearable device that is worn over a user's eyes.

3. The method of claim 1, wherein the video data is first video data captured at a first point in time, and the method further comprises:
at a second point in time, distinct from the first point in time:
capturing, via the head-worn wearable device, second video data;
while capturing the second video data, monitoring additional sensor data indicating one or both of (i) a position of the head-worn wearable device and (ii) a position of a wrist-wearable device that is communicatively coupled with the head-worn wearable device to determine when to cease capturing the second video data; and
in accordance with another determination that at least some of the additional sensor data indicates that a video-viewing precondition is present at the wrist-wearable device, ceasing to capture the second video data and causing the second video data to be displayed on the display of the wrist-wearable device.

4. The method of claim 3, wherein the video-viewing precondition is present at the wrist-wearable device when the wrist-wearable device is in a raised position.

5. The method of claim 3, further comprising:
at a third point in time, distinct from the first and second points in time:
capturing, via the head-worn wearable device, third video data;
while capturing the third video data, monitoring more sensor data indicating one or both of (i) a position of the head-worn wearable device and (ii) a position of a wrist-wearable device that is communicatively coupled with the head-worn wearable device to determine when to cease capturing the third video data; and
in accordance with yet another determination that at least some of the more sensor data indicates that both (i) the video-capturing precondition is not present at the head-worn wearable device and (ii) the video-viewing precondition is present at the wrist-wearable device, ceasing to capture the third video data and causing the third video data to be displayed on the display of the wrist-wearable device.

6. A system comprising a head-worn wearable device and a wrist-wearable device, the system configured to:
capture, via a head-worn wearable device that includes a camera, video data;
while capturing the video data, monitor sensor data indicating one or both of (i) a position of the head-worn wearable device and (ii) a position of a wrist-wearable device that is communicatively coupled with the head-worn wearable device to determine when to cease capturing the video data; and in accordance with a determination that at least some of the sensor data indicates that a video-capturing precondition is not present at the head-worn wearable device, cease to capture the video data and causing the video data to be displayed on a display of the wrist-wearable device, wherein the video-capturing precondition is not present at the head-worn wearable device when at least some of the sensor data indicates that the head-worn wearable device is positioned such that a front portion of the head-worn wearable device is facing towards the wrist-wearable device.

7. The system of claim 6, wherein the front portion of the head-worn wearable device is a portion of the head-worn wearable device that is worn over a user's eyes.

8. The system of claim 6, wherein the video data is captured at a first point in time, and the system is further configured to:
at a second point in time, distinct from the first point in time:
capture, via the head-worn wearable device, additional video data;
while capturing the additional video data, monitor additional sensor data indicating one or both of (i) a position of the head-worn wearable device and (ii) a position of a wrist-wearable device that is communicatively coupled with the head-worn wearable device to determine when to cease capturing the additional video data; and
in accordance with an additional determination that at least some of the additional sensor data indicates that a video-viewing precondition is present at the wrist-wearable device, cease to capture the additional video data and causing the additional video data to be displayed on the display of the wrist-wearable device.

9. The system of claim 8, wherein the video-viewing precondition is present at the wrist-wearable device when the wrist-wearable device is in a raised position.

10. The system of claim 8, further configured to:
at a third point in time, distinct from the first and second points in time:
capture, via the head-worn wearable device, third video data;
while capturing the third video data, monitor sensor data indicating one or both of (i) a position of the head-worn wearable device and (ii) a position of a wrist-wearable device that is communicatively coupled with the head-worn wearable device to determine when to cease capturing the third video data; and
in accordance with yet another determination that at least some of the more sensor data indicates that both (i) the video-capturing precondition is not present at the head-worn wearable device and (ii) the video-viewing precondition is present at the wrist-wearable device, ceasing to capture the third video data and causing the third video data to be displayed on the display of the wrist-wearable device.

11. A non-transitory, computer-readable storage medium including instructions that, when executed by one or more processors of a head-worn wearable device, cause the head-worn wearable device to:
- capture, via a head-worn wearable device that includes a camera, video data;
- while capturing the video data, monitor sensor data indicating one or both of (i) a position of the head-worn wearable device and (ii) a position of a wrist-wearable device that is communicatively coupled with the head-worn wearable device to determine when to cease capturing the video data; and
- in accordance with a determination that at least some of the sensor data indicates that a video-capturing precondition is not present at the head-worn wearable device, cease to capture the video data and causing the video data to be displayed on a display of the wrist-wearable device, wherein the video-capturing precondition is not present at the head-worn wearable device when at least some of the sensor data indicates that the head-worn wearable device is positioned such that a front portion of the head-worn wearable device is facing towards the wrist-wearable device.

12. The non-transitory, computer-readable storage medium of claim 11, wherein the front portion of the head-worn wearable device is a portion of the head-worn wearable device that is worn over a user's eyes.

13. The non-transitory, computer-readable storage medium of claim 11, wherein the video data is captured at a first point in time, and the non-transitory, computer-readable storage medium further includes instructions that, when executed by one or more processors of the head-worn wearable device, cause the head-worn wearable device to:
- at a second point in time, distinct from the first point in time:
  - capture, via the head-worn wearable device, additional video data;
  - while capturing the additional video data, monitor additional sensor data indicating one or both of (i) a position of the head-worn wearable device and (ii) a position of a wrist-wearable device that is communicatively coupled with the head-worn wearable device to determine when to cease capturing the additional video data; and
  - in accordance with an additional determination that at least some of the additional sensor data indicates that a video-viewing precondition is present at the wrist-wearable device, cease to capture the additional video data and causing the additional video data to be displayed on the display of the wrist-wearable device.

14. The non-transitory, computer-readable storage medium of claim 13, wherein the video-viewing precondition is present at the wrist-wearable device when the wrist-wearable device is in a raised position.

15. The non-transitory, computer-readable storage medium of claim 13, wherein the non-transitory, computer-readable storage medium further includes instructions that, when executed by one or more processors of the head-worn wearable device, cause the head-worn wearable device to:
- at a third point in time, distinct from the first and second points in time:
  - capture, via the head-worn wearable device, third video data;
  - while capturing the third video data, monitor more sensor data indicating one or both of (i) a position of the head-worn wearable device and (ii) a position of a wrist-wearable device that is communicatively coupled with the head-worn wearable device to determine when to cease capturing the third video data; and
  - in accordance with yet another determination that at least some of the more sensor data indicates that both (i) the video-capturing precondition is not present at the head-worn wearable device and (ii) the video-viewing precondition is present at the wrist-wearable device, ceasing to capture the third video data and causing the third video data to be displayed on the display of the wrist-wearable device.

16. The non-transitory, computer-readable storage medium of claim 11, wherein the sensor data is monitored using an inertial measurement unit, and the non-transitory, computer-readable storage medium further includes instructions that, when executed by one or more processors of the head-worn wearable device, cause the head-worn wearable device to:
- determine one or both of (i) the position of the head-worn wearable device and (ii) the position of the wrist-wearable device that is communicatively coupled with the head-worn wearable device based on sensed data from the inertial measurement unit.

17. The method of claim 1, wherein the sensor data is monitored using an inertial measurement unit, and the method further comprises:
- determining one or both of (i) the position of the head-worn wearable device and (ii) the position of the wrist-wearable device that is communicatively coupled with the head-worn wearable device based on sensed data from the inertial measurement unit.

18. The system of claim 6, wherein the sensor data is monitored using an inertial measurement unit, and the system is further configured to:
- determine one or both of (i) the position of the head-worn wearable device and (ii) the position of the wrist-wearable device that is communicatively coupled with the head-worn wearable device based on sensed data from the inertial measurement unit.

* * * * *